US012354550B2

(12) United States Patent
Kim et al.

(10) Patent No.: US 12,354,550 B2
(45) Date of Patent: Jul. 8, 2025

(54) DISPLAY DEVICE

(71) Applicant: SAMSUNG ELECTRONICS CO., LTD., Suwon-si (KR)

(72) Inventors: Sunkwon Kim, Suwon-si (KR); Uijong Song, Suwon-si (KR); Yongil Kwon, Suwon-si (KR); Seongyoung Ryu, Suwon-si (KR); Yilho Lee, Suwon-si (KR); Heejin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/758,335

(22) Filed: Jun. 28, 2024

(65) Prior Publication Data

US 2025/0014515 A1 Jan. 9, 2025

(30) Foreign Application Priority Data

Jul. 5, 2023 (KR) ........................ 10-2023-0087267

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0626* (2013.01)

(58) Field of Classification Search
CPC ......... G09G 3/3233; G09G 2300/0819; G09G 2300/0833; G09G 2300/0842; G09G 2300/0861; G09G 2310/0202; G09G 2310/06; G09G 2310/08; G09G 2320/0626; G09G 3/3266
See application file for complete search history.

(56) References Cited

U.S. PATENT DOCUMENTS

| | | | |
|---|---|---|---|
| 6,372,608 | B1 | 4/2002 | Shimoda et al. |
| 6,645,830 | B2 | 11/2003 | Shimoda et al. |
| RE38,466 | E | 3/2004 | Inoue et al. |
| 6,818,465 | B2 | 11/2004 | Biwa et al. |
| 6,818,530 | B2 | 11/2004 | Shimoda et al. |
| 6,858,081 | B2 | 2/2005 | Biwa et al. |
| 6,967,353 | B2 | 11/2005 | Suzuki et al. |
| 7,002,182 | B2 | 2/2006 | Okuyama et al. |
| 7,084,420 | B2 | 8/2006 | Kim et al. |
| 7,087,932 | B2 | 8/2006 | Okuyama et al. |
| 7,154,124 | B2 | 12/2006 | Han et al. |
| 7,208,725 | B2 | 4/2007 | Sherrer et al. |

(Continued)

*Primary Examiner* — Stacy Khoo
(74) *Attorney, Agent, or Firm* — Sughrue Mion, PLLC

(57) ABSTRACT

A display device includes pixels arranged in rows and columns, a scan driver, and a read-out circuit, wherein the read-out circuit is configured to read-out electrical properties of a pixel through the read-out line. The first pixel includes a first transistor, a second transistor, a third transistor, a fourth transistor, a fifth transistor, a sixth transistor, a seventh transistor, an eighth transistor, a ninth transistor, a first organic light-emitting diode connected between a second electrode of the seventh transistor and a ground node to which a ground voltage is applied, a second organic light-emitting diode between the second electrode of the eighth transistor and the ground node, and a third organic light-emitting diode connected between the second electrode of the ninth transistor and the ground node.

20 Claims, 42 Drawing Sheets

(56) References Cited

U.S. PATENT DOCUMENTS

| | | | |
|---|---|---|---|
| 7,288,758 B2 | 10/2007 | Sherrer et al. | |
| 7,319,044 B2 | 1/2008 | Han et al. | |
| 7,501,656 B2 | 3/2009 | Han et al. | |
| 7,709,857 B2 | 5/2010 | Kim et al. | |
| 7,759,140 B2 | 7/2010 | Lee et al. | |
| 7,781,727 B2 | 8/2010 | Sherrer et al. | |
| 7,790,482 B2 | 9/2010 | Han et al. | |
| 7,812,787 B2 | 10/2010 | Eom | |
| 7,940,350 B2 | 5/2011 | Jeong | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,459,832 B2 | 6/2013 | Kim | |
| 8,502,242 B2 | 8/2013 | Kim | |
| 8,536,604 B2 | 9/2013 | Kwak et al. | |
| 8,735,931 B2 | 5/2014 | Han et al. | |
| 8,766,295 B2 | 7/2014 | Kim | |
| 9,520,085 B2 | 12/2016 | Ko et al. | |
| 9,852,683 B2 | 12/2017 | Liu | |
| 10,381,426 B2 | 8/2019 | Ka et al. | |
| 10,417,958 B2 | 9/2019 | Chung | |
| 11,069,298 B2 | 7/2021 | Xuan et al. | |
| 11,176,884 B2 | 11/2021 | Chang et al. | |
| 2016/0155385 A1* | 6/2016 | Yang | G06F 3/042<br>345/174 |
| 2019/0318691 A1* | 10/2019 | Soni | G09G 3/3233 |
| 2021/0407405 A1* | 12/2021 | Liu | G09G 3/3233 |
| 2024/0078959 A1* | 3/2024 | Kim | G09G 3/20 |

* cited by examiner

DISPLAY DEVICE

CROSS-REFERENCE TO RELATED APPLICATION

This application claims priority to Korean Patent Application No. 10-2023-0087267, filed on Jul. 5, 2023, in the Korean Intellectual Property Office, the disclosure of which is incorporated by reference herein in its entirety.

BACKGROUND

The present disclosure relates to a semiconductor device, and more particularly, to a display device.

The display device may include a display panel configured to display an image and a display driver circuit configured to drive the display panel. The display driver circuit may receive image data from the outside and apply an image signal corresponding to the received image data to a data line of the display panel to drive the display panel. In recent years, the use of an organic light-emitting diode (OLED) display panel in which each of a plurality of pixels of a pixel array includes an OLED is increasing.

The display device may include the plurality of pixels. The plurality of pixels may be arranged in rows and columns. The rows of the plurality of pixels may be connected to a scan driver, and the columns of the plurality of pixels may be connected to a data driver. A scan driver may control a point of time at which each of the rows of the plurality of pixels is selected. A data driver may adjust a brightness of the pixels in the selected row. As display devices are being downscaled and the resolution of the display devices is increased, sizes of pixels are being reduced. When the sizes of the pixels are reduced, a range of the amount of current flowing through each of the pixels may be limited. When the range of the amount of current flowing through each of the pixels is limited, it may be more difficult to control the brightness of the pixels.

SUMMARY

One or more embodiments provide a display panel capable of adjusting a brightness of pixels and a display device including the display panel.

According to an aspect of an embodiment, a display device includes: pixels arranged in rows and columns; a scan driver connected to the rows of the pixels, wherein a first row of the rows of the pixels is connected to the scan driver through a scan line, a first emission control line, a second emission control line, a third emission control line, a fourth emission control line, an initialization line, and a read-out control line; a data driver connected to the columns of the pixels, wherein a first column of the columns of the pixels is connected to the scan driver through a data line; and a read-out circuit connected to the columns of the pixels and configured to read-out electrical properties of the pixels through a read-out line, wherein the first column is connected to the read-out circuit through the read-out line. A first pixel of the pixels includes: a first transistor including a first electrode connected to a first node, a second electrode connected to a third node, and a gate connected to a second node; a second transistor including a first electrode connected to the data line, a second electrode connected to the first node, and a gate connected to the scan line; a third transistor including a first electrode connected to the second node, a second electrode connected to the third node, and a gate connected to the scan line; a fourth transistor including a first electrode connected to a power node configured to supply a power supply voltage, a second electrode connected to the first node, and a gate connected to the first emission control line; a fifth transistor including a first electrode connected to the read-out line, a second electrode connected to the second node, and a gate connected to the initialization line; a sixth transistor including a first electrode connected to the read-out line, a second electrode connected to the third node, and a gate connected to the read-out control line; a seventh transistor including a first electrode connected to the third node, a second electrode, and a gate connected to the second emission control line; an eighth transistor including a first electrode connected to the third node, a second electrode, and a gate connected to the third emission control line; a ninth transistor including a first electrode connected to the third node, a second electrode, and a gate connected to the fourth emission control line; a capacitor connected to the first node and the second node; a first organic light-emitting diode connected between the second electrode of the seventh transistor and a ground node; a second organic light-emitting diode between the second electrode of the eighth transistor and the ground node; and a third organic light-emitting diode connected between the second electrode of the ninth transistor and the ground node.

According to another aspect of an embodiment, a display device includes: a display panel including a plurality of pixels; and a display driver circuit including a scan driver, a data driver, and a read-out circuit. A first pixel of the plurality of pixels includes: a first transistor between a first node and a third node, and configured to operate in response to a voltage of a second node; a second transistor connected between the first node and a first data line, and configured to operate in response to a first scan signal received through a first scan line; a third transistor connected between the second node and the third node, and configured to operate in response to a fourth scan signal received through a fourth scan line; a fourth transistor connected between a first driving power source and the first node, and configured to operate in response to a first emission control signal received through a first emission control line; a fifth transistor connected between a read-out line and the second node, and configured to operate in response to an initialization signal received through an initialization line; a sixth transistor connected between the read-out line and the third node, and configured to operate in response to a read-out control signal received through a read-out control line; a seventh transistor connected between the third node and a first organic light-emitting diode, and configured to operate in response to a second emission control signal received through a second emission control line; an eighth transistor connected between the third node and a second organic light-emitting diode, and configured to operate in response to a third emission control signal received through a third emission control line; a ninth transistor connected between the third node and a third organic light-emitting diode, and configured to operate in response to a fourth emission control signal received through a fourth emission control line; a tenth transistor connected between the first node and a second data line, and configured to operate in response to a second scan signal received through a second scan line; an eleventh transistor connected between the first node and a third data line, and configured to operate in response to a third scan signal received through a third scan line; a capacitor connected between the first node and the second node; the first organic light-emitting diode connected between the seventh transistor and a second driving power source; the second organic light-emitting diode connected between the eighth transistor and the second driving power source; and the third organic light-emitting diode connected between the ninth transistor and the second driving power source. The scan driver is connected to the first pixel through the first scan line, the second scan line, the third scan line, the fourth scan line, the initialization line, the read-out control line, the first emission control line, the second emission control line, the third emission control line, and the fourth emission control line. The data driver is connected to the first pixel through the first data line, the second data line and the third data line, and is configured to supply a first data voltage corresponding to a luminance of the first organic light-emitting diode through the first data line, supply a second data voltage corresponding to a luminance of the second organic light-emitting diode through the second data line, and supply a third data voltage corresponding to a luminance of the third organic light-emitting diode through the third data line. The read-out circuit is connected to the first pixel through the read-out line and configured to read-out electrical properties of the read-out line.

According to another aspect of an embodiment, a display device includes: a display panel including a plurality of pixels; and a display driver circuit including a scan driver, a data driver, and a read-out circuit. A first pixel of the plurality of pixels includes: a first transistor connected between a first node and a third node, and configured to operate in response to a voltage of a second node; a second transistor connected between the first node and a data line, and configured to operate in response to a scan signal received through a scan line; a third transistor connected between the second node and the third node, and configured to operate in response to the scan signal; a fourth transistor connected between a first driving power source and the first node, and configured to operate in response to a first emission control signal received through a first emission control line; a sixth transistor connected between a read-out line and the third node, and configured to operate in response to a read-out/initialization control signal received through a read-out/initialization control line; a seventh transistor connected between the third node and a first organic light-emitting diode, and configured to operate a second emission control signal received through a second emission control line; an eighth transistor connected between the third node and a second organic light-emitting diode, and configured to operate in response to a third emission control signal received through a third emission control line; a ninth transistor connected between the third node and a third organic light-emitting diode, and configured to operate in response to a fourth emission control signal received through a fourth emission control line; a capacitor connected between the first node and the second node; the first organic light-emitting diode connected between the seventh transistor and a second driving power source; the second organic light-emitting diode connected between the eighth transistor and the second driving power source; and the third organic light-emitting diode connected between the ninth transistor and the second driving power source. The scan driver is connected to the first pixel through the scan line, the read-out/initialization control line, the first emission control line, the second emission control line, the third emission control line, and the fourth emission control line. The data driver is connected to the first pixel through the data line and configured to supply a data voltage corresponding to a luminance through the data line. The read-out circuit is connected to the first pixel through the read-out line and configured to read-out electrical properties of the plurality of pixels through the read-out line.

According to another aspect of an embodiment, a display device includes: pixels arranged in rows and columns; a scan driver connected to the rows of the pixels, wherein a first row of the rows of the pixels is connected to the scan driver through a scan line, a first emission control line, a second emission control line, a third emission control line, an initialization line, and a read-out control line; a data driver connected to the columns of the pixels, wherein a first column of the columns of the pixels is connected to the scan driver through a data line; and a read-out circuit connected to the columns of the pixels and configured to read-out electrical properties of the pixels through a read-out line, wherein the first column is connected to the read-out circuit through the read-out line. A first pixel of the pixels includes: a first transistor including a first electrode connected to a first node, a second electrode connected to a third node, and a gate connected to a second node; a second transistor including a first electrode connected to the data line, a second electrode connected to the first node, and a gate connected to the scan line; a third transistor including a first electrode connected to the second node, a second electrode connected to the third node, and a gate connected to the scan line; a fourth transistor including a first electrode connected to a power node configured to supply a power supply voltage, a second electrode connected to the first node, and a gate connected to the first emission control line; a fifth transistor including a fifth electrode connected to the read-out line, a second electrode connected to the second node, and a gate connected to the initialization line; a sixth transistor including a first electrode connected to the read-out line, a second electrode connected to the third node, and a gate connected to the read-out control line; a seventh transistor including a first electrode connected to the third node, a second electrode, and a gate connected to the second emission control line; an eighth transistor including a first electrode connected to the third node, a second electrode, and a gate connected to the third emission control line; a capacitor connected between the first node and the second node; a first organic light-emitting diode connected between the second electrode of the seventh transistor and a ground node; and a second organic light-emitting diode connected between the second electrode of the eighth transistor and the ground node. A frame of the first pixel includes a first sub-frame and a second sub-frame. The first pixel is configured to perform a reset operation, a program operation, a hold operation, and an emission operation on a first organic light-emitting diode in the first sub-frame, and the first pixel is configured to perform a reset operation, a program operation, a hold operation, and an emission operation on a second organic light-emitting diode in the second sub-frame.

BRIEF DESCRIPTION OF DRAWINGS

The above and other aspects will be more clearly understood from the following description of embodiments, taken in conjunction with the accompanying drawings, in which.

DETAILED DESCRIPTION

Figure 1:
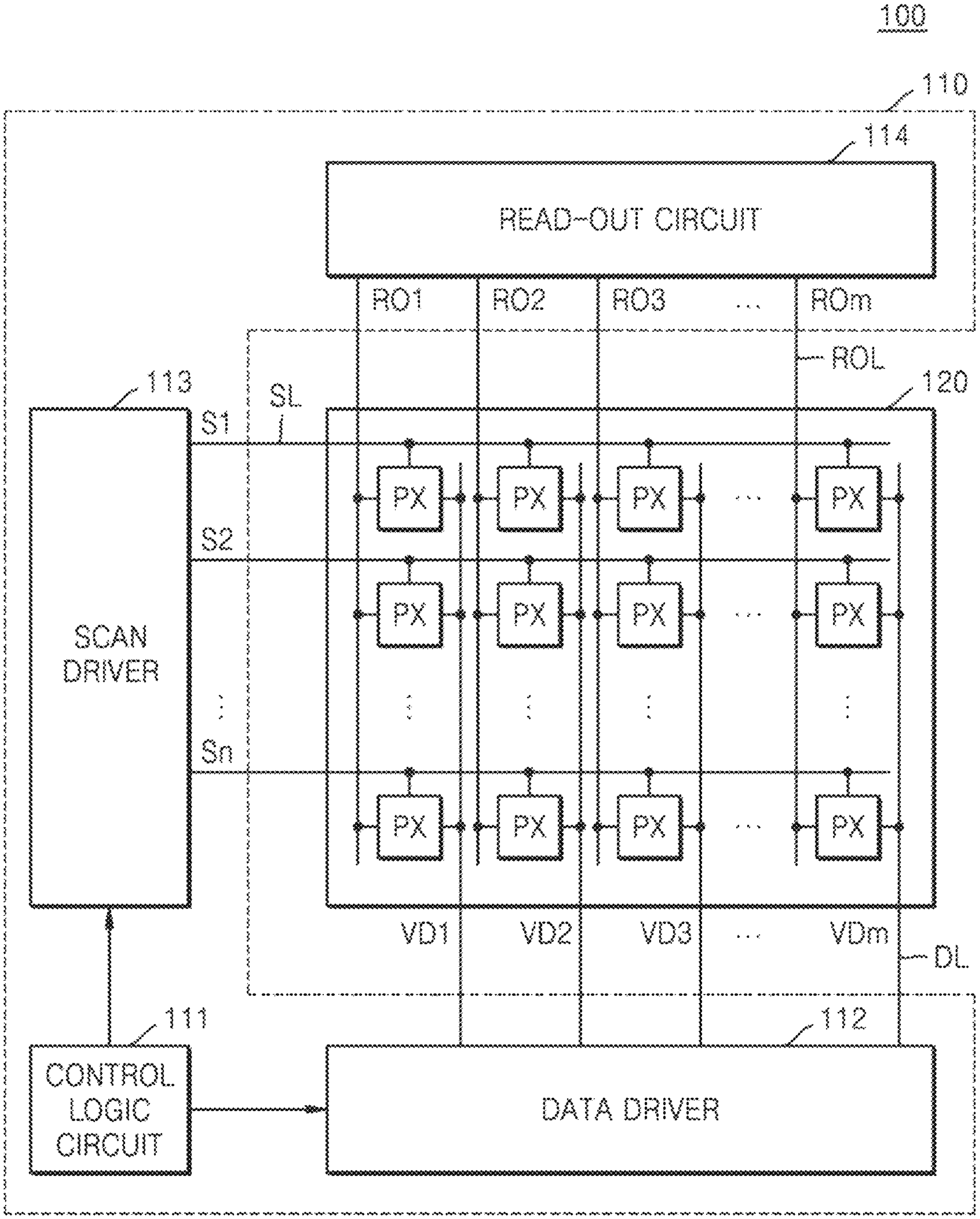
FIG. 1 is a block diagram of a display device according to an embodiment.

Hereinafter, embodiments are described in detail with reference to the accompanying drawings. Like components are denoted by like reference numerals throughout the specification, and repeated descriptions thereof are omitted. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure.

FIG. 1 is a block diagram of a display device according to an embodiment.

Referring to FIG. 1, a display device 100 may include a display driver circuit 110 (which may be referred to as a display driver integrated circuit (IC)) and a display panel 120.

In an embodiment, the display device 100 may be mounted on an electronic device with an image display function. For example, the electronic device may include smartphones, tablet personal computers (PCs), portable multimedia players (PMPs), cameras, wearable devices, televisions, digital video disk (DVD) players, refrigerators, air-conditioners, air purifiers, set-top boxes, robots, drones, various medical devices, navigation devices, augmented reality (AR) devices, virtual reality (VR) devices, global positioning system (GPS) receivers, advanced drivers assistance systems (ADAS), vehicle devices, furniture, or various measuring devices.

In an embodiment, the electronic device may include AR glasses, which are glasses-shaped devices worn by a user on the face, a head mounted display (HMD) device, a VR headset (VRH), or an AR helmet.

The display device 100 may display image data received from a host. In an embodiment the display device 100 may be a device in which the display driver circuit 110 and the display panel 120 are implemented as a single module. For example, the display driver circuit 110 may be mounted on a substrate of the display panel 120. Alternatively, the display driver circuit 110 and the display panel 120 may be electrically connected to each other by a connection member, such as a flexible printed circuit board (FPCB).

The display panel 120 may be a display unit on which an actual image is displayed. The display panel 120 may be one of various display devices (e.g., an organic light-emitting diode (OLED) display, a thin film transistor-liquid crystal display (TFT-LCD), a field emission display, and a plasma display panel (PDP), which may receive an electrically transmitted image signal and display a two-dimensional (2D) image. Hereinafter, the display panel 120 is assumed to be an OLED display panel in which each of pixels includes an organic light-emitting diode (hereinafter, referred to as an OLED). However, embodiments are not limited thereto, and the display panel 120 may be implemented as a different type of flat panel display or flexible display panel.

The display panel 120 may be connected to a scan driver 113 through pluralities of first to seventh conductive lines. For example, the plurality of first conductive lines may include a plurality of scan lines SL. The plurality of second conductive lines may include a plurality of first emission control lines. The plurality of third conductive lines may include a plurality of second emission control lines. The plurality of fourth conductive lines may include a plurality of third emission control lines. The plurality of fifth conductive lines may include a plurality of fourth emission control lines. The plurality of sixth conductive lines may include a plurality of initialization lines. The plurality of seventh conductive lines may include a plurality of read-out control lines. An example is provided above in which the display panel 120 is connected to the scan driver 113 through pluralities of first to seventh conductive lines, but embodiments are not limited thereto, and in some embodiments the display panel 120 may be connected to the scan driver 113 through different conductive lines. For example, the display panel 120 may be connected to a scan driver 113 through fewer than seven pluralities of conductive lines, or more than seven pluralities of conductive lines.

The display panel 120 may be connected to a data driver 112 through a plurality of eighth conductive lines. The plurality of eighth conductive lines may include a plurality of data lines DL. The display panel 120 may be connected to a read-out circuit 114 through a plurality of ninth conductive lines. The plurality of ninth conductive lines may include a plurality of read-out lines ROL.

The display driver circuit 110 may receive image data IDT from the host. The display driver circuit 110 may convert the image data IDT into a plurality of analog signals (e.g., a plurality of data voltages) for driving the display panel 120. The display driver circuit 110 may apply the plurality of converted analog signals to the display panel 120. Thus, an image corresponding to the image data IDT may be displayed on the display panel 120.

The display driver circuit 110 may include a control logic circuit 111, the data driver 112 (or a source driver), the scan driver 113 (or a gate driver), and a read-out circuit 114. The display driver circuit 110 may further include other components, for example, an interface circuit, a memory, a voltage generator, and a clock generator.

In an embodiment, the control logic circuit 111, the data driver 112, the scan driver 113, and the read-out circuit 114 may be integrated in one semiconductor chip. Alternatively, the control logic circuit 111, the data driver 112, and the read-out circuit 114 may be formed in one semiconductor chip, and the scan driver 113 may be formed in the display panel 120.

The control logic circuit 111 may control all operations of the display driver circuit 110 and control components (e.g., the data driver 112, the scan driver 113, and the read-out circuit 114) of the display driver circuit 110 such that the image data IDT received from the host is displayed on the display panel 120.

In addition, the control logic circuit 111 may perform image processing operations for luminance change, size change, and format change on the received image data IDT or generate data about a new image to be displayed on the display panel 120, based on the received image data IDT. To this end, the control logic circuit 111 may include Intellectual Properties (IP) blocks to process images. For example, an IP block may include circuitry to perform specific functions, and may have a design that includes a trade secret.

The control logic circuit 111 may provide a data driver control signal to the data driver 112. The control logic circuit 111 may control the data driver 112 by using the data driver control signal. The control logic circuit 111 may provide a scan driver control signal to the scan driver 113. The control logic circuit 111 may control the scan driver 113 by using the scan driver control signal. Alternatively, the control logic circuit 111 may control points in time at which the scan driver 113 operates, by using a timing signal.

The data driver 112 may be connected to columns of pixels PX through the plurality of data lines DL. The data driver 112 may receive image data from the control logic circuit 111. Image data may be information on a brightness (or luminance) of pixels in one row. The data driver 112 may convert the received image data into a plurality of image signals, for example, a plurality of data voltages VD1 to VDm. The data driver 112 may output the plurality of data voltages VD1 to VDm to the display panel 120 through the plurality of data lines DL.

The data driver 112 may receive image data in units of line data, that is, in data units corresponding to a plurality of pixels included in one horizontal line of a display panel. The data driver 112 may convert line data received from the control logic circuit 111 into the plurality of data voltages VD1 to VDm (m is an integer of 2 or more). The data driver 112 may provide the plurality of data voltages VD1 to VDm corresponding to a luminance to the display panel 120 through the plurality of data lines DL.

The scan driver 113 may be connected to a plurality of control lines. In an embodiment, the scan driver 113 may be connected to rows of the pixels PX through the plurality of control lines. The plurality of control lines may include the plurality of scan lines SL, the plurality of first emission control lines, the plurality of second emission control lines, the plurality of third emission control lines, the plurality of fourth emission control lines, and the plurality of initialization lines, and the plurality of read-out control lines.

The scan driver 113 may receive the scan driver control signal from the control logic circuit 111. In response to the scan driver control signal received from the control logic circuit 111, the scan driver 113 may output a plurality of control signals to the display panel 120 through the plurality of control lines. For example, the scan driver 113 may be connected to the plurality of scan lines SL of the display panel 120 and sequentially drive (or select) the plurality of scan lines SL of the display panel 120.

The scan driver 113 may sequentially provide scan signals S1 to Sn (n is a positive integer of 2 or more) having an active level (e.g., logic-low) to the plurality of scan lines SL under control by the control logic circuit 111. Accordingly, the plurality of scan lines SL may be sequentially selected, and the plurality of data voltages VD1 to VDm may be applied to a plurality of pixels PX connected to the selected scan line SL.

In an embodiment, the scan driver 113 may provide the plurality of control signals to the pixel PX. The plurality of control signals may include a scan signal, a first emission control signal, a second emission control signal, a third emission control signal, a fourth emission control signal, an initialization signal, and a read-out control signal. For example, the scan driver 113 may provide a scan line to the pixel PX through the scan line SL. The scan driver 113 may provide the first emission control signal to the pixel PX through a first emission control line. The scan driver 113 may provide a second emission control signal to the pixel PX through a second emission control line. The scan driver 113 may provide a third emission control signal to the pixel PX through a third emission control line. The scan driver 113 may provide a fourth emission control signal to the pixel PX through a fourth emission control line. The scan driver 113 may provide an initialization signal to the pixel PX through an initialization line. The scan driver 113 may provide a read-out control signal to the pixel PX through the read-out control line.

The read-out circuit 114 may be connected to the columns of the pixels PX through the plurality of read-out lines ROL. For example, the read-out circuit 114 may be connected to the plurality of read-out lines ROL. The read-out circuit 114 may receive a plurality of read-out signals RO1 to ROm from the display panel 120 through the plurality of read-out lines ROL. In an embodiment, the read-out circuit 114 may include an amplifier, a sample/hold circuit, and an analog-to-digital converter (ADC).

In an embodiment, the read-out circuit 114 may read-out (or sense) electrical properties of each of a plurality of pixels PX. The read-out circuit 114 may receive the plurality of read-out signals RO1 to ROm through the plurality of read-out lines ROL. The plurality of read-out signals RO1 to ROm may exhibit electrical properties of a pixel PX connected to the plurality of read-out lines ROL. The read-out circuit 114 may receive the read-out signals RO1 to ROm corresponding to a selected pixel PX and perform an analog-to-digital conversion (ADC) operation on the read-out signals RO1 to Rom to generate read-out data. The read-out circuit 114 may provide the generated read-out data to the control logic circuit 111.

For example, the read-out circuit 114 may detect a driving current of each of the plurality of pixels PX. The read-out circuit 114 may detect a threshold voltage of each of the plurality of pixels PX. The read-out circuit 114 may detect a forward voltage of each of the plurality of pixels PX.

The read-out circuit 114 may measure a magnitude of the driving current of each of the plurality of pixels PX. The read-out circuit 114 may measure a magnitude of the threshold voltage of each of the plurality of pixels PX. The read-out circuit 114 may measure a magnitude of the forward voltage of each of the plurality of pixels PX.

The display panel 120 may include the pixels PX arranged in rows and columns. The display panel 120 may include the plurality of data lines DL, the plurality of scan lines SL, and the plurality of pixels PX arranged between the plurality of data lines DL and the plurality of scan lines SL. Each of the plurality of pixels PX may be connected to the scan line SL corresponding thereto and a data line DL.

The rows of the pixels PX may be connected to the plurality of control lines. Each of the plurality of pixels PX may be connected to a scan line, a first emission control line, a second emission control line, a third emission control line, a fourth emission control line, an initialization line, and a read-out control line. Each of the plurality of pixels PX may receive the plurality of control signals (e.g., first to seventh control signals) from the scan driver 113 through the plurality of control lines. For example, the first control signal may include a scan signal, the second control signal may include a first emission control signal, the third control signal may include a second emission control signal, the fourth control signal may include a third emission control signal, the fifth control signal may include a fourth emission control signal, the sixth control signal may include an initialization signal, and the seventh control signal may include a read-out control signal.

Each of the plurality of pixels PX may receive the scan signal through the scan line SL. Each of the plurality of pixels PX may receive the first emission control signal through the emission control line, receive the second emission control signal through the second emission control line, receive the third emission control signal through the third emission control line, receive the fourth emission control signal through the fourth emission control line, receive the initialization signal through the initialization line, and receive the read-out control signal through the read-out control line.

In an embodiment, the display panel 120 may be connected to the plurality of read-out lines ROL. The display panel 120 may provide the plurality of read-out signals RO1 to ROm to the read-out circuit 114 through the plurality of read-out lines ROL.

Each of the pixels PX may adjust a brightness thereof in response to control signals corresponding thereto. For example, each of the pixels PX may be selected in response to a corresponding one of a plurality of scan signals S1 to Sn. The selected one of the pixels PX may emit light based on a corresponding one of the plurality of data voltages VD1 to VDm. Each of the pixels PX may include a light-emitting element (e.g., an OLED) and transistors configured to control the light-emitting element.

In an embodiment, each of the pixels PX may include a plurality of OLEDs. For example, each of the pixels PX may include three OLEDs, but embodiments are not limited thereto. The number of OLEDs included in the pixel PX may decrease or increase depending on implementation. Each of the pixels PX may drive a plurality of OLEDs through time multiplexing.

Each of the pixels PX may output light of a preset color, and at least two pixels (e.g., red, blue, and green pixels), which are adjacent to each other in the same line or adjacent lines and output light of different colors, may constitute one unit pixel. In this case, at least two pixels PX included in the unit pixel may be referred to as sub-pixels. The display panel 120 may have an RGB structure in which red, blue, and green pixels constitute one unit pixel. However, embodiments are not limited thereto, and the display panel 120 may have an RGBW structure in which the unit pixel further includes a white pixel to improve luminance. Alternatively, the unit pixel of the display panel 120 may include a combination of pixels of colors other than red, green, and blue.

The display panel 120 may be an OLED display panel in which each of the plurality of pixels PX includes an OLED. However, embodiments are not limited thereto, and the display panel 120 may be implemented as a different type of flat panel display or flexible display panel.

Figure 2:
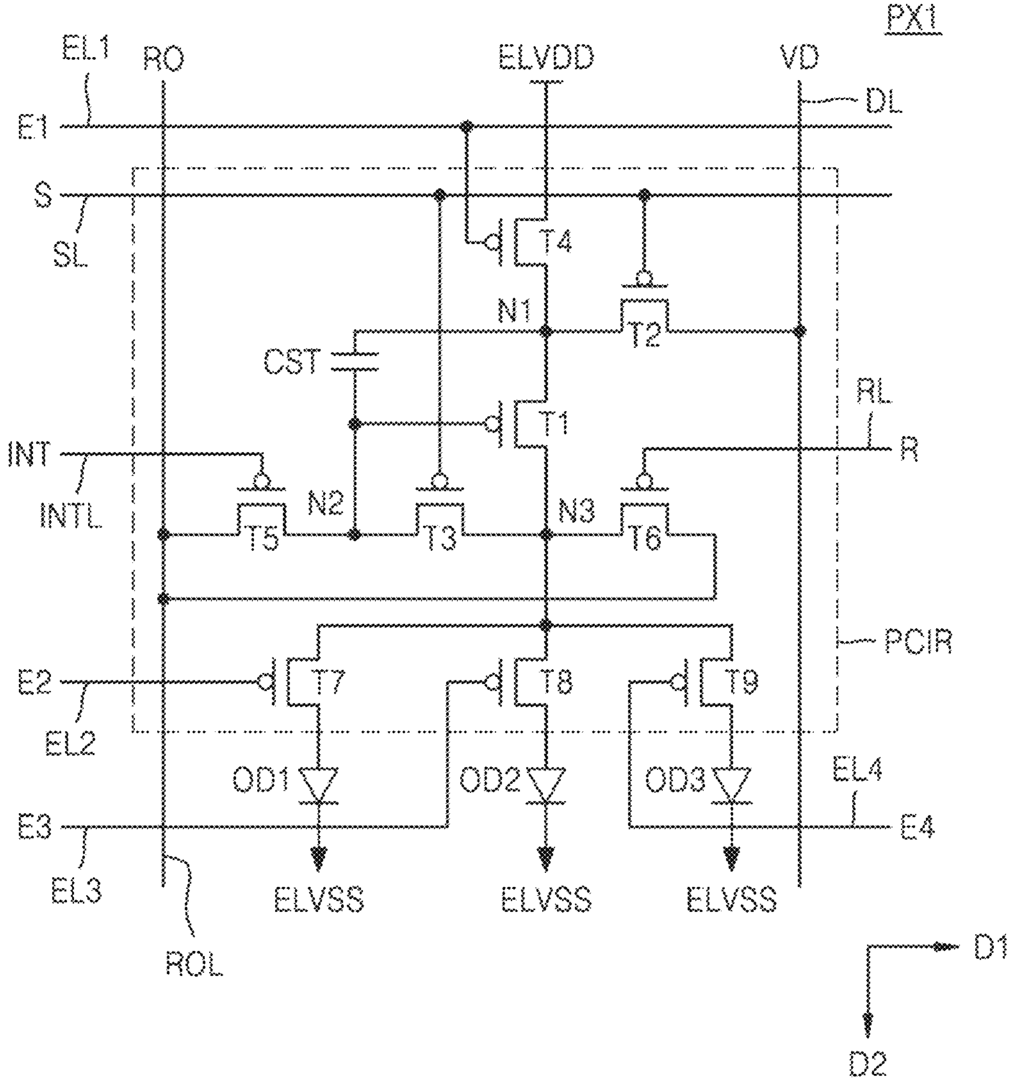
FIG. 2 is a circuit diagram of an example of a pixel according to an embodiment.

FIG. 2 is a circuit diagram of an example of a pixel according to an embodiment. A pixel PX1 of FIG. 2 may be applied to the display device 100 of FIG. 1. Each pixel PX of FIG. 1 may include the pixel PX1 of FIG. 2.

Referring to FIGS. 1 and 2, the pixel PX1 may include a first OLED OD1, a second OLED OD2, a third OLED OD3, and a pixel circuit PCIR. The pixel PX1 may include a scan line SL extending in a first direction D1, a first emission control line EL1*c* extending in the first direction D1, a second emission control line EL2 extending in the first direction D1, a third emission control line EL3 extending in the first direction D1, a fourth emission control line EL4 extending in the first direction D1, an initialization line INTL extending in the first direction D1, a read-out control line RL extending in the first direction D1, a data line DL extending in a second direction D2 that intersects with the first direction D1, a read-out line ROL, first to ninth transistors T1 to T9, a storage capacitor CST, and the first to third OLEDs OD1 to OD3. That is, the pixel PX1 may include three OLEDs, nine transistors, seven control lines extending in the first direction D1 (i.e., the scan line SL, the first emission control line EL1, the second emission control line EL2, the third emission control line EL3, the fourth emission control line EL4, the initialization line INTL, and the read-out control line RL), and two lines extending in the second direction D2 (i.e., the data line DL and the read-out line ROL). For example, the first direction D1 may be an X-axis direction, and the second direction D2 may be a Y-axis direction.

An anode electrode of each of the first to third OLEDs OD1, OD2, and OD3 may be connected to the pixel circuit PCIR, and a cathode electrode of each of the first to third OLEDs OD1, OD2, and OD3 may be connected to a second driving power source ELVSS (or a ground node to which a ground voltage is applied). The first to third OLEDs OD1, OD2, and OD3 may emit light with a luminance corresponding to the amount of current supplied from the pixel circuit PCIR. A brightness of the first to third OLEDs OD1, OD2, and OD3 may be controlled by a voltage (i.e., a data voltage VD) of the data line DL. For example, the first OLED OD1 may output red light, the second OLED OD2 may output blue light, and the third OLED OD3 may output green light.

In response to the data voltage VD, the pixel circuit PCIR may control the amount of current flowing from a first driving power source ELVDD to the second driving power source ELVSS via each of the first to third OLEDs OD1, OD2, and OD3. The pixel circuit PCIR may include first to ninth transistors T1 to T9 and a storage capacitor CST. At least one of the first to ninth transistors T1 to T9 may be implemented as an oxide semiconductor thin-film transistor (TFT) including an active layer including an oxide semiconductor, a low-temperature polysilicon (LTPS) TFT including an active layer including polysilicon, or a metal oxide semiconductor field effect transistor (MOSFET). In an embodiment, at least one of the first to ninth transistors T1 to T9 may be formed as a P-type transistor. In some embodiments, each of the first to ninth transistors T1 to T9 may be formed as a P-type transistor. However, embodiments are not limited thereto, and at least one of the first to ninth transistors T1 to T9 may be formed as an N-type transistor. In some embodiments, each of the first to ninth transistors T1 to T9 may be formed as an N-type transistor.

The first transistor T1 may be referred to as a driving transistor, and may be connected between the first node N1 and the third node N3 and operate in response to a voltage of the second node N2. A first electrode (or a first terminal) of the first transistor T1 may be connected to the first node N1, and a second electrode (or a second terminal) of the first transistor T1 may be connected to the third node N3. A gate electrode (or a gate) of the first transistor T1 may be connected to the second node N2. In response to a voltage of the second node N2, the first transistor T1 may control the amount of current flowing from the first driving power source ELVDD to the second driving power source ELVSS via each of the first to third OLEDs OD1, OD2, and OD3.

The second transistor T2 (or a selection transistor) may be connected between the data line DL and the first node N1 and operate in response to a scan signal S. A first electrode of the second transistor T2 may be connected to the data line DL, and a second electrode of the second transistor T2 may be connected to the first node N1. A gate electrode of the second transistor T2 may be connected to the scan line SL. In response to the scan signal S that is provided at an active level through the scan line SL, the second transistor T2 may be turned on. The second transistor T2 may be turned on, and thus, the first node N1 may be electrically connected to the data line DL.

The third transistor T3 may be connected between the second node N2 and the third node N3 and operate in response to the scan signal S. A first electrode of the third transistor T3 may be connected to the second node N2, and a second electrode of the third transistor T3 may be connected to the third node N3. A gate electrode of the third transistor T3 may be connected to the scan line SL. In response to the scan signal S that is provided at an active level through the scan line SL, the third transistor T3 may be turned on. The third transistor T3 may be turned on, and thus, the second node N2 may be electrically connected to the third node N3. That is, the third transistor T3 may be diode-connected to the first transistor T1.

The fourth transistor T4 may be connected between the first driving power source ELVDD and the first node N1 and operate in response to a first emission control signal E1. A first electrode of the fourth transistor T4 may be connected to the first driving power source ELVDD (or a power node to which a power supply voltage is supplied), and a second electrode of the fourth transistor T4 may be connected to the first node N1. A gate electrode of the fourth transistor T4 may be connected to the first emission control line EL1. In response to the first emission control signal E1 that is provided at an active level through the first emission control line EL1, the fourth transistor T4 may be turned on. The fourth transistor T4 may be turned on, and thus, a voltage of the first driving power source ELVDD may be provided (or supplied) to the first node N1.

The fifth transistor T5 may be connected between the read-out line ROL and the second node N2 and operate in response to an initialization signal INT. A first electrode of the fifth transistor T5 may be connected to the read-out line ROL, and a second electrode of the fifth transistor T5 may be connected to the second node N2. A gate electrode of the fifth transistor T5 may be connected to the initialization line INTL. In response to the initialization signal INT that is provided at an active level through the initialization line INTL, the fifth transistor T5 may be turned on. The fifth transistor T5 may be turned on, and thus, a voltage of an initialization power source VINT may be provided to the second node N2.

The sixth transistor T6 may be connected between the read-out line ROL and the third node N3 and operate in response to a read-out control signal R. A first electrode of the sixth transistor T6 may be connected to the read-out line ROL, and a second electrode of the sixth transistor T6 may be connected to the third node N3. A gate electrode of the sixth transistor T6 may be connected to the read-out control line RL. In response to the read-out control signal R that is provided at an active level through the read-out control line RL, the sixth transistor T6 may be turned on. The sixth transistor T6 may be turned on, and thus, the third node N3 may be electrically connected to the read-out line ROL.

The seventh transistor T7 may be connected between the third node N3 and the first OLED OD1 and operate in response to a second emission control signal E2. A first electrode of the seventh transistor T7 may be connected to the third node N3, and a second electrode of the seventh transistor T7 may be connected to the anode electrode of the first OLED OD1. A gate electrode of the seventh transistor T7 may be connected to the second emission control line EL2. In response to the second emission control signal E2 that is provided at an active level through the second emission control line EL2, the seventh transistor T7 may be turned on. The seventh transistor T7 may be turned on, and thus, the third node N3 may be electrically connected to the anode electrode of the first OLED OD1.

The eighth transistor T8 may be connected between the third node N3 and the second OLED OD2 and operate in response to a third emission control signal E3. A first electrode of the eighth transistor T8 may be connected to the third node N3, and a second electrode of the eighth transistor T8 may be connected to the anode electrode of the second OLED OD2. A gate electrode of the eighth transistor T8 may be connected to the third emission control line EL3. In response to the third emission control signal E3 that is provided at an active level through the third emission control line EL3, the eighth transistor T8 may be turned on. The eighth transistor T8 may be turned on, and thus, the third node N3 may be electrically connected to the anode electrode of the second OLED OD2.

The ninth transistor T9 may be connected between the third node N3 and the third OLED OD3 and operate in response to a fourth emission control signal E4. A first electrode of the ninth transistor T9 may be connected to the third node N3, and a second electrode of the ninth transistor T9 may be connected to the anode electrode of the third OLED OD3. A gate electrode of the ninth transistor T9 may be connected to the fourth emission control line EL4. In response to the fourth emission control signal E4 that is provided at an active level through the fourth emission control line EL4, the ninth transistor T9 may be turned on. The ninth transistor T9 may be turned on, and thus, the third node N3 may be electrically connected to the anode electrode of the third OLED OD3. The storage capacitor CST may be connected between the first node N1 and the second node N2.

In an embodiment, the pixel PX1 may be time-multiplexed, and one frame may be divided into a plurality of sub-frames. The number of sub-frames may be equal to the number of OLEDs included in the pixel PX1. For example, one frame may include three sub-frames. Each of the sub-frames may include a reset section, a program section, a hold section, and an emission section. A first sub-frame may correspond to the first OLED OD1, a second sub-frame may correspond to the second OLED OD2, and a third sub-frame may correspond to the third OLED OD3. For example, the pixel PX1 may perform operations of making the first OLED OD1 emit light in the first sub-frame, perform operations of making the second OLED OD2 emit light in the second sub-frame, and perform operations of making the third OLED OD3 emit light in the third sub-frame.

In an embodiment, the pixel PX1 may perform a reset operation in the reset section. In the reset section, a voltage of the initialization power source VINT may be applied to the third node N3 through the read-out line ROL. After the reset section, in the program section, the pixel PX1 may perform a program operation. In the program section, the data voltage VD may be applied to the first node N1 through the data line DL. After the program section, in a hold section, the pixel PX1 may perform a hold operation. In the hold section, the second to ninth transistors T2 to T9 may be all turned off. After the hold section, in the emission section, the pixel PX1 may perform an emission operation.

In an embodiment, the emission section may include first to third emission sections. In the first emission section, the pixel PX1 may perform a first emission operation. In the second emission section, the pixel PX1 may perform a second emission operation. In the third emission section, the pixel PX1 may perform a third emission operation. In the first emission section, the fourth transistor T4 and the seventh transistor T7 may be turned on, and thus, a driving current ID may be supplied to the first OLED OD1, and the first OLED OD1 may emit light with a luminance corresponding to the driving current ID. In the second emission section, the fourth transistor T4 and the eighth transistor T8 may be turned on, and thus, a driving current ID may be supplied to the second OLED OD2, and the second OLED OD2 may emit light with a luminance corresponding to the driving current ID. In the third emission section, the fourth transistor T4 and the ninth transistor T9 may be turned on, and thus, a driving current ID may be supplied to the third OLED OD3, and the third OLED OD3 may emit light with a luminance corresponding to the driving current ID.

In an embodiment, a voltage of the first driving power source ELVDD may be higher than a voltage of the second driving power source ELVSS. The voltage of the initialization power source VINT may be less than a voltage reduced from the voltage of the first driving power source ELVDD by a threshold voltage VTH of the first transistor T1. That is, a voltage of the initialization power source VINT may be expressed as in Equation 1:

$$VINT < ELVDD - VTH \quad \text{[Equation 1]}$$

In an embodiment, the pixel PX1 may include a first parasitic capacitor between the gate of the second transistor T2 and the second electrode (i.e., the first node N1) of the second transistor T2. The pixel PX1 may include a second parasitic capacitor between the gate of the third transistor T3 and the first electrode (i.e., the second node N2) of the third transistor T3. A range of the data voltage VD may increase according to the first and second parasitic capacitors.

The pixel PX1 may expand a range of the data voltage VD, which has been reduced for a small area and high resolution, by using the first parasitic capacitor, the second parasitic capacitor, and a storage capacitor CST. Accordingly, the display device 100 may easily adjust a brightness of pixels.

In the pixel PX1 according to an embodiment, the fourth transistor T4, the seventh transistor T7, the eighth transistor T8, and the ninth transistor T9 may independently operate. A scan driver 113 may independently control the fourth transistor T4, the seventh transistor T7, the eighth transistor T8, and the ninth transistor T9. A gate of the fourth transistor T4 may be connected to the first emission control line EL1, a gate of the seventh transistor T7 may be connected to the second emission control line EL2, a gate of the eighth transistor T8 may be connected to the third emission control line EL3, and a gate of the ninth transistor T9 may be connected to the fourth emission control line EL4.

The fourth transistor T4 may operate in response to the first emission control signal E1, the seventh transistor T7 may operate in response to a second emission control signal E2, the eighth transistor T8 may operate in response to the third emission control signal E3, and the ninth transistor T9 may operate in response to the fourth emission control signal E4. The second emission control signal E2 may be different from the first emission control signal E1, the third emission control signal E3 may be different from the first emission control signal E1, the third emission control signal E3 may be different from the second emission control signal E2, the fourth emission control signal E4 may be different from the first emission control signal E1, the fourth emission control signal E4 may be different from the second emission control signal E2, and the fourth emission control signal E4 may be different from the third emission control signal E3. The scan driver 113 may independently control each of the first emission control signal E1, the second emission control signal E2, the third emission control signal E3, and the fourth emission control signal E4. Accordingly, the display device 100 may implement pulse width modulation (PWM) by adjusting an emission time of the first, second and third OLEDs OD1, OD2 and OD3. A detailed description of PWM is provided with reference to FIGS. 25A to 25C.

In the pixel PX1 according to an embodiment, the sixth transistor T6 may provide the read-out signal RO to the read-out circuit (refer to 114 in FIG. 1). In response to the read-out control signal R, the pixel PX1 may output the read-out signal RO to the read-out line ROL. That is, the pixel PX1 may perform a read-out operation in a read-out section.

The read-out operation may be an operation of testing electrical properties of a pixel. The display device 100 may perform the read-out operation in a test operation of a manufacturing process. Alternatively, the read-out operation may be used to measure a degree of degradation of pixels over time while the display device 100 is in use, and to compensate for the degradation.

In an embodiment, the read-out circuit 114 may detect a driving current, a threshold voltage, or a forward voltage. The read-out section may include first to fifth read-out sections RO1 to RO5. The first read-out section RO1 may be a section for measuring the driving current ID, the second read-out section RO2 may be a section for measuring a threshold voltage VTH, the third read-out section RO3 may be a section for measuring a forward voltage VF of the first OLED OD1, the fourth read-out section RO4 may be a section for measuring a forward voltage VF of the second OLED OD2, and the fifth read-out section RO5 may be a section for measuring a forward voltage VF of the third OLED OD3. Detailed descriptions of the read-out operation and the read-out section are provided below.

The pixel PX1 may include a plurality of OLEDs. The pixel circuit PCIR may drive a plurality of OLEDs. Thus, as compared to a pixel circuit configured to drive one OLED, the number of transistors may be reduced. Therefore, a display device with a small area and high resolution may be provided.

In an embodiment, a size of the first transistor T1 may be increased. That is, because the number of transistors is reduced, a width/length (W/L) size of the first transistor T1 may be increased when implemented to have the same area. Therefore, mismatch performance may improve.

As described above, the display device 100 according to an embodiment may expand a range of data voltage and easily adjust a brightness of pixels. The display device 100 may control dimming by a pulse-amplitude-modulation (PAM) scheme and a PWM scheme, and improve brightness expression (or a gray level). The display device 100 may measure a driving current, a threshold voltage, or a forward voltage on a wafer or package level through an ensured design for testability (DFT) path, and embody DFT. By sharing the pixel circuit PCIR among the plurality of OLEDs, a display device with a small area and high resolution may be provided.

Figure 3A:
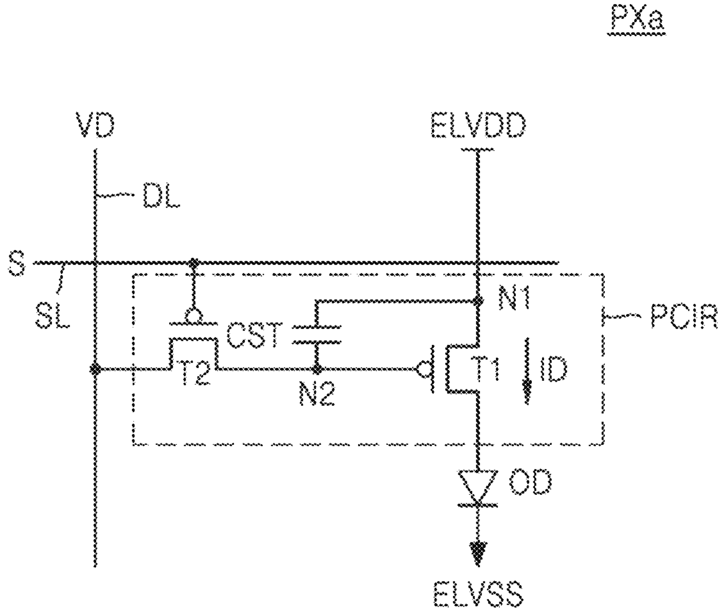
FIG. 3A is a circuit diagram of an embodied example of a pixel.

FIG. 3A is a circuit diagram of an embodied example of a pixel.

Referring to FIG. 3, a pixel PXa may include an OLED OD and a pixel circuit PCIR. An anode electrode of the OLED OD may be connected to the pixel circuit PCIR, and a cathode electrode of the OLED OD may be connected to a second driving power source ELVSS. The OLED OD may emit light with a luminance corresponding to the amount of current supplied from the pixel circuit PCIR.

In response to a data voltage VD, the pixel circuit PCIR may control the amount of current flowing from a first driving power source ELVDD to the second driving power source ELVSS via the OLED OD. The pixel circuit PCIR may include a first transistor T1, the second transistor T2, and a storage capacitor CST.

A first electrode of the first transistor T1 may be connected to the first driving power source ELVDD, and a second electrode of the first transistor T1 may be connected to the anode electrode of the OLED OD. A gate electrode of the first transistor T1 may be connected to the second node N2. In response to a voltage of the second node N2, the first transistor T1 may control the amount of current flowing from the first driving power source ELVDD to the second driving power source ELVSS via the OLED OD.

A first electrode of the second transistor T2 may be connected to a data line DL, and a second electrode of the second transistor T2 may be connected to the second node N2. A gate electrode of the second transistor T2 may be connected to a scan line SL. The storage capacitor CST may be connected between the first node N1 and the second node N2.

A scan signal (i.e., a scan signal S that is at an active level) may be applied through the scan line SL. The second transistor T2 may be turned on in response to the scan signal S that is at an active level. The second transistor T2 may be turned on and provide the data voltage VD provided through the data line DL to the second node N2. The first transistor T1 may provide a driving current ID to the OLED OD in response to the data voltage VD.

Figure 3B:
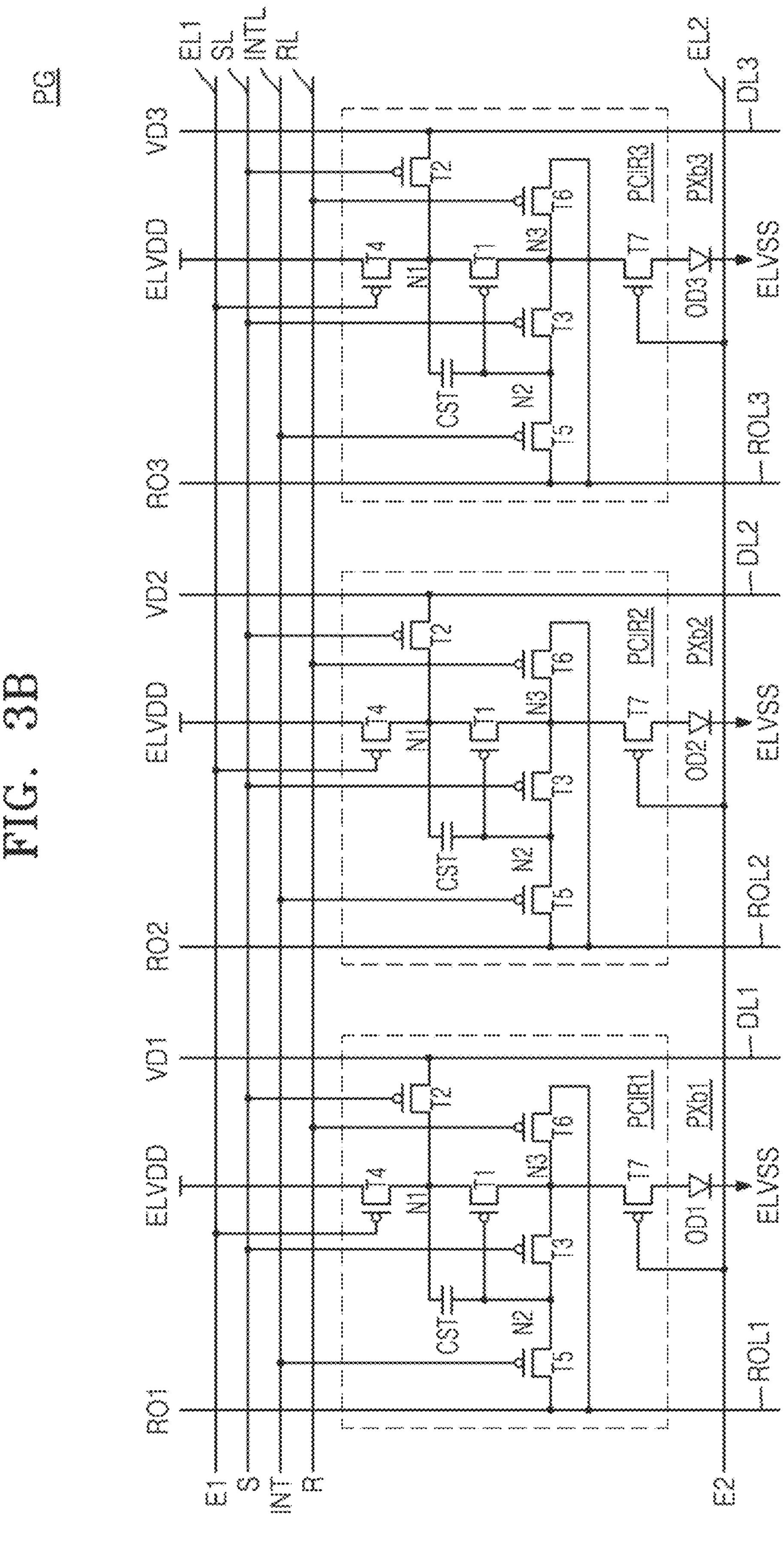
FIG. 3B is a circuit diagram of an embodied example of a pixel group.

FIG. 3B is a circuit diagram of an embodied example of a pixel group.

Referring to FIG. 3B, a pixel group PG may include a plurality of pixels (e.g., PXb1, PXb2, and PXb3). A first pixel PXb1 may include a first pixel circuit PCIR1 and a first OLED OD1, a second pixel PXb2 may include a second pixel circuit PCIR2 and a second OLED OD2, and a third pixel PXb3 may include a third pixel circuit PCIR3 and a third OLED OD3. A configuration of the first pixel PXb1 will now be described. The descriptions below may be also applied to the second and third pixels PXb2 and PXb3.

The first pixel PXb1 may include the first OLED OD1 and the first pixel circuit PCIR1. The first pixel PXb1 may include a scan line SL, a first emission control line EL1, a second emission control line EL2, an initialization line INTL, a read-out control line RL, a data line DL, a read-out line ROL, first to seventh transistors T1 to T7, a storage capacitor CST, and the first OLED OD. The first pixel PXb1 may include seven transistors, five control lines extending in a first direction (i.e., the scan line SL, the first emission control line EL1, the second emission control line EL2, the initialization line INTL, and the read-out control line RL), and two lines extending in a second direction (i.e., the data line DL and the read-out line ROL).

An anode electrode of the first OLED OD1 may be connected to the first pixel circuit PCIR1, and a cathode electrode of the first OLED OD1 may be connected to a second driving power source ELVSS. The first OLED OD1 may emit light with a luminance corresponding to the amount of current supplied from the first pixel circuit PCIR1. A brightness of the first OLED OD1 may be controlled by a voltage (i.e., a data voltage VD) of a first data line DL1.

In response to a first data voltage VD1, the first pixel circuit PCIR1 may control the amount of current flowing from a first driving power source ELVDD to the second driving power source ELVSS via the first OLED OD1. The first pixel circuit PCIR1 may include the first to seventh transistors T1 to T7 and a storage capacitor CST.

The first transistor T1 may be connected between the first node N1 and the third node N3 and operate in response to a voltage of the second node N2. In response to the voltage of the second node N2, the first transistor T1 may control the amount of current flowing from the first driving power source ELVDD to the second driving power source ELVSS via the first OLED OD1.

The second transistor T2 may be connected between the first data line DL1 and the first node N1 and operate in response to a scan signal S. In response to the scan signal S that is provided at an active level through the scan line SL, the second transistor T2 may be turned on. The second transistor T2 may be turned on, and thus, the first node N1 may be electrically connected to the first data line DL1.

The third transistor T3 may be connected between the second node N2 and the third node N3 and operate in response to the scan signal S. In response to the scan signal S that is provided at an active level through the scan line SL, the third transistor T3 may be turned on. The third transistor T3 may be turned on, and thus, the second node N2 may be electrically connected to the third node N3. That is, the third transistor T3 may be diode-connected to the first transistor T1.

The fourth transistor T4 may be connected between the first driving power source ELVDD and the first node N1 and operate in response to a first emission control signal E1. In response to the first emission control signal E1 that is provided at an active level through the first emission control line EL1, the fourth transistor T4 may be turned on. The fourth transistor T4 may be turned on, and thus, a voltage of the first driving power source ELVDD may be provided to the first node N1.

The fifth transistor T5 may be connected between a first read-out line ROL1 and the second node N2 and operate in response to an initialization signal INT. In response to the initialization signal INT that is provided at an active level through the initialization line INTL, the fifth transistor T5 may be turned on. The fifth transistor T5 may be turned on, and thus, a voltage of an initialization power source VINT may be provided to the second node N2.

The sixth transistor T6 may be connected between the first read-out line ROL and the third node N3 and operate in response to a read-out control signal R. In response to the read-out control signal R that is provided at an active level through the read-out control line RL, the sixth transistor T6 may be turned on. The sixth transistor T6 may be turned on, and thus, the third node N3 may be electrically connected to the first read-out line ROL1. The storage capacitor CST may be connected between the first node N1 and the second node N2.

The seventh transistor T7 may be connected between the third node N3 and the first OLED OD1 and operate in response to a second emission control signal E2. In response to the second emission control signal E2 that is provided at an active level through the second emission control line EL2, the seventh transistor T7 may be turned on. The seventh transistor T7 may be turned on, and thus, the third node N3 may be electrically connected to an anode electrode of the first OLED OD1.

The pixel PX1 of FIG. 2 may further include an OLED and a transistor as compared to the first pixel PXb1. As compared to the first pixel PXb1, the pixel PX1 of FIG. 2 may further include a plurality of OLEDs (e.g., OD2 and OD3), and a plurality of transistor (e.g., T8 and T9). Each of an eighth transistor T8 and a ninth transistor T9 may be connected between an OLED corresponding thereto and the third node N3. For example, the eighth transistor T8 of FIG. 2 may be connected between the third node N3 and the second OLED OD2, and the ninth transistor T9 of FIG. 2 may be connected between the third node N3 and the third OLED OD3.

The first pixel PXb1 may include an OLED, and the pixel PX1 of FIG. 2 may include a plurality of OLEDs (e.g., OD1, OD2, and OD3). For example, the pixel PX1 may include OLEDs. The pixel group PG may include first to third OLEDs OD1 to OD3. The pixel group PG may drive the first to third OLEDs OD1 to OD3 by using the first to third pixel circuits PCIR1 to PCIR3. That is, three pixel circuits may be needed to drive three OLEDs. Because each of the first to third pixel circuits PCIR1 to PCIR3 of FIG. 3B includes a total of seven transistors, a total of 21 transistors may be required to drive the first to third OLEDs OD1 to OD3. In contrast, the pixel PX1 of FIG. 2 may drive the first to third OLEDs OD1 to OD3 by using a pixel circuit PCIR. That is, one circuit may be needed to drive three OLEDs. Because the pixel circuit PCIR of the pixel PX1 includes a total of nine transistors, a total of nine transistors may be required to drive the first to third OLEDs OD1 to OD3. In a display device according to embodiments, the number of transistors required for the same number of OLEDs to emit light may be reduced, and thus, sizes of pixels may be reduced. Therefore, a display device with a small area and high resolution may be provided.

Figure 4:
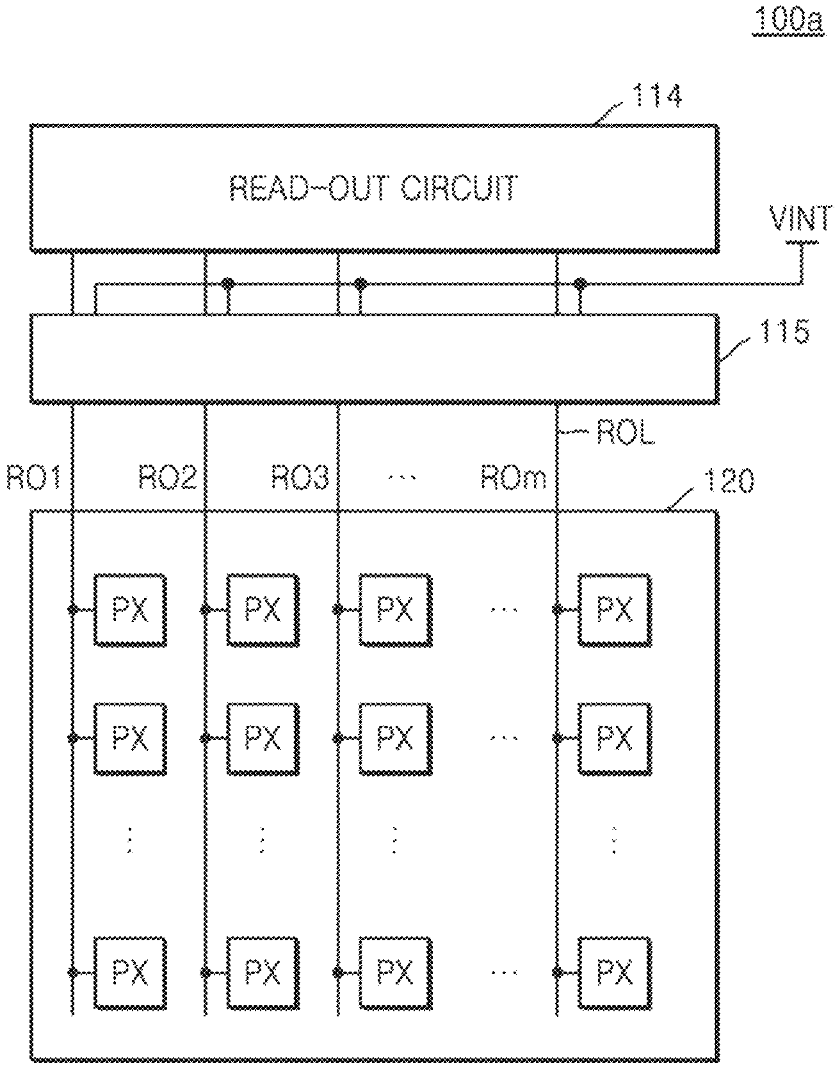
FIG. 4 is a block diagram of a display device according to an embodiment.

FIG. 4 is a block diagram of a display device according to an embodiment.

Referring to FIG. 4, a display device 100*a* may include a read-out circuit 114, a selection circuit 115, and a display panel 120. For brevity, only the read-out circuit 114, the selection circuit 115, and the display panel 120 are illustrated in FIG. 4. However, embodiments are not limited thereto and the display device 100*a* may further include other components, for example, the control logic circuit 111, the data driver 112, and the scan driver 113 of the display device 100*a* of FIG. 1.

Referring to FIGS. 1, 2, and 4, the display driver circuit 110 of FIG. 1 may further include a selection circuit 115. The selection circuit 115 may connect a read-out line ROL to an initialization power source VINT or connect the read-out line ROL to the read-out circuit 114. That is, the selection circuit 115 may connect the read-out line ROL to any one of the initialization power source VINT and the read-out circuit 114.

In a reset section, the selection circuit 115 may be electrically connected to the read-out line ROL and the initialization power source VINT. In the reset section, the selection circuit 115 may provide a voltage of the initialization power source VINT to a pixel PX through the read-out line ROL.

In a read-out section, the selection circuit 115 may be electrically connected to the read-out line ROL and the read-out circuit 114. In the read-out section, the selection circuit 115 may transmit a plurality of read-out signals RO1 to ROm received through a plurality of read-out lines ROL to the read-out circuit 114.

Figure 5:
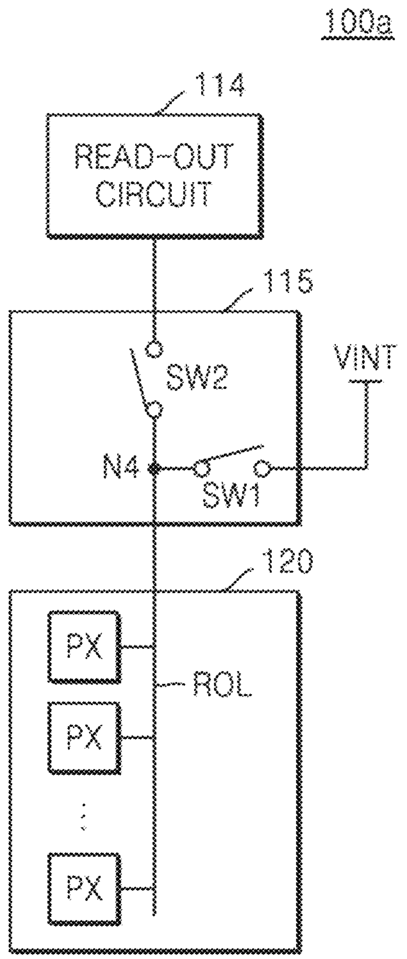
FIG. 5 is a block diagram of a display device according to an embodiment.

FIG. 5 is a block diagram of a display device according to an embodiment.

For brevity, only pixels in one column are illustrated, and a read-out circuit 114, a selection circuit 115, and a display panel 120 are illustrated in FIG. 5. A display device 100*a* may further include other components, for example, the control logic circuit 111, the data driver 112, and the scan driver 113 of the display device 100*a* of FIG. 1.

A first switch SW1 may be connected between the fourth node N4 and an initialization power source VINT. The first switch SW1 may be connected between a read-out line ROL and an initialization power node to which an initialization voltage is applied. A second switch SW2 may be connected between the fourth node N4 and the read-out circuit 114. The second switch SW2 may be connected between the read-out line ROL and the read-out circuit 114. Pixels PX may be connected to the fourth node N4 through the read-out line ROL corresponding thereto.

In an embodiment, the scan driver 113 of FIG. 1 may control the first switch SW1 and the second switch SW2. The scan driver 113 may output signals for driving the first switch SW1 and the second switch SW2.

In a reset section, the first switch SW1 may be turned on, and the second switch SW2 may be turned off. When the first switch SW1 is turned on and the second switch SW2 is turned off, a voltage of the initialization power source VINT may be provided to the pixel PX through the read-out line ROL.

In a read-out section, the first switch SW1 may be turned off, and the second switch SW2 may be turned on. When the first switch SW1 is turned off and the second switch SW2 is turned on, read-out signals RO1 to ROm may be output to the read-out circuit 114 through the read-out line ROL.

In a first read-out section, the read-out circuit 114 may generate data corresponding to a driving current, based on a signal received through the read-out line ROL. In a second read-out section, the read-out circuit 114 may generate data corresponding to a threshold voltage, based on a signal received through the read-out line ROL. In a third read-out section, the read-out circuit 114 may generate data corresponding to a forward voltage of the first OLED OD1, based on the signal received through the read-out line ROL. In a fourth read-out section, the read-out circuit 114 may generate data corresponding to a forward voltage of a second OLED OD2, based on a signal received through the read-out line ROL. In a fifth read-out section, the read-out circuit 114 may generate data corresponding to a forward voltage of a third OLED OD3, based on a signal received through the read-out line ROL.

Figure 6:
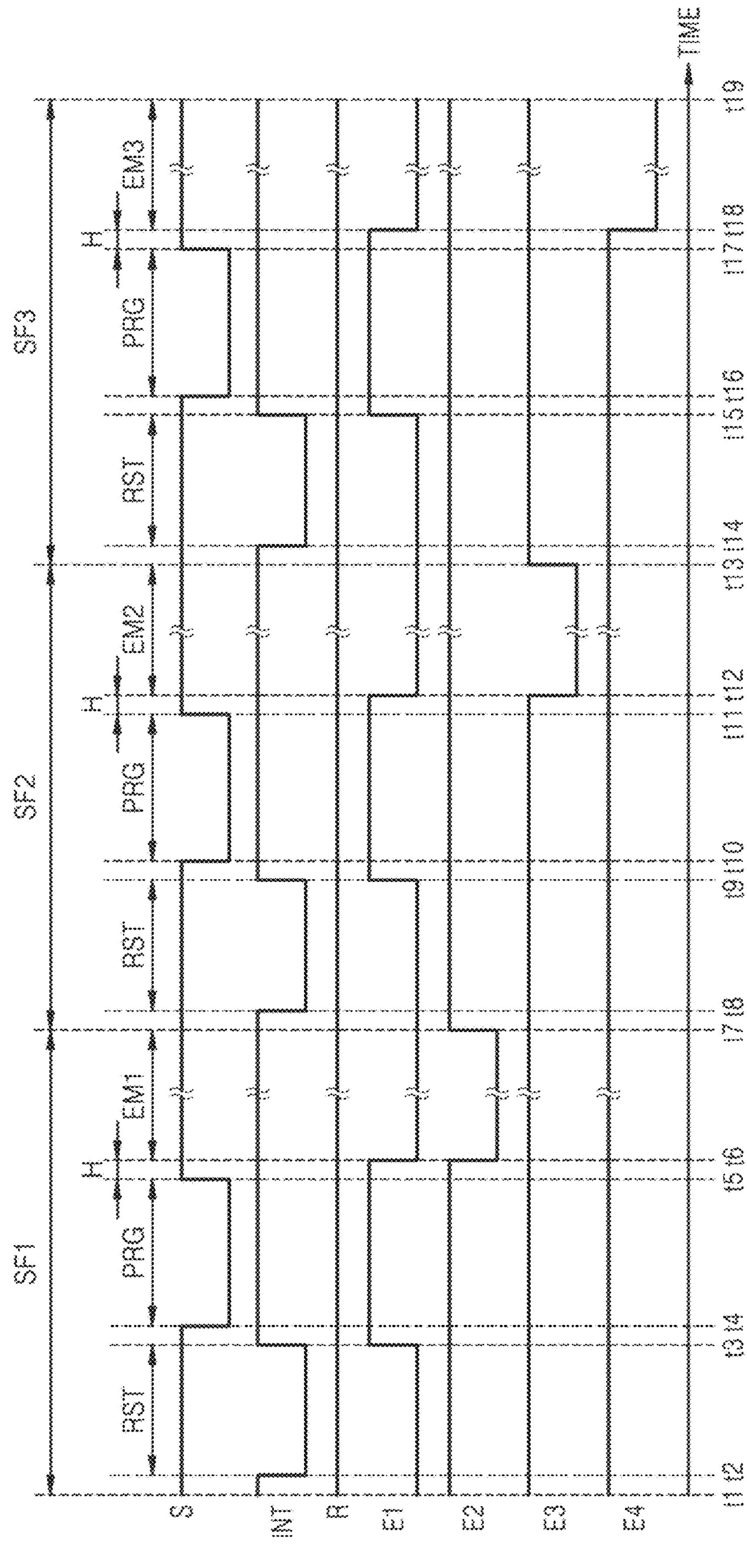
FIG. 6 is a timing diagram of a plurality of signals for controlling pixels, according to an embodiment.

FIG. 6 is a timing diagram of a plurality of signals for controlling pixels, according to an embodiment. FIGS. 7A to 7F are diagrams illustrating operations of pixels, according to an embodiment. The plurality of signals may be provided to the pixel PX1 of FIG. 2 and are described with reference to FIG. 2.

A scan driver 113 may provide a plurality of control signals to a display panel 120 through a plurality of control lines. The scan driver 113 may control the pixel PX1 by using the plurality of control signals. A display device 100 may operate on a frame basis. Each frame may include a plurality of sub-frames. The number of sub-frames may be equal to the number of OLEDs OD in the pixel PX1. Each of the sub-frames may include a reset section RST, a program section PRG, a hold section H, and an emission section EM.

In an embodiment, the pixel PX1 may be time-multiplexed. A plurality of emission operations may be performed in one frame of the pixel PX1. For example, in one frame, the pixel PX1 may perform an emission operation on a first OLED OD1, then perform an emission operation on a second OLED OD2, and subsequently perform an emission operation on a third OLED OD3. One frame may be divided into a plurality of sub-frames, and a reset operation, a program operation, a hold operation, and an emission operation may be performed in each of the sub-frames.

In an embodiment, the frame may include first to third sub-frames SF1, SF2, and SF3. The pixel PX1 may include a plurality of OLEDs (e.g., OD1, OD2, and OD3). Because the pixel PX1 includes three OLEDs, the frame may include three sub-frames (i.e., SF1, SF2, and SF3). The first sub-frame SF1 may include a reset section RST, a program section PRG, a hold section H, and a first emission section EM1. The second sub-frame SF2 may include a reset section RST, a program section PRG, a hold section H, and a second emission section EM2. The third sub-frame SF3 may include a reset section RST, a program section PRG, a hold section H, and a third emission section EM3.

In each of the sub-frames SF1 to SF3, the scan driver 113 may output control signals such that an OLED corresponding to a sub-frame emits light. For example, the first sub-frame SF1 may correspond to the first OLED OD1, the second sub-frame SF2 may correspond to the second OLED OD2, and the third sub-frame SF3 may correspond to the third OLED OD3. The scan driver 113 may control the first OLED OD1 to emit light in the first sub-frame SF1, control the second OLED OD2 to emit light in the second sub-frame SF2, and control the third OLED OD3 to emit light in the third sub-frame SF3. In the first sub-frame SF1, the pixel PX1 may perform the reset operation, the program operation, the hold operation, and an emission operation in relation to the first OLED OD1. In the second sub-frame SF2, the pixel PX1 may perform the reset operation, the program operation, the hold operation, and an emission operation in relation to the second OLED OD2. In the third sub-frame SF3, the pixel PX1 may perform the reset operation, the program operation, the hold operation, and an emission operation in relation to the third OLED OD3.

In this regard, the plurality of OLEDs may share a pixel circuit PCIR through time multiplexing. The pixel circuit PCIR may drive the first OLED OD1 in the first sub-frame SF1, the pixel circuit PCIR may drive the second OLED OD2 in the second sub-frame SF2, and the pixel circuit PCIR may drive the third OLED OD3 in the third sub-frame SF3.

A scan signal S may be logic-high (e.g., at a high level, a first level, an inactive level, or a turn-off level) from a first time point t1 to a fourth time point t4, and the scan signal S may be logic-low (e.g., at a low level, a second level, an active level, or a turn-on level) from the fourth time point t4 to a fifth time point t5. The scan signal S may be logic-high from the fifth time point t5 to a tenth time point t10. The scan signal S may be logic-low from the tenth time point t10 to an eleventh time point t11. The scan signal S may be logic-high from the eleventh time point t11 to a sixteenth time point t16. The scan signal S may be logic-low from the sixteenth time point t16 to a seventeenth time point t17. The scan signal S may be logic-high from the seventeenth time point t17 to a nineteenth time point t19. The scan signal S may transition from logic-high to logic-low at the fourth time point t4, the scan signal S may transition from logic-low to logic-high at the fifth time point t5, the scan signal S may transition from logic-high to logic-low at the tenth time point t10, the scan signal S may transition from logic-low to logic-high at the eleventh time point t11, the scan signal S may transition from logic-high to logic-low at the sixteenth time point t16, and the scan signal S may transition from logic-low to logic-high at the seventeenth time point t17.

An initialization signal INT may be logic-high from the first time point t1 to a second time point t2. The initialization signal INT may be logic-low from the second time point t2 to a third time point t3. The initialization signal INT may be logic-high from the third time point t3 to an eighth time point t8. The initialization signal INT may be logic-low from the eighth time point t8 to a ninth time point t9. The initialization signal INT may be logic-high from the ninth time point 19 to a fourteenth time point t14. The initialization signal INT may be logic-low from the fourteenth time point t14 to a fifteenth time point t15. The initialization signal INT may be logic-high from the fifteenth time point t15 to the nineteenth time point t19. The initialization signal INT may transition from logic-high to logic-low at the second time point t2. The initialization signal INT may transition from logic-low to logic-high at the third time point t3. The initialization signal INT may transition from logic-high to logic-low at the eighth time point t8. The initialization signal INT may transition from logic-low to logic-high at the ninth time point t9. The initialization signal INT may transition from logic-high to logic-low at the fourteenth time point t14. The initialization signal INT may transition from logic-low to logic-high at the fifteenth time point t15.

A read-out control signal R may be logic-high from the first time point t1 to the nineteenth time point t19. A first emission control signal E1 may be logic-low from the first time point t1 to the third time point t3. The first emission control signal E1 may be logic-high from the third time point t3 to a sixth time point t6. The first emission control signal E1 may be logic-low from the sixth time point t6 to the ninth time point t9. The first emission control signal E1 may be logic-high from the ninth time point t9 to a twelfth time point t12. The first emission control signal E1 may be logic-low from the twelfth time point t12 to the fifteenth time point t15. The first emission control signal E1 may be logic-high from the fifteenth time point t15 to an eighteenth time point t18. The first emission control signal E1 may be logic-low from the eighteenth time point t18 to the nineteenth time point t19. The first emission control signal E1 may transition from logic-low to logic-high at the third time point t3, the first emission control signal E1 may transition from logic-high to logic-low at the sixth time point t6, the first emission control signal E1 may transition from logic-low to logic-high at the ninth time point t9, the first emission control signal E1 may transition from logic-high to logic-low at the twelfth time point t12, the first emission control signal E1 may transition from logic-low to logic-high at the fifteenth time point t15, and the first emission control signal E1 may transition from logic-high to logic-low at the eighteenth time point t18.

A second emission control signal E2 may be logic-high from the first time point t1 to the sixth time point t6. The second emission control signal E2 may be logic-low from the sixth time point t6 to a seventh time point t7. The second emission control signal E2 may be logic-high from the seventh time point t7 to the nineteenth time point t19. The second emission control signal E2 may transition from logic-high to logic-low in the sixth time point t6. The second emission control signal E2 may transition from logic-low to logic-high in the seventh time point t7.

A third emission control signal E3 may be logic-high from the first time point t1 to the twelfth time point t12. The third emission control signal E3 may be logic-low from the twelfth time point t12 to a thirteenth time point t13. The third emission control signal E3 may be logic-high from the thirteenth time point t13 to the nineteenth time point t19. The third emission control signal E3 may transition from logic-high to logic-low at the twelfth time point t12, while the third emission control signal E3 may transition from logic-low to logic-high at the thirteenth time point t13.

A fourth emission control signal E4 may be logic-high from the first time point t1 to the eighteenth time point t18, and the fourth emission control signal E4 may be logic-low from the eighteenth time point t18 to the nineteenth time point t19. At the eighteenth time point t18, the fourth emission control signal E4 may transition from logic-high to logic-low.

The first sub-frame SF1 may be from the first time point t1 to the seventh time point t7. The reset section RST of the first sub-frame SF1 may be from the second time point t2 to the third time point t3, the program section PRG of the first sub-frame SF1 may be from the fourth time point t4 to the fifth time point t5, the hold section H of the first sub-frame SF1 may be from the fifth time point t5 to the sixth time point t6, and an emission section (i.e., the first emission section EM1) of the first sub-frame SF1 may be from the sixth time point t6 to the seventh time point t7.

The second sub-frame SF2 may be from the seventh time point t7 to the thirteenth time point t13. The reset section RST of the second sub-frame SF2 may be from the eighth time point t8 to the ninth time point t9, the program section PRG of the second sub-frame SF2 may be from the tenth time point t10 to the eleventh time point t11, the hold section H of the second sub-frame SF2 may be from the eleventh time point t11 to the twelfth time point t12, and an emission section (i.e., the second emission section EM2) of the second sub-frame SF2 may be from the twelfth time point t12 to the thirteenth time point t13.

The third sub-frame SF3 may be from the thirteenth time point t13 to the nineteenth time point t19. The reset section RST of the third sub-frame SF3 may be from the fourteenth time point t14 to the fifteenth time point t15, the program section PRG of the third sub-frame SF3 may be from the sixteenth time point t16 to the seventeenth time point t17, the hold section H of the third sub-frame SF3 may be from the seventeenth time point t17 to the eighteenth time point t18, and an emission section (i.e., the third emission section EM3) of the third sub-frame SF3 may be from the eighteenth time point t18 to the nineteenth time point t19.

In the reset section RST of each of the first to third sub-frames SF1 to SF3, the scan driver 113 may output the same control signals. In the program section PRG of each of the first to third sub-frames SF1 to SF3, the scan driver 113 may output the same control signals. In the hold section H of each of the first to third sub-frames SF1 to SF3, the scan driver 113 may output the same control signals.

In the program section PRG of the first sub-frame SF1, the data driver 112 may output a data voltage VD corresponding to the first OLED OD1. In the program section PRG of the second sub-frame SF2, the data driver 112 may output a data voltage VD corresponding to the second OLED OD2. In the program section PRG of the third sub-frame SF3, the data driver 112 may output a data voltage VD corresponding to the third OLED OD3.

Figure 7A:
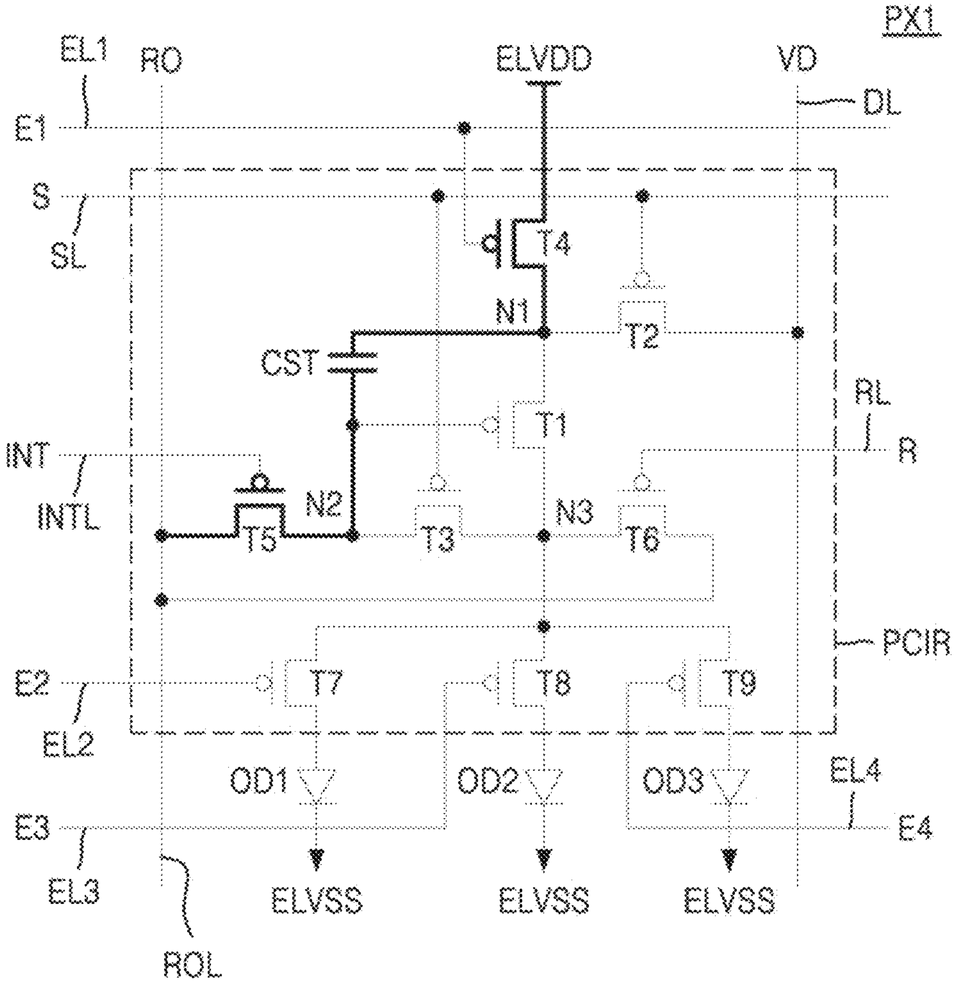
FIGS. 7A, 7B, 7C, 7D, 7E and 7F are diagrams illustrating operations of pixels, according to an embodiment.

Referring to FIGS. 6 and 7A, in the reset section RST, the scan signal S may be logic-high, the initialization signal INT may be logic-low, the read-out control signal R may be logic-high, the first emission control signal E1 may be logic-low, the second emission control signal E2 may be logic-high, the third emission control signal E3 may be logic-high, and the fourth emission control signal E4 may be logic-high. In this regard, in the reset section RST, the scan driver 113 may output the scan signal S at an inactive level (e.g., logic-level) through a scan line SL, output the initialization signal INT at an active level through an initialization line INTL, output the read-out control signal R at an inactive level through a read-out control line RL, output the first emission control signal E1 at an active level through a first emission control line EL1, output the second emission control signal E2 at an inactive level through a second emission control line EL2, output the third emission control signal E3 at an inactive level through a third emission control line EL3, and output the fourth emission control signal E4 at an inactive level through a fourth emission control line EL4. Accordingly, in the reset section RST, the second transistor T2, the third transistor T3, the sixth transistor T6), the seventh transistor T7, the eighth transistor T8, and the ninth transistor T9 may be turned off, while the fourth transistor T4 and the fifth transistor T5 may be turned on.

In response to the scan signal S that is at an inactive level, the second transistor T2 may be turned off. The second transistor T2 may be turned off, and thus, electrical connection between a data line DL and the first node N1 may be cut off. In response to the scan signal S that is at an inactive level, the third transistor T3 may be turned off. The third transistor T3 may be turned off, and thus, electrical connection between the second node N2 and the third node N3 may be cut off. In response to the read-out control signal R that is at an inactive level, the sixth transistor T6 may be turned off. The sixth transistor T6 may be turned off, and thus, electrical connection between a read-out line ROL and the third node N3 may be cut off. In response to the second emission control signal E2 that is at an inactive level, the seventh transistor T7 may be turned off. The seventh transistor T7 may be turned off, and thus, electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between the third node N3 and the third OLED OD3 may be cut off.

In response to the first emission control signal E1 that is at an active level, the fourth transistor T4 may be turned on. The fourth transistor T4 may be turned on and provide a voltage of a first driving power source ELVDD to the first node N1. In response to the initialization signal INT that is at an active level, the fifth transistor T5 may be turned on. The fifth transistor T5 may be turned on and provide an initialization power source VINT provided through the read-out line ROL to the second node N2. That is, a voltage of a gate of a first transistor T1 may be initialized to a voltage of the initialization power source VINT.

A storage capacitor CST may be charged with a voltage reduced from a voltage of the first driving power source ELVDD by a voltage of the initialization power source VINT. In this regard, the storage capacitor CST may store a difference between the voltage of the first driving power source ELVDD and the voltage of the initialization power source VINT.

Figure 7B:
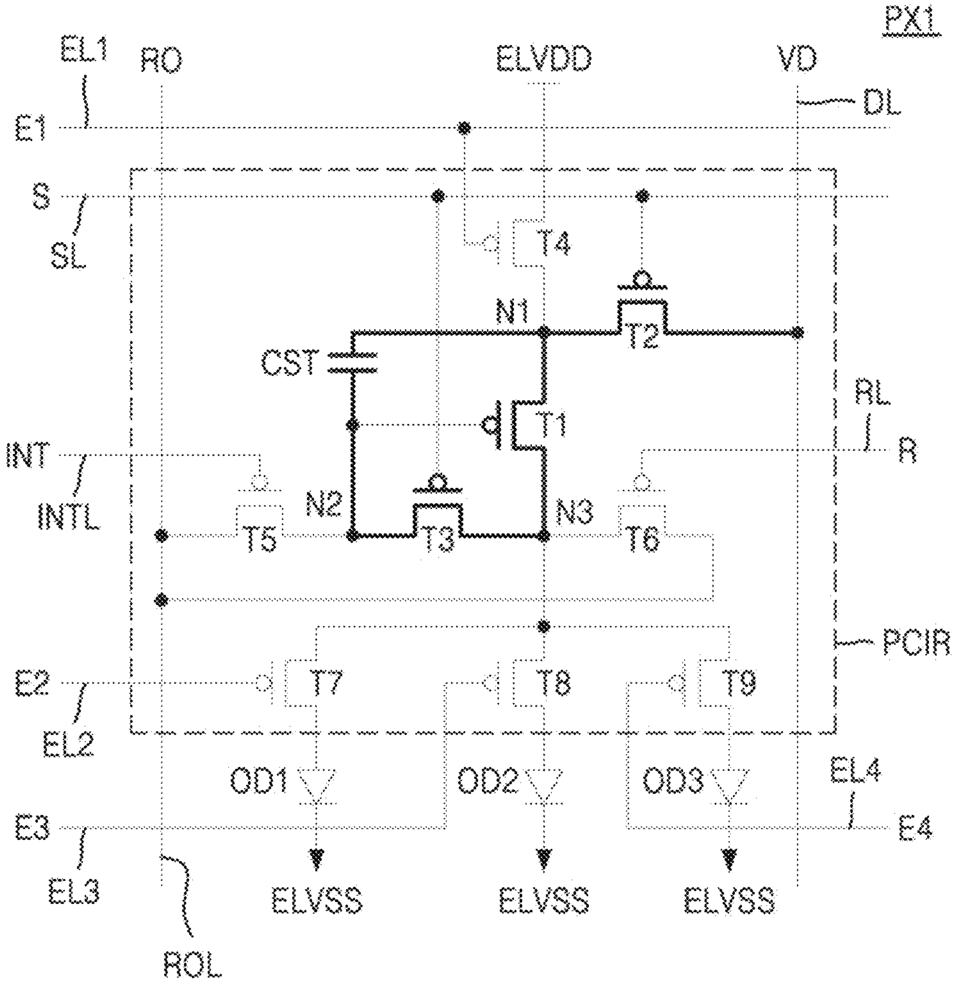

Referring to FIGS. 6 and 7B, in the program section PRG, the scan signal S may be logic-low, the initialization signal INT may be logic-high, the read-out control signal R may be logic-high, the first emission control signal E1 may be logic-high, the second emission control signal E2 may be logic-high, the third emission control signal E3 may be logic-high, and the fourth emission control signal E4 may be logic-high. In this regard, in the program section PRG, the scan driver 113 may output the scan signal S at an active level through the scan line SL, output the initialization signal INT at an inactive level through the initialization line INTL, output the read-out control signal R at an inactive level through the read-out control line RL, output the first emission control signal E1 at an inactive level through the first emission control line EL1, output a second emission control signal E2 at an inactive level through the second emission control line EL2, output the third emission control signal E3 at an inactive level through the third emission control line EL3, and output the fourth emission control signal E4 at an inactive level through the fourth emission control line EL4.

In the program section PRG, the fourth transistor T4, the fifth transistor T5, the sixth transistor T6, the seventh transistor T7, the eighth transistor T8, and the ninth transistor T9 may be turned off, while the second transistor T2 and the third transistor T3 may be turned on.

In response to the first emission control signal E1 that is at an inactive level, the fourth transistor T4 may be turned off. The fourth transistor T4 may be turned off, and thus, electrical connection between the first driving power source ELVDD and the first node N1 may be cut off. In response to the initialization signal INT that is at an inactive level, the fifth transistor T5 may be turned off. The fifth transistor T5 may be turned off, and thus, electrical connection between the read-out line ROL and the second node N2 may be cut off. In response to the read-out control signal R that is at an inactive level, the sixth transistor T6 may be turned off. The sixth transistor T6 may be turned off, and thus, electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between the third node N3 and the third OLED OD3 may be cut off.

In response to the scan signal S that is at an active level, the second transistor T2 may be turned on. The second transistor T2 may be turned on and provide the data voltage VD provided through the data line DL to the first node N1. In response to the scan signal S that is at an active level, the third transistor T3 may be turned on. By turning on the third transistor T3, the second node N2 and the third node N3 may be connected to each other, and the third transistor T3 may be diode-connected to the first transistor T1.

The data voltage VD may be applied to the first node N1, and a voltage reduced from the data voltage VD by an absolute value of a threshold voltage Vth may be applied to the second node N2. The storage capacitor CST may be charged up to the threshold voltage VTH. That is, the storage capacitor CST may store the threshold voltage VTH.

In the program section PRG of the first sub-frame SF1, the data driver 112 may provide a data voltage VD corresponding to the first OLED OD1 through the data line DL to the first node N1. In the program section PRG of the second sub-frame SF2, the data driver 112 may provide a data voltage VD corresponding to the second OLED OD2 through the data line DL to the first node N1. In the program section PRG of the third sub-frame SF3, the data driver 112 may provide the data voltage VD corresponding to the third OLED OD3 through the data line DL to the first node N1.

Figure 7C:
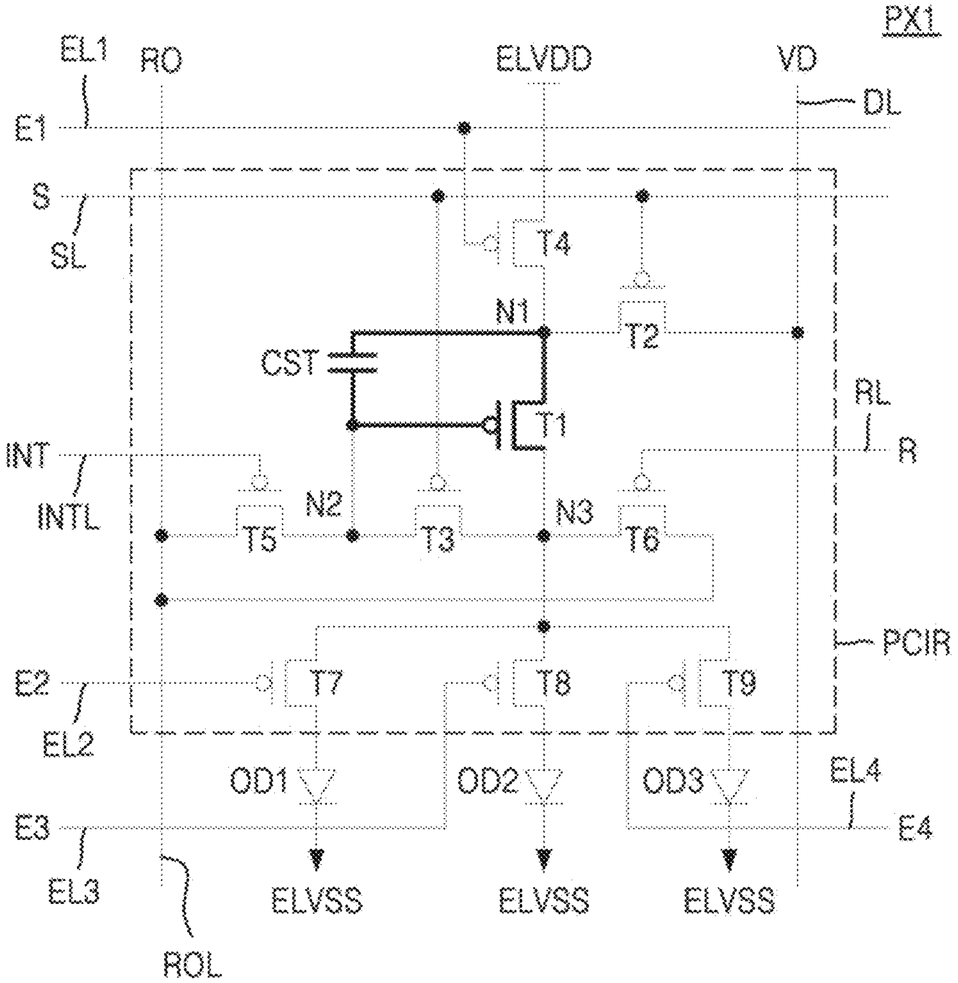

Referring to FIGS. 6 and 7C, in the hold section H, the scan signal S may be logic-high, the initialization signal INT may be logic-high, the read-out control signal R may be logic-high, the first emission control signal E1 may be logic-high, the second emission control signal E2 may be logic-high, the third emission control signal E3 may be logic-high, and the fourth emission control signal E4 may be logic-high. In this regard, in the hold section H, the scan driver 113 may output the scan signal S at an inactive level through the scan line SL, output the initialization signal INT at an inactive level through the initialization line INTL, output the read-out control signal R at an inactive level through the read-out control line RL, output the first emission control signal E1 at an inactive level through the first emission control line EL1, output the second emission control signal E2 at an inactive level through the second emission control line EL2, output the third emission control signal E3 at an inactive level through the third emission control line EL3, and output the fourth emission control signal E4 at an inactive level through the fourth emission control line EL4. In the hold section H, the second transistor T2, the third transistor T3, the fourth transistor T4, the fifth transistor T5, the sixth transistor T6, the seventh transistor T7, the eighth transistor T8, and the ninth transistor T9 may be turned off.

In response to the scan signal S that is at an inactive level, the second transistor T2 may be turned off. The second transistor T2 may be turned off, and thus, electrical connection between the data line DL and the first node N1 may be cut off. In response to the scan signal S that is at an inactive level, the third transistor T3 may be turned off. The third transistor T3 may be turned off, and thus, electrical connection between the second node N2 and the third node N3 may be cut off. In response to the first emission control signal E1 that is at an inactive level, the fourth transistor T4 may be turned off. The fourth transistor T4 may be turned off, and thus, electrical connection between the first driving power source ELVDD and the first node N1 may be cut off. In response to the initialization signal INT that is at an inactive level, the fifth transistor T5 may be turned off. The fifth transistor T5 may be turned off, and thus, electrical connection between the read-out line ROL and the second node N2 may be cut off. In response to the read-out control signal R that is at an inactive level, the sixth transistor T6 may be turned off. The sixth transistor T6 may be turned off, and thus, electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between the third node N3 and the third OLED OD3 may be cut off.

In an embodiment, a range of a data voltage may be expanded under the influence of a parasitic capacitor. A first parasitic capacitor may be between a gate electrode of the second transistor T2 and a second electrode (i.e., the first node N1) of the second transistor T2. When the scan signal S transitions from logic-low to logic-high at the fifth time point t5 (i.e., in the case of a rising edge), a voltage of the first node N1 may be coupled to the scan signal S and rise. A first voltage V1 may be applied to the first node N1. The first voltage V1 may be expressed as in Equation 2. Here, VD denotes a data voltage VD applied through the data line DL, and f(A) denotes a magnitude of a voltage boosted due to the first parasitic capacitor.

$$V1 = VD + f(A) \qquad \text{[Equation 2]}$$

A second parasitic capacitor may be between a gate electrode of the third transistor T3 and a first electrode (i.e., the second node N2) of the third transistor T3. When the scan signal S transitions from logic-low to logic-high at the fifth time point t5, a voltage of the second node N2 may be coupled to the scan signal S and rise. A second voltage V2 may be applied to the second node N2. The second voltage V2 may be expressed as in Equation 3. Here, VD denotes a data voltage applied through the data line DL, and f (B) denotes a magnitude of a voltage boosted due to the second parasitic capacitor.

$$V2 = VD - |VTH| + f(B) \qquad \text{[Equation 3]}$$

When a driving current ID is supplied from the first transistor T1 to any one of the first to third OLEDs OD1 to OD3, an organic emission layer of a corresponding OLED may generate light. The intensity of light may be proportional to the driving current ID. A driving voltage VSG may be expressed as in Equation 4, and the driving current ID may be expressed as in Equation 5. Here, a and B denotes a constant value, ELVDD denotes a voltage of the first driving power source ELVDD, VD denotes the data voltage VD, VSG denotes the driving voltage VSG of the first transistor T1, VTH denotes the threshold voltage VTH of the first transistor T1, f(A) denotes the magnitude of the voltage boosted due to the first parasitic capacitor, and f(B) denotes the magnitude of the voltage boosted due to the second parasitic capacitor.

$$VSG = (1-\alpha)(ELVDD - VD) - +\alpha f(A) + |VTH| \qquad \text{[Equation 4]}$$

$$ID = \beta(VSG - VTH)^2 \qquad \text{[Equation 5]}$$

The display device 100 may expand a range of the data voltage VD as shown in Equation 6:

$$f(A) < f(B) \qquad \text{[Equation 6]}$$

In an embodiment, a size of the second transistor T2 may be different from a size of the third transistor T3. The size of the second transistor T2 may be less than the size of the third transistor T3. Due to differences in the sizes of transistors, effects of parasitic capacitors may be different. Due to the differences in the sizes of the transistors, effects of the second parasitic capacitor may be greater than effects of the first parasitic capacitor. A range of the data voltage VD corresponding to a range of the amount of current flowing through a pixel may increase. That is, a variation range of the data voltage VD corresponding to a variation range of the driving current ID may be expanded. Controlling a brightness or luminance of pixels may be facilitated by using the data voltage ID.

Figure 7D:
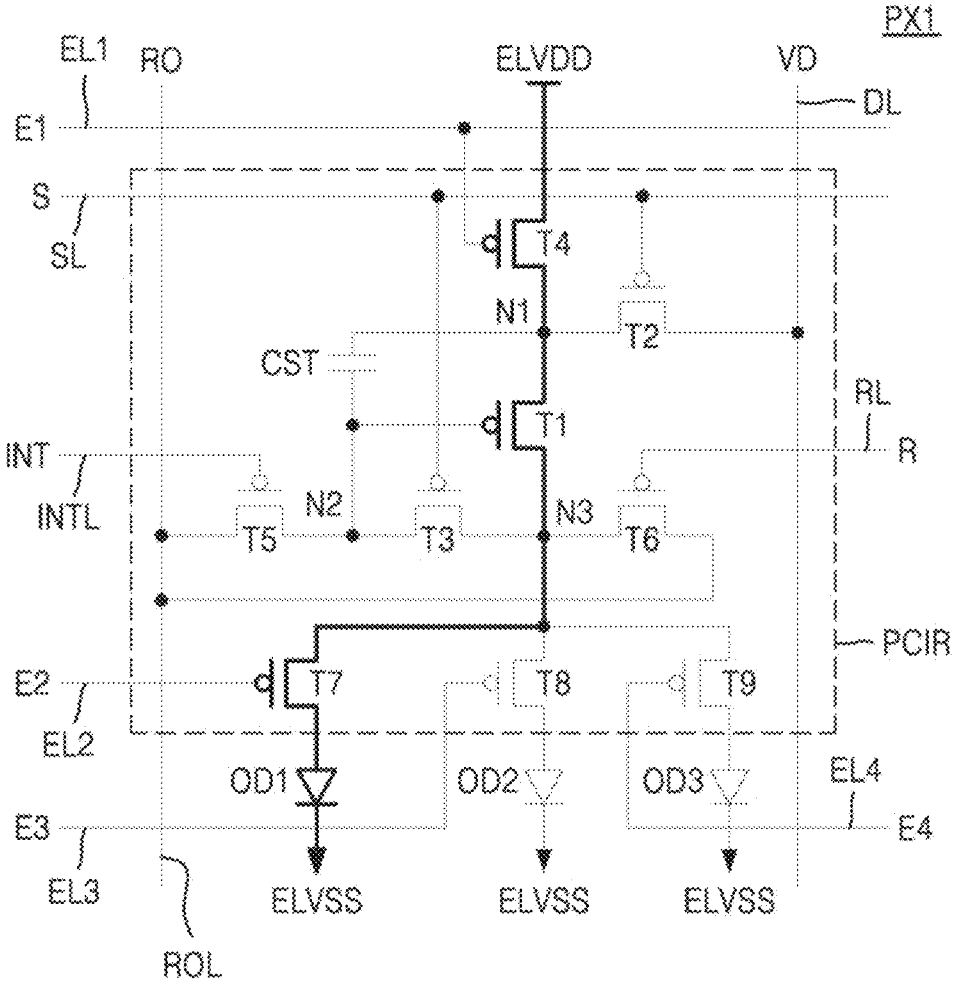

Referring to FIGS. 6 and 7D, in the first emission section EM1, the scan signal S may be logic-high, the initialization signal INT may be logic-high, the read-out control signal R may be logic-high, the first emission control signal E1 may be logic-low, the second emission control signal E2 may be logic-low, the third emission control signal E3 may be logic-high, and the fourth emission control signal E4 may be logic-high. In the first emission section EM1, the scan driver 113 may output the scan signal S at an inactive level through the scan line SL, output the initialization signal INT at an inactive level through the initialization line INTL, output the read-out control signal R at an inactive level through the read-out control line RL, output the first emission control signal E1 at an active level through the first emission control line EL1, output a second emission control signal E2 at an active level through the second emission control line EL2, output the third emission control signal E3 at an inactive level through the third emission control line EL3, and output the fourth emission control signal E4 at an inactive level through the fourth emission control line EL4. In the first emission section EM1, the second transistor T2, the third transistor T3, the fifth transistor T5, the sixth transistor T6, the eighth transistor T8, and the ninth transistor T9 may be turned off, while the fourth transistor T4 and the seventh transistor T7 may be turned on.

In response to the scan signal S that is at an inactive level, the second transistor T2 may be turned off. The second transistor T2 may be turned off, and thus, electrical connection between the data line DL and the first node N1 may be cut off. In response to the scan signal S that is at an inactive level, the third transistor T3 may be turned off. The third transistor T3 may be turned off, and thus, electrical connection between electrical connection between the second node N2 and the third node N3 may be cut off. In response to the initialization signal INT that is at an inactive level, the fifth transistor T5 may be turned off. The fifth transistor T5 may be turned off, and thus, electrical connection between electrical connection between the read-out line ROL and the second node N2 may be cut off. In response to the read-out control signal R that is at an inactive level, the sixth transistor T6 may be turned off. The sixth transistor T6 may be turned off, and thus, electrical connection between electrical connection between the read-out line ROL and the third node N3 may be cut off. In response to the third emission control signal E3 that is at an inactive level, the eighth transistor T8 may be turned off. The eighth transistor T8 may be turned off, and thus, electrical connection between electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between electrical connection between the third node N3 and the third OLED OD3 may be cut off.

In response to the first emission control signal E1 that is at an active level, the fourth transistor T4 may be turned on. In response to the second emission control signal E2 that is at an active level, the seventh transistor T7 may be turned on. The fourth and seventh transistors T4 and T7 may be all turned on, and thus, the driving current ID corresponding to the data voltage VD may flow through the first OLED OD1. That is, in the first emission section EM1, the driving current ID corresponding to the data voltage VD received in the program section PRG of the first sub-frame SF1 may flow through the first OLED OD1.

Figure 7E:
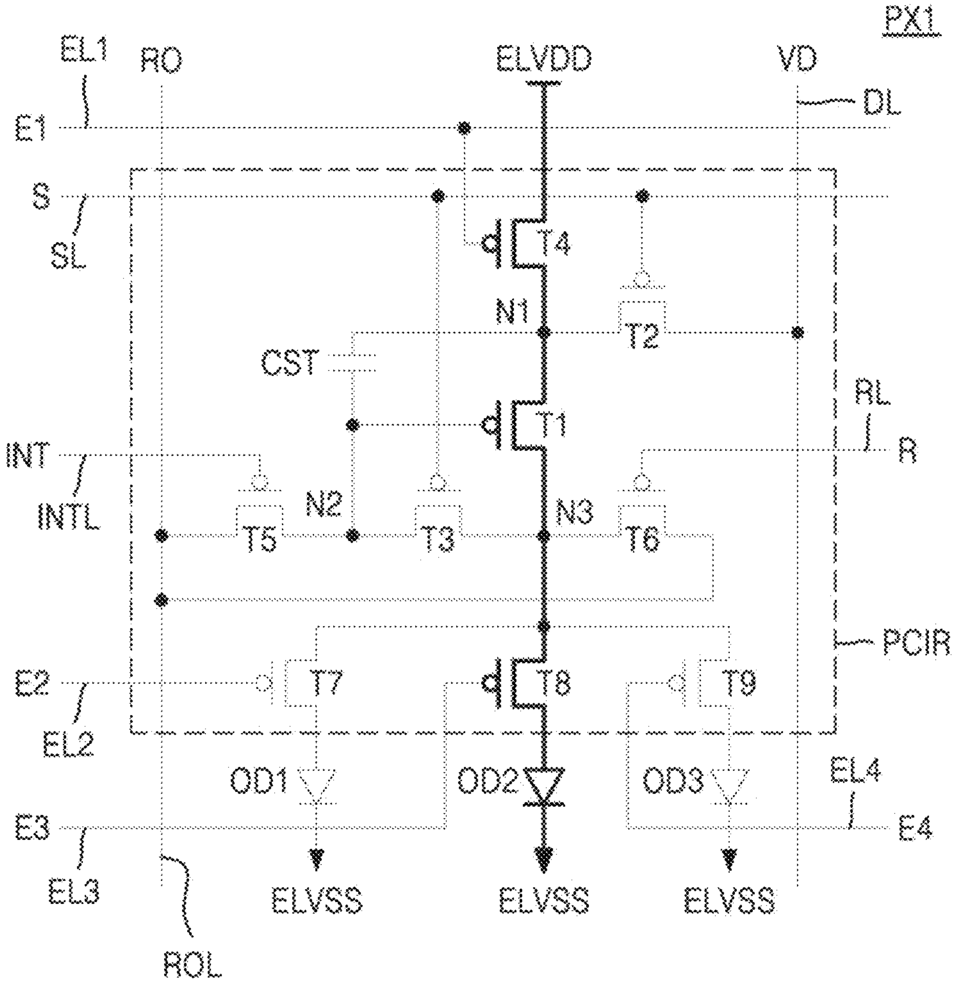

Referring to FIGS. 6 and 7E, in the second emission section EM2, the scan signal S may be logic-high, the initialization signal INT may be logic-high, the read-out control signal R may be logic-high, the first emission control signal E1 may be logic-low, the second emission control signal E2 may be logic-high, the third emission control signal E3 may be logic-low, and the fourth emission control signal E4 may be logic-high. In the second emission section EM2, the scan driver 113 may output the scan signal S at an inactive level through the scan line SL, output the initialization signal INT at an inactive level through the initialization line INTL, output the read-out control signal R at an inactive level through the read-out control line RL, output the first emission control signal E1 at an active level through the first emission control line EL1, output the second emission control signal E2 at an inactive level through the second emission control line EL2, output the third emission control signal E3 at an active level through the third emission control line EL3, and output the fourth emission control signal E4 at an inactive level through the fourth emission control line EL4. In the second emission section EM2, the second transistor T2, the third transistor T3, the fifth transistor T5, the sixth transistor T6, the seventh transistor T7, and the ninth transistor T9 may be turned off, and the fourth transistor T4 and the eighth transistor T8 may be turned on.

In response to the scan signal S that is at an inactive level, the second transistor T2 may be turned off. The second transistor T2 may be turned off, and thus, electrical connection between electrical connection between the data line DL and the first node N1 may be cut off. In response to the scan signal S that is at an inactive level, the third transistor T3 may be turned off. The third transistor T3 may be turned off, and thus, electrical connection between electrical connection between the second node N2 and the third node N3 may be cut off. In response to the initialization signal INT that is at an inactive level, the fifth transistor T5 may be turned off. The fifth transistor T5 may be turned off, and thus, electrical connection between electrical connection between the read-out line ROL and the second node N2 may be cut off. In response to the read-out control signal R that is at an inactive level, the sixth transistor T6 may be turned off. The sixth transistor T6 may be turned off, and thus, electrical connection between electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between electrical connection between the third node N3 and the first OLED OD1 may be cut off. In response to the fourth emission control signal E4 that is at an inactive level, the ninth transistor T9 may be turned off. The ninth transistor T9 may be turned off, and thus, electrical connection between electrical connection between the third node N3 and the third OLED OD3 may be cut off.

In response to the first emission control signal E1 that is at an active level, the fourth transistor T4 may be turned on. In response to the third emission control signal E3 that is at an active level, the eighth transistor T8 may be turned on. The fourth and eighth transistors T4 and T8 may be all turned on, and thus, the driving current ID corresponding to the data voltage VD may flow through the second OLED OD2. That is, in the second emission section EM2, the driving current ID corresponding to the data voltage VD received in the program section PRG of the second sub-frame SF2 may flow through the second OLED OD2.

Figure 7F:
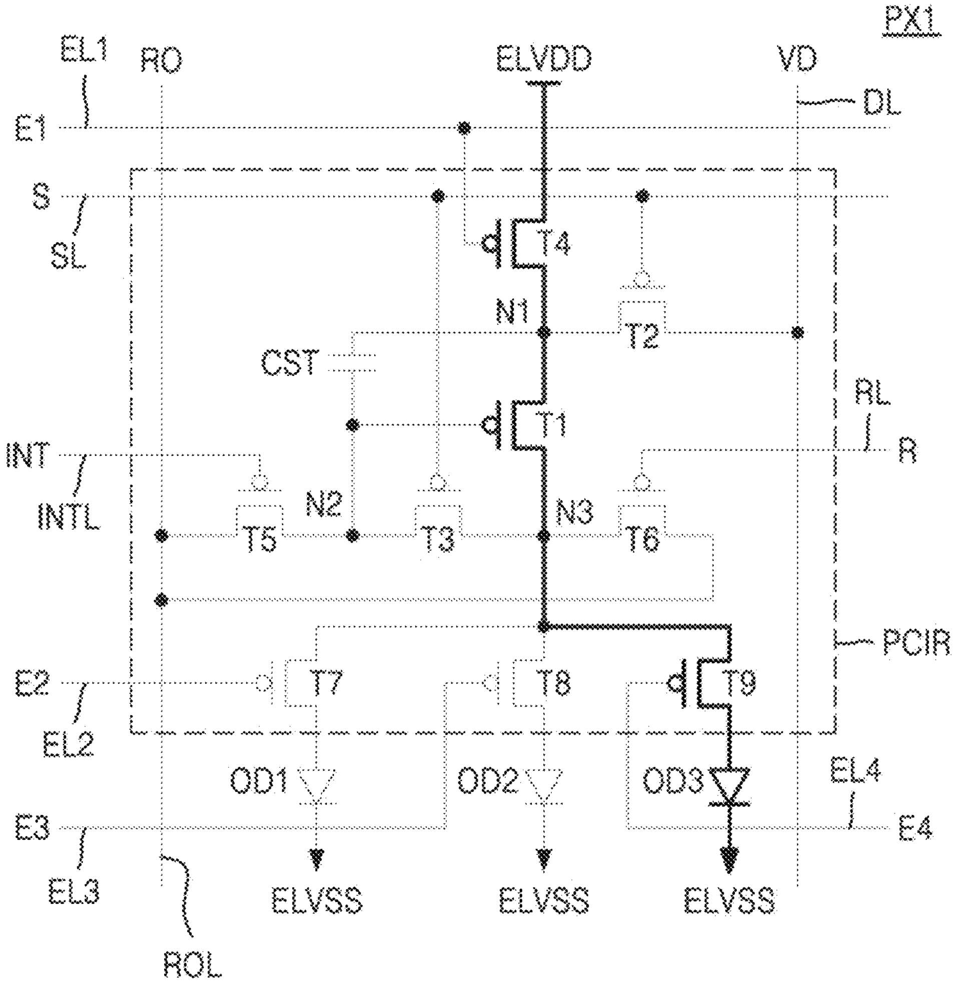

Referring to FIGS. 6 and 7F, in the third emission section EM3, the scan signal S may be logic-high, the initialization signal INT may be logic-high, the read-out control signal R may be logic-high, the first emission control signal E1 may be logic-low, the second emission control signal E2 may be logic-high, the third emission control signal E3 may be logic-high, and the fourth emission control signal E4 may be logic-low. In the third emission section EM3, the scan driver 113 may output the scan signal S at an inactive level through the scan line SL, output the initialization signal INT at an inactive level through the initialization line INTL, output the read-out control signal R at an inactive level through the read-out control line RL, output the first emission control signal E1 at an active level through the first emission control line EL1, output the second emission control signal E2 at an inactive level through the second emission control line EL2, output the third emission control signal E3 at an inactive level through the third emission control line EL3, and output the fourth emission control signal E4 at an active level through the fourth emission control line EL4. In the third emission section EM3, the second transistor T2, the third transistor T3, the fifth transistor T5, the sixth transistor T6, the seventh transistor T7, and the eighth transistor T8 may be turned off, and the fourth transistor T4 and the ninth transistor T9 may be turned on.

In response to the scan signal S that is at an inactive level, the second transistor T2 may be turned off. The second transistor T2 may be turned off, and thus, electrical connection between electrical connection between the data line DL and the first node N1 may be cut off. In response to the scan signal S that is at an inactive level, the third transistor T3 may be turned off. The third transistor T3 may be turned off, and thus, electrical connection between electrical connection between the second node N2 and the third node N3 may be cut off. In response to the initialization signal INT that is at an inactive level, the fifth transistor T5 may be turned off. The fifth transistor T5 may be turned off, and thus, electrical connection between electrical connection between the read-out line ROL and the second node N2 may be cut off. In response to the read-out control signal R that is at an inactive level, the sixth transistor T6 may be turned off. The sixth transistor T6 may be turned off, and thus, electrical connection between electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between electrical connection between the third node N3 and the second OLED OD2 may be cut off.

In response to the first emission control signal E1 that is at an active level, the fourth transistor T4 may be turned on. In response to the fourth emission control signal E4 that is at an active level, the ninth transistor T9 may be turned on. The fourth and ninth transistors T4 and T9 may be all turned on, and thus, the driving current ID corresponding to the data voltage VD may flow through the third OLED OD3. That is, in the third emission section EM3, the driving current ID corresponding to the data voltage VD received in the program section PRG of the third sub-frame SF3 may flow through the third OLED OD3.

As described above, a pixel according to an embodiment may be time-multiplexed. A plurality of emission operations may be performed in one frame of the pixel. The pixel circuit PCIR may control a plurality of OLEDs through time multiplexing.

FIGS. 8 to 12 are timing diagrams of a plurality of signals for controlling a pixel, according to an embodiment. FIGS. 13A to 13E are diagrams illustrating operations of a pixel, according to an embodiment. A plurality of signals may be provided to the pixel PX1 of FIG. 2 and are described with reference to FIGS. 1 and 2.

In a read-out section, the pixel PX1 may output a read-out signal RO through a read-out line ROL. In a first read-out section RO1, a read-out circuit 114 may detect a driving current ID. After a hold section H, a display device 100 may perform a first read-out operation instead of an emission operation (first to third emission operations). The first read-out operation may refer to an operation of detecting a driving current. The display device 100 may perform the first read-out operation in the first read-out section RO1. In the first read-out section RO1, the pixel PX1 may output the driving current ID to the read-out circuit 114 through the read-out line ROL.

In a second read-out section RO2, the read-out circuit 114 may detect a threshold voltage VTH. After a reset section RST, the display device 100 may perform a second read-out operation instead of a program operation. The second read-out operation refer to an operation of detecting the threshold voltage VTH. The display device 100 may include the second read-out operation in the second read-out section RO2. In the second read-out section RO2, the pixel PX1 may output an output voltage VO to the read-out circuit 114. The output voltage VO may be expressed as in Equation 7. Here, VD denotes a data voltage VD, and VTH denotes a threshold voltage VTH of a first transistor T1.

$$VO = VD - VTH \quad \text{[Equation 7]}$$

In a third read-out section RO3, the read-out circuit 114 may detect a first forward voltage VF1. After a hold section H of a first sub-frame SF1, the display device 100 may perform a third read-out operation instead of the first emission operation. The third read-out operation may refer to an operation of detecting the first forward voltage VF1. The display device 100 may operate the third read-out operation in the third read-out section RO3. In the third read-out section RO3, the pixel PX1 may output the first forward voltage VF1 (or a voltage of the third node N3) to the read-out circuit 114. That is, in the third read-out section RO3, the pixel PX1 may output the first forward voltage VF1, which is a forward voltage corresponding to a first OLED OD1, to the read-out circuit 114.

In a fourth read-out section RO4, the read-out circuit 114 may detect a second forward voltage VF2. After a hold section H of a second sub-frame SF2, the display device 100 may perform a fourth read-out operation instead of a second emission operation. The fourth read-out operation may refer to an operation of detecting the second forward voltage VF2. The display device 100 may perform the fourth read-out operation in the fourth read-out section RO4. In the fourth read-out section RO4, the pixel PX1 may output the second forward voltage VF2 (or a voltage of the third node N3) to the read-out circuit 114. That is, in the fourth read-out section RO4, the pixel PX1 may output the second forward voltage VF2, which is a forward voltage corresponding to a second OLED OD2, to the read-out circuit 114.

In a fifth read-out section RO5, the read-out circuit 114 may detect a third forward voltage VF3. After a hold section H of a third sub-frame SF3, the display device 100 may perform a fifth read-out operation instead of a third emission operation. The fifth read-out operation may refer to an operation of detecting the third forward voltage VF3. The display device 100 may perform the fifth read-out operation in the fifth read-out section RO5. In the fifth read-out section RO5, the pixel PX1 may output the third forward voltage VF3 (or a voltage of the third node N3) to the read-out circuit 114. That is, in the fifth read-out section RO5, the pixel PX1 may output the third forward voltage VF3, which is a forward voltage corresponding to a third OLED OD3, to the read-out circuit 114.

Figure 8:
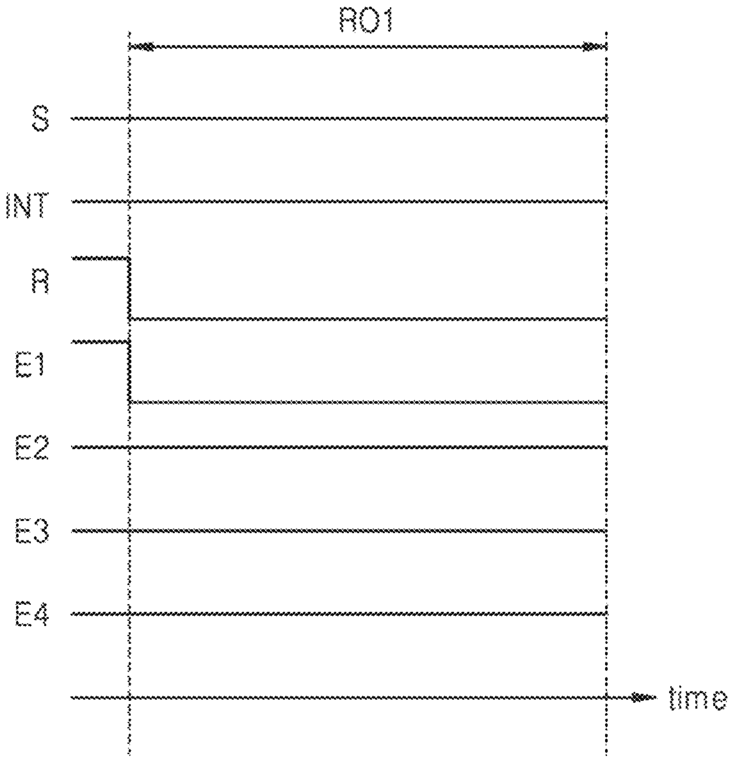
FIGS. 8 to 12 are timing diagrams of a plurality of signals for controlling a pixel, according to an embodiment.
Figure 13A:
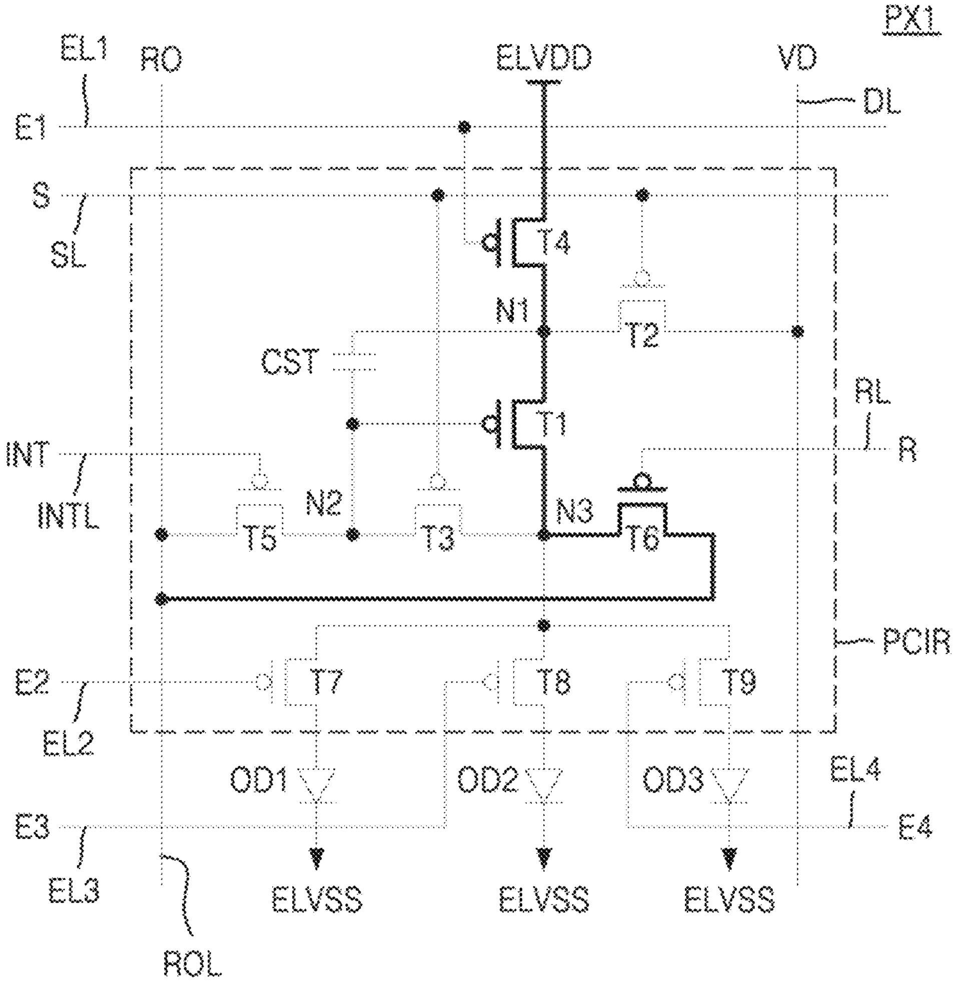
FIGS. 13A, 13B, 13C, 13D and 13E are diagrams illustrating operations of a pixel, according to an embodiment.

A method of measuring the driving current ID is described with reference to FIGS. 8 and 13A. Referring to FIGS. 2, 8, and 13A, in the first read-out section RO1, a scan signal S may be logic-high, an initialization signal INT may be logic-high, a read-out control signal R may be logic-low, a first emission control signal E1 may be logic-low, a second emission control signal E2 may be logic-high, a third emission control signal E3 may be logic-high, and a fourth emission control signal E4 may be logic-high. In this regard, in the first read-out section RO1, a scan driver 113 may output the scan signal S at an inactive level through a scan line SL, output the initialization signal INT at an inactive level through an initialization line INTL, output the read-out control signal R at an active level through a read-out control line RL, output the first emission control signal E1 at an active level through a first emission control line EL1, output the second emission control signal E2 at an inactive level through a second emission control line EL2, output the third emission control signal E3 at an inactive level through a third emission control line EL3, and output the fourth emission control signal E4 at an inactive level through a fourth emission control line EL4. In the first read-out section RO1, a second transistor T2, the third transistor T3, the fifth transistor T5, the seventh transistor T7, the eighth transistor T8, and the ninth transistor T9 may be turned off, and the fourth transistor T4 and the sixth transistor T6 may be turned on.

In response to the first emission control signal E1 that is at an active level, the fourth transistor T4 may be turned on. In response to the read-out control signal R that is at an active level, the sixth transistor T6 may be turned on. In response to the scan signal S that is at an inactive level, the second transistor T2 may be turned off. In response to the scan signal S that is at an inactive level, the third transistor T3 may be turned off. In response to the initialization signal INT that is at an inactive level, the fifth transistor T5 may be turned off. In response to the second emission control signal E2 that is at an inactive level, the seventh transistor T7 may be turned off. In response to the third emission control signal E3 that is at an inactive level, the eighth transistor T8 may be turned off. In response to the fourth emission control signal E4 that is at an inactive level, the ninth transistor T9 may be turned off.

Because the seventh to ninth transistors T7 to T9 are turned off and the sixth transistor T6 is turned on, the driving current ID (i.e., the read-out signal RO may be output to the read-out circuit 114 through the read-out line ROL. The read-out circuit 114 may receive the driving current ID through the read-out line ROL. The read-out circuit 114 may perform an ADC operation on the driving current ID, which is received, and generate read-out data. That is, the read-out circuit 114 may generate data corresponding to the driving current ID.

Figure 9:
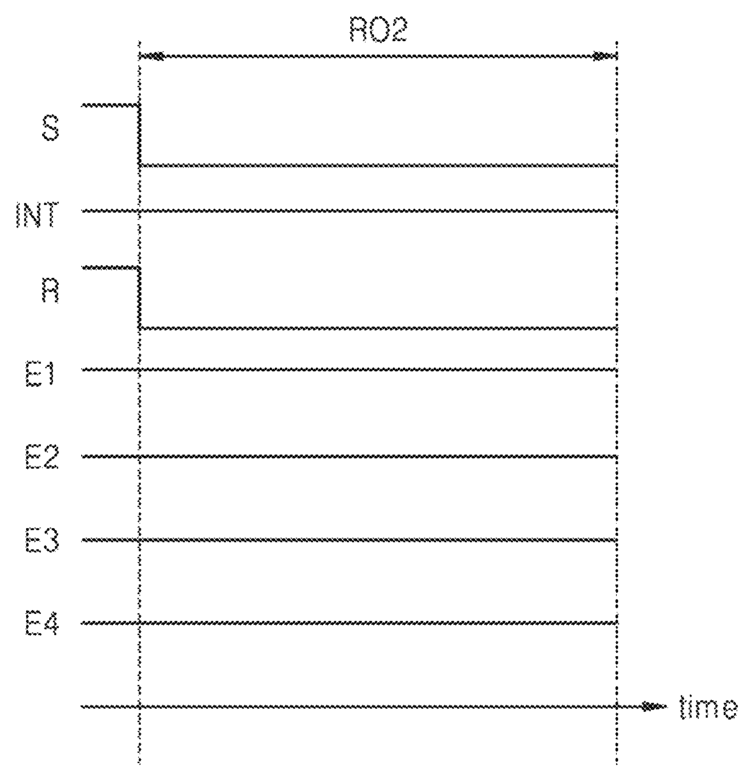
Figure 13B:
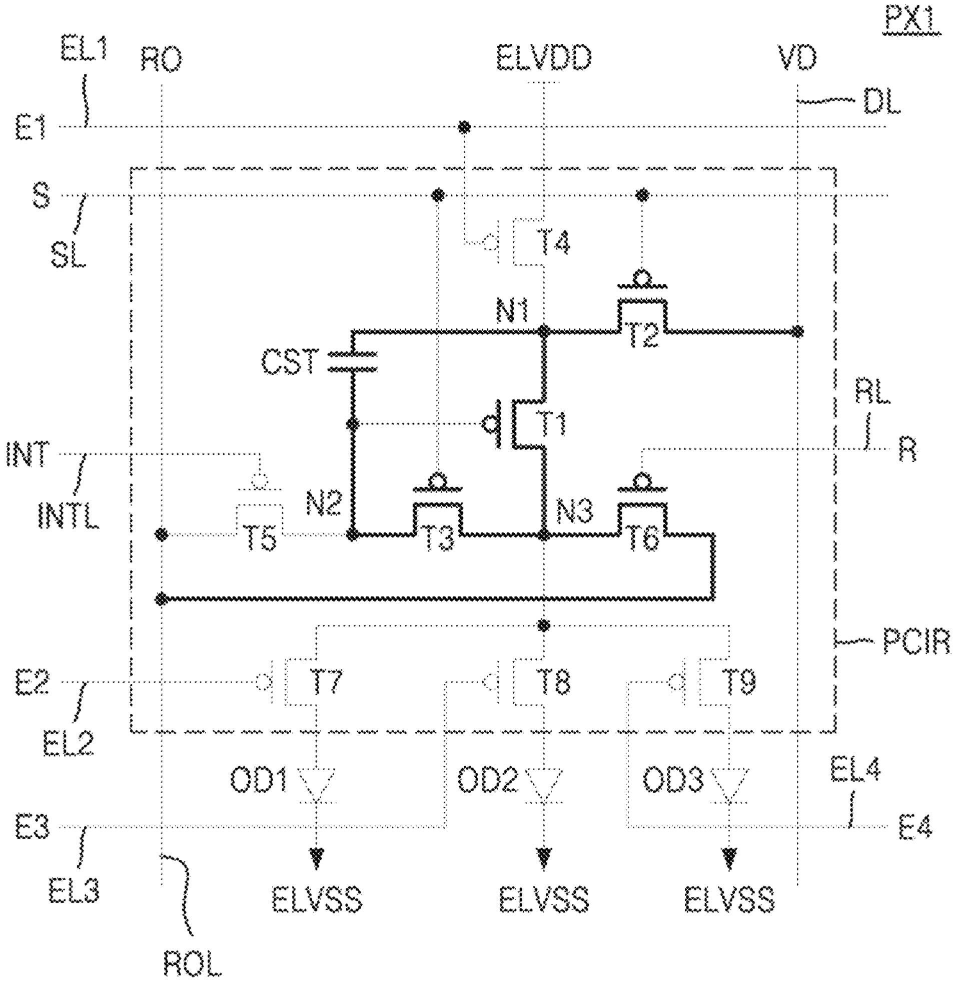

A method of measuring the threshold voltage VTH is described with reference to FIGS. 9 and 13B. Referring to FIGS. 2, 9, and 13B, in the second read-out section RO2, the scan signal S may be logic-low, the initialization signal INT may be logic-high, the read-out control signal R may be logic-low, the first emission control signal E1 may be logic-high, the second emission control signal E2 may be logic-high, the third emission control signal E3 may be logic-high, and the fourth emission control signal E4 may be logic-high. In this regard, in the second read-out section RO2, the scan driver 113 may output the scan signal S at an active level through the scan line SL, output the initialization signal INT at an inactive level through the initialization line INTL, output the read-out control signal R at an active level through the read-out control line RL, output the first emission control signal E1 at an inactive level through the first emission control line EL1, output the second emission control signal E2 at an inactive level through the second emission control line EL2, output the third emission control signal E3 at an inactive level through the third emission control line EL3, and output the fourth emission control signal E4 at an inactive level through the fourth emission control line EL4. In the second read-out section RO2, the fourth transistor T4, the fifth transistor T5, the seventh transistor T7, the eighth transistor T8, and the ninth transistor T9 may be turned off, and the second transistor T2, the third transistor T3, and the sixth transistor T6 may be turned on.

In response to the scan signal S that is at an active level, the second transistor T2 may be turned on. In response to the scan signal S that is at an active level, the third transistor T3 may be turned on. In response to the read-out control signal R that is at an active level, the sixth transistor T6 may be turned on. In response to the first emission control signal E1 that is at an inactive level, the fourth transistor T4 may be turned off. In response to the initialization signal INT that is at an inactive level, the fifth transistor T5 may be turned off. In response to the second emission control signal E2 that is at an inactive level, the seventh transistor T7 may be turned off. In response to the third emission control signal E3 that is at an inactive level, the eighth transistor T8 may be turned off. In response to the fourth emission control signal E4 that is at an inactive level, the ninth transistor T9 may be turned off.

In response to the scan signal S that is at an active level, the second transistor T2 may be turned on. The second transistor T2 may be turned on, and thus, the data voltage VD may be provided from a data line DL to the first node N1. The data voltage VD may be applied to the first node N1. A voltage reduced from the data voltage VD by an absolute value of the threshold voltage VTH may be applied to the second node N2.

In response to the scan signal S that is at an active level, the third transistor T3 may be turned on. By turning on the third transistor T3, the second node N2 and the third node N3 may be connected to each other, and the third transistor T3 may be diode-connected to the first transistor T1. Like the second node N2, a voltage reduced from the data voltage VD by the absolute value of the threshold voltage VTH may be applied to the third node N3.

In response to the read-out control signal R that is at an active level, the sixth transistor T6 may be turned on. The sixth transistor T6 may be turned on, and thus, the third node N3 may be electrically connected to the read-out line ROL. The output voltage VO may be output through the read-out line ROL.

The read-out circuit 114 may receive the output voltage VO through the read-out line ROL. The read-out circuit 114 may detect the threshold voltage VTH based on the output voltage VO and the data voltage VD. The read-out circuit 114 may perform an ADC operation on the threshold voltage VTH and generate read-out data. That is, the read-out circuit 114 may generate data corresponding to the threshold voltage VTH.

Figure 10:
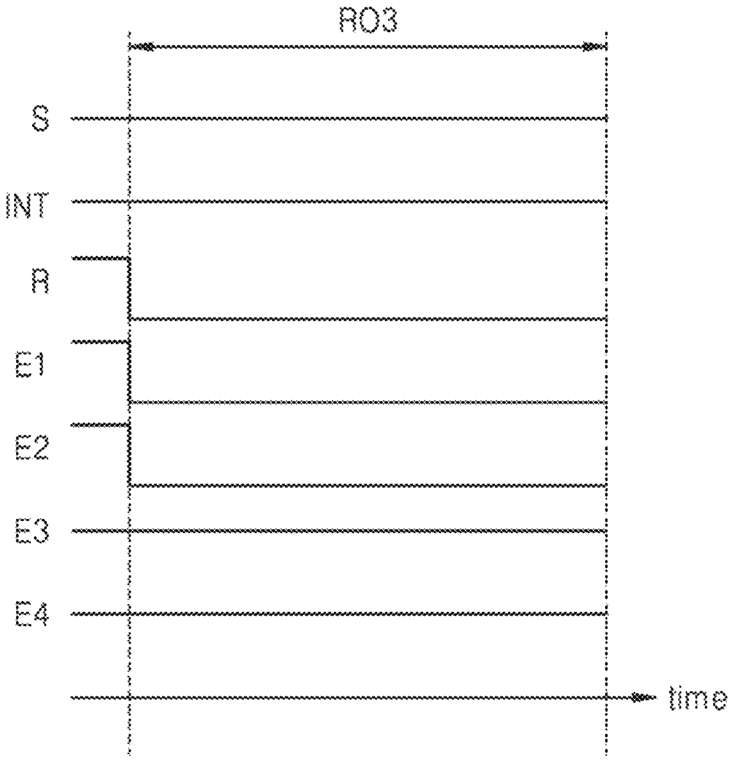
Figure 13C:
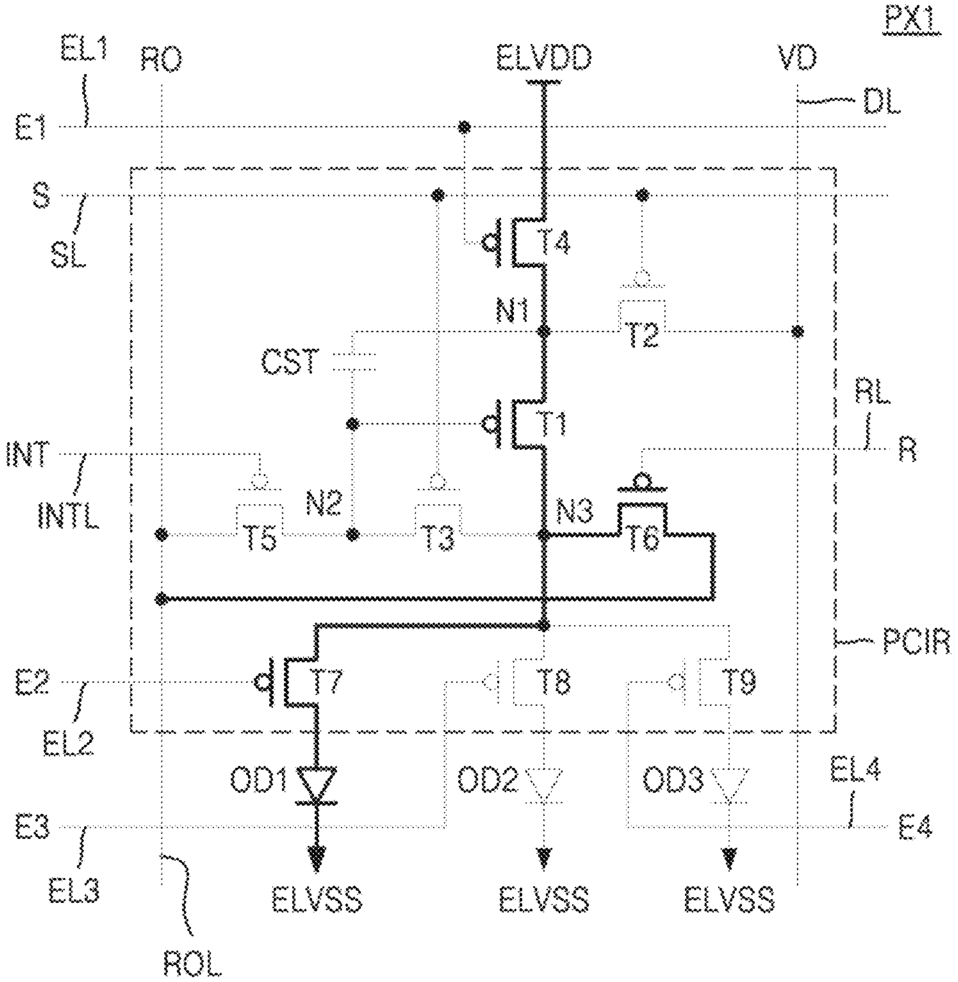

A method of measuring the first forward voltage VF1 is described with reference to FIGS. 10 and 13C. Referring to FIGS. 2, 10, and 13C, in the third read-out section RO3, the scan signal S may be logic-high, the initialization signal INT may be logic-high, the read-out control signal R may be logic-low, the first emission control signal E1 may be logic-low, the second emission control signal E2 may be logic-low, the third emission control signal E3 may be logic-high, and the fourth emission control signal E4 may be logic-high. In this regard, in the third read-out section RO3, the scan driver 113 may output the scan signal S at an inactive level through the scan line SL, output the initialization signal INT at an inactive level through the initialization line INTL, output the read-out control signal R at an active level through the read-out control line RL, output the first emission control signal E1 at an active level through the first emission control line EL1, output the second emission control signal E2 at an active level through the second emission control line EL2, output the third emission control signal E3 at an inactive level through the third emission control line EL3, and output the fourth emission control signal E4 at an inactive level through the fourth emission control line EL4. In the third read-out section RO3, the second transistor T2, the third transistor T3, the fifth transistor T5, the eighth transistor T8, and the ninth transistor T9 may be turned off, and the fourth transistor T4, the sixth transistor T6, and the seventh transistor T7 may be turned on.

In response to the first emission control signal E1 that is at an active level, the fourth transistor T4 may be turned on. In response to the read-out control signal R that is at an active level, the sixth transistor T6 may be turned on. In response to the second emission control signal E2, the seventh transistor T7 may be turned on. In response to the scan signal S that is at an inactive level, the second transistor T2 may be turned off. In response to the scan signal S that is at an inactive level, the third transistor T3 may be turned off. In response to the initialization signal INT that is at an inactive level, the fifth transistor T5 may be turned off. In response to the third emission control signal E3 that is at an inactive level, the eighth transistor T8 may be turned off. In response to the fourth emission control signal E4 that is at an inactive level, the ninth transistor T9 may be turned off.

In response to the first emission control signal E1 that is at an active level, the fourth transistor T4 may be turned on. In response to the second emission control signal E2 that is at an active level, the seventh transistor T7 may be turned on. The fourth and seventh transistors T4 and T7 may be all turned on, and thus, the driving current ID may flow through the first OLED OD1. In response to the read-out control signal R that is at an active level, the sixth transistor T6 may be turned on. The sixth transistor T6 may be turned on, and thus, the third node N3 may be electrically connected to the read-out line ROL. The first forward voltage VF1 may be output through the read-out line ROL.

The read-out circuit 114 may receive the first forward voltage VF1 through the read-out line ROL. The read-out circuit 114 may perform an ADC operation on the first forward voltage VF1 and generate read-out data. That is, the read-out circuit 114 may generate data corresponding to a forward voltage of the first OLED OD1.

Figure 11:
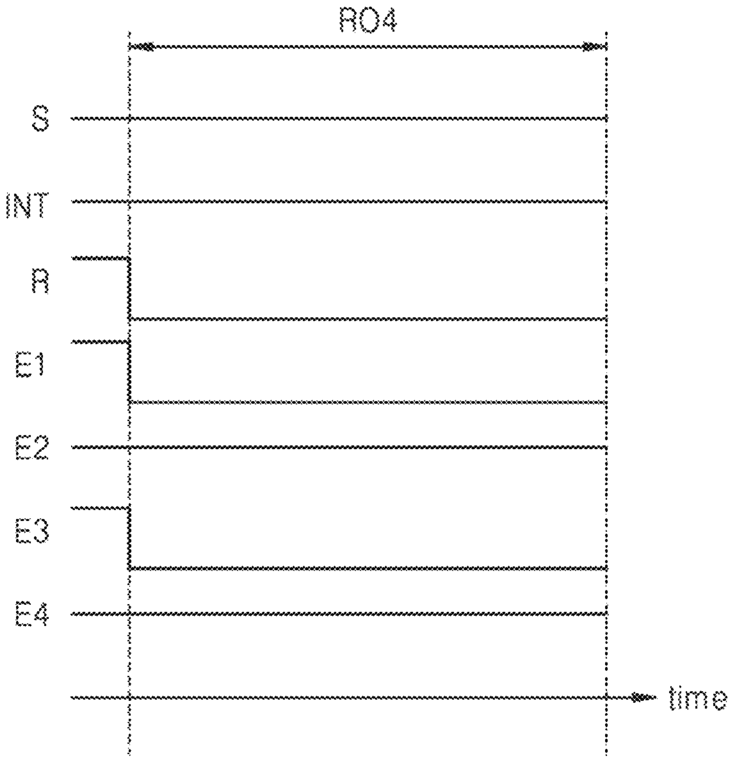
Figure 13D:
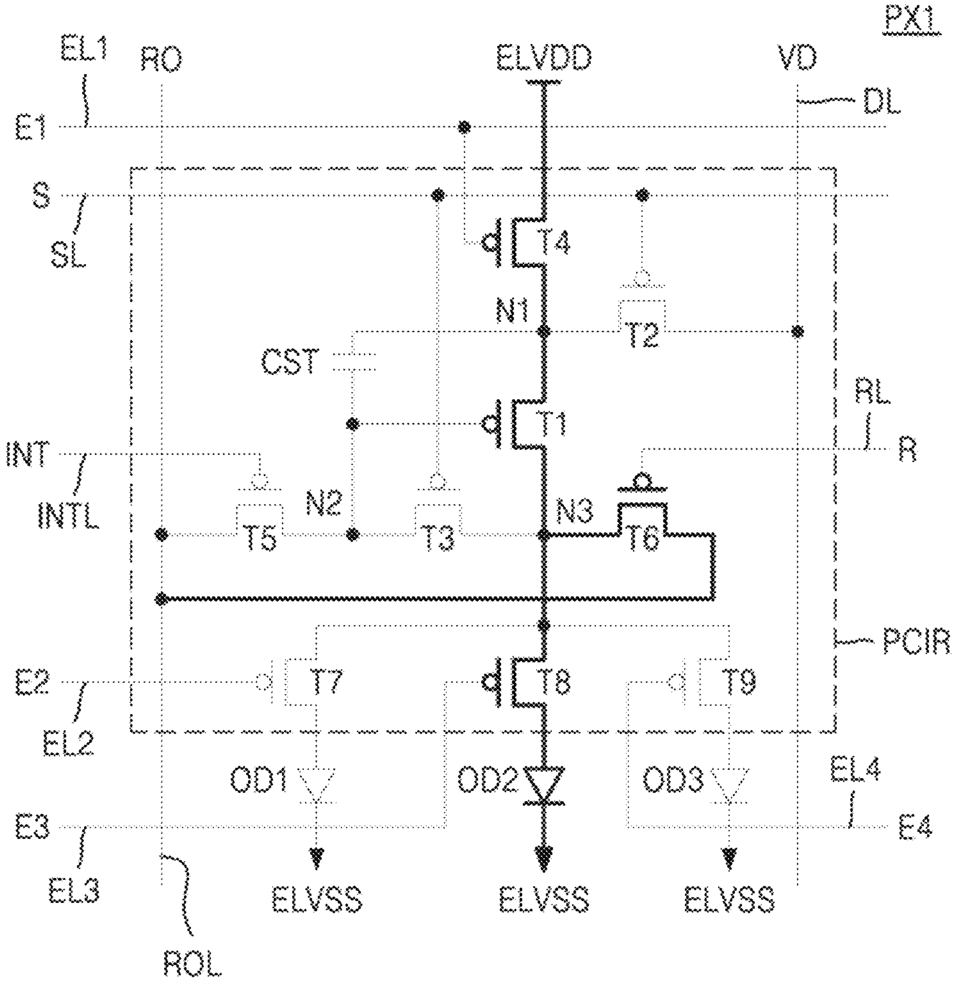

A method of measuring the second forward voltage VF2 is described with reference to FIGS. 11 and 13D. Referring to FIGS. 2, 11, and 13D, in the fourth read-out section RO4, the scan signal S may be logic-high, the initialization signal INT may be logic-high, the read-out control signal R may be logic-low, the first emission control signal E1 may be logic-low, the second emission control signal E2 may be logic-high, the third emission control signal E3 may be logic-low, and the fourth emission control signal E4 may be logic-high. In this regard, in the fourth read-out section RO4, the scan driver 113 may output the scan signal S at an inactive level through the scan line SL, output the initialization signal INT at an inactive level through the initialization line INTL, output the read-out control signal R at an active level through the read-out control line RL, output the first emission control signal E1 at an active level through the first emission control line EL1, output the second emission control signal E2 at an inactive level through the second emission control line EL2, output the third emission control signal E3 at an active level through the third emission control line EL3, and output the fourth emission control signal E4 at an inactive level through the fourth emission control line EL4. In the fourth read-out section RO4, the second transistor T2, the third transistor T3, the fifth transistor T5, the seventh transistor T7, and the ninth transistor T9 may be turned off, and the fourth transistor T4, the sixth transistor T6, and the eighth transistor T8 may be turned on.

The fourth transistor T4 may be turned on in response to the first emission control signal E1 that is at an active level. In response to the read-out control signal R that is at an active level, the sixth transistor T6 may be turned on. The eighth transistor T8 may be turned on in response to the third emission control signal E3 that is at an active level. In response to the scan signal S that is at an inactive level, the second transistor T2 may be turned off. In response to the scan signal S that is at an inactive level, the third transistor T3 may be turned off. In response to the initialization signal INT that is at an inactive level, the fifth transistor T5 may be turned off. The seventh transistor T7 may be turned off in response to the second emission control signal E2 that is at an inactive level. The ninth transistor T9 may be turned off in response to the fourth emission control signal E4 that is at an inactive level.

The fourth transistor T4 may be turned on in response to the first emission control signal E1 that is at an active level. The eighth transistor T8 may be turned on in response to the third emission control signal E3 that is at an active level. The fourth and eighth transistors T4 and T8 may be all turned on, and thus, the driving current ID may flow through the second OLED OD2. In response to the read-out control signal R that is at an active level, the sixth transistor T6 may be turned on. The sixth transistor T6 may be turned on, and thus, the third node N3 may be electrically connected to the read-out line ROL. The second forward voltage VF2 may be output through the read-out line ROL.

the read-out circuit 114 may receive the second forward voltage VF2 through the read-out line ROL. The read-out circuit 114 may perform an ADC operation on the second forward voltage VF2 and generate read-out data. That is, the read-out circuit 114 may generate data corresponding to a forward voltage of the second OLED OD2.

Figure 12:
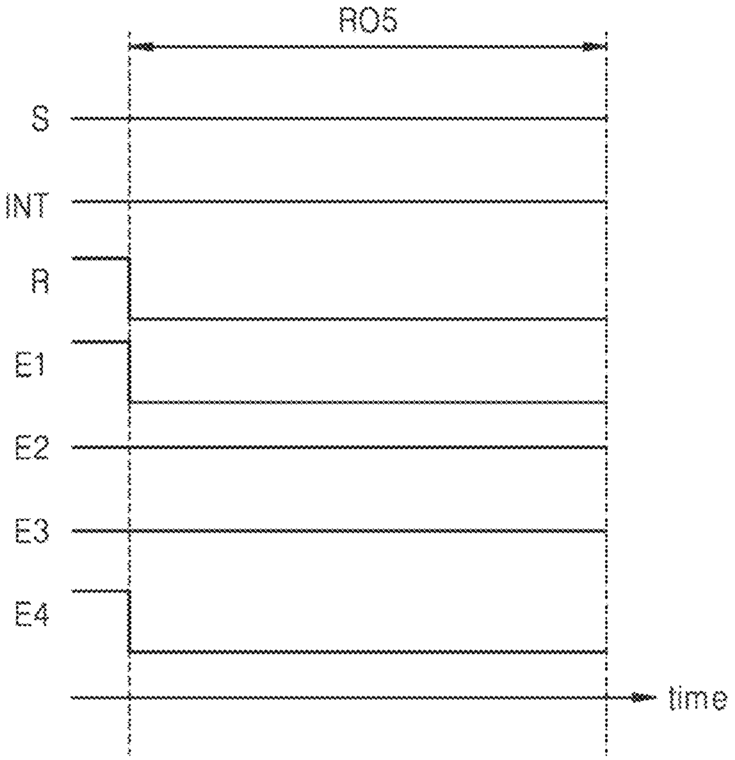
Figure 13E:
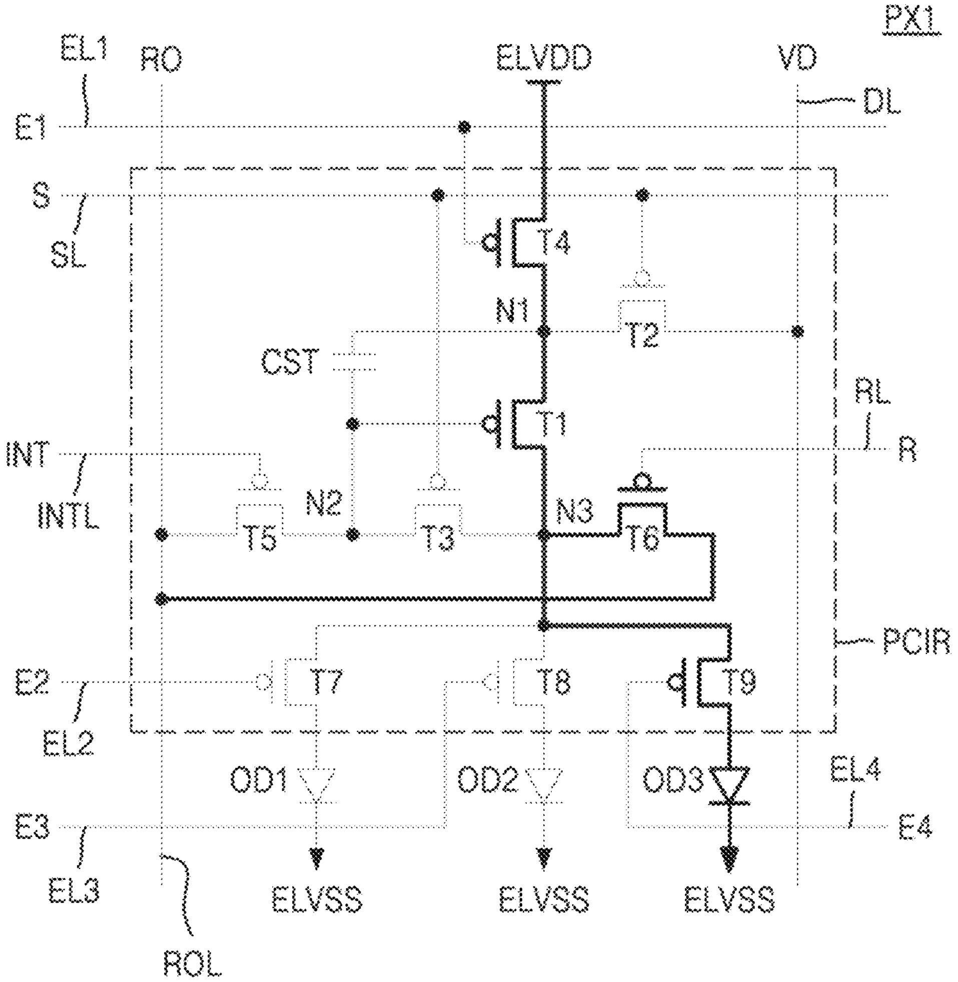

A method of measuring the third forward voltage VF3 is described with reference to FIGS. 12 and 13E. Referring to FIGS. 2, 12, and 13E, in the fifth read-out section RO45, the scan signal S may be logic-high, the initialization signal INT may be logic-high, the read-out control signal R may be logic-low, the first emission control signal E1 may be logic-low, the second emission control signal E2 may be logic-high, the third emission control signal E3 may be logic-high, and the fourth emission control signal E4 may be logic-low. In this regard, in the fifth read-out section RO5, the scan driver 113 may output the scan signal S at an inactive level through the scan line SL, output the initialization signal INT at an inactive level through the initialization line INTL, output the read-out control signal R at an active level through the read-out control line RL, output the first emission control signal E1 at an active level through the first emission control line EL1, output the second emission control signal E2 at an inactive level through the second emission control line EL2, output the third emission control signal E3 at an inactive level through the third emission control line EL3, and output the fourth emission control signal E4 at an active level through the fourth emission control line EL4. In the fifth read-out section RO5, the second transistor T2, the third transistor T3, the fifth transistor T5, the seventh transistor T7, and the eighth transistor T8 may be turned off, and the fourth transistor T4, the sixth transistor T6, and the ninth transistor T9 may be turned on.

In response to the first emission control signal E1 that is at an active level, the fourth transistor T4 may be turned on. In response to the read-out control signal R that is at an active level, the sixth transistor T6 may be turned on. In response to the fourth emission control signal E4 that is at an active level, the ninth transistor T9 may be turned on. In response to the scan signal S that is at an inactive level, the second transistor T2 may be turned off. In response to the scan signal S that is at an inactive level, the third transistor T3 may be turned off. In response to the initialization signal INT that is at an inactive level, the fifth transistor T5 may be turned off. In response to the second emission control signal E2 that is at an inactive level, the seventh transistor T7 may be turned off. In response to the third emission control signal E3 that is at an inactive level, the eighth transistor T8 may be turned off.

In response to the first emission control signal E1 that is at an active level, the fourth transistor T4 may be turned on. In response to the fourth emission control signal E4 that is at an active level, the ninth transistor T9 may be turned on. The fourth and ninth transistors T4 and T9 may be all turned on, and thus, the driving current ID may flow through the third OLED OD3. In response to the read-out control signal R that is at an active level, the sixth transistor T6 may be turned on. The sixth transistor T6 may be turned on, and thus, the third node N3 may be electrically connected to the read-out line ROL. The third forward voltage VF3 may be output through the read-out line ROL.

The read-out circuit 114 may receive the third forward voltage VF3 through the read-out line ROL. The read-out circuit 114 may perform an ADC operation on the third forward voltage VF3 and generate read-out data. That is, the read-out circuit 114 may generate data corresponding to a forward voltage of the third OLED OD3.

The display device 100 may detect electrical properties of a pixel during a test operation. The display device 100 may measure (or confirm) magnitudes of driving currents of the pixel PX1 and a distribution thereof. The display device 100 may measure a distribution of a driving transistor (i.e., the first transistor T1) by measuring the threshold voltage VTH. The display device 100 may detect defects of a pixel by using the driving current and a threshold voltage and ensure current uniformity. The display device 100 may measure a degree of degradation due to long-term use of each of the first to third OLEDs OD1, OD2, and OD3 by measuring a magnitude of a forward voltage. DFT may be applied to the display device 100, and thus, testability of the pixel PX1 may be ensured even on wafer and package levels. Accordingly, the quality of a semiconductor chip may be maintained and test efficiently may improve.

Figure 14:
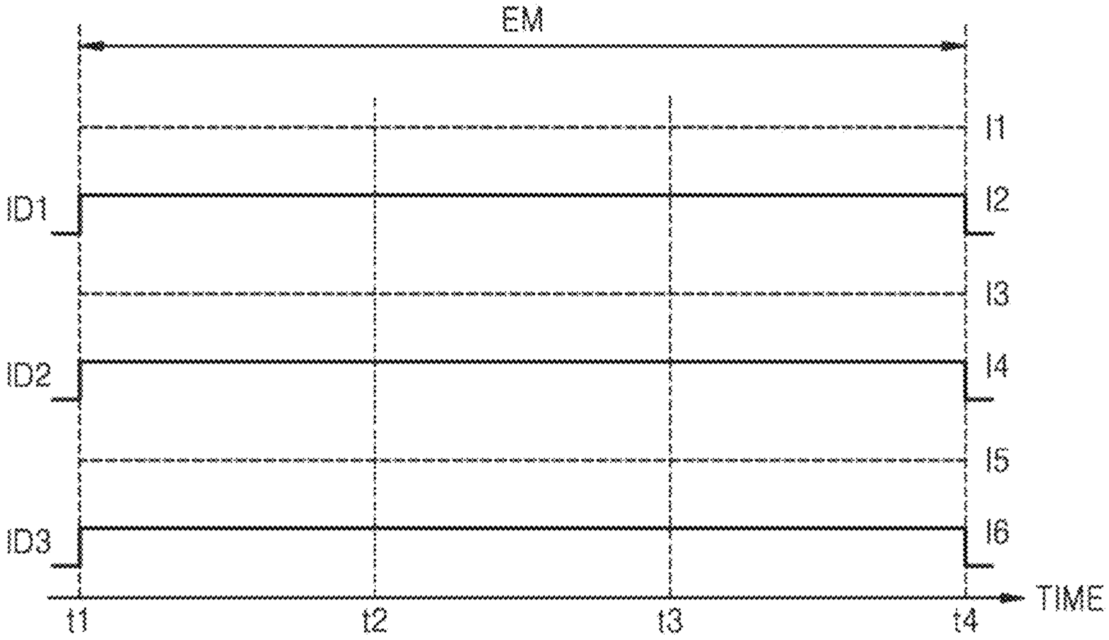
FIG. 14 is a graph showing a driving current of the pixel of FIG. 3B.
Figure 15:
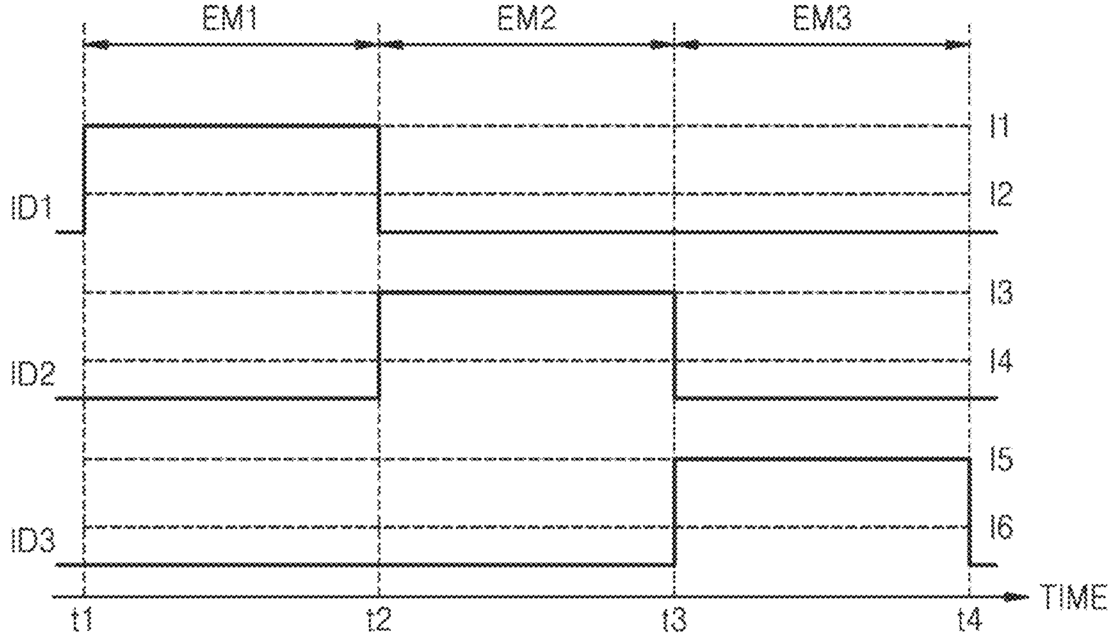
FIG. 15 is a graph showing a driving current of a pixel according to an embodiment.

FIG. 14 is a graph showing a driving current of the pixel of FIG. 3B. FIG. 15 is a graph showing a driving current of a pixel according to an embodiment.

An abscissa denotes time, and an ordinate denotes a driving current. FIG. 14 shows a driving current of the pixel group PG of FIG. 3B, and FIG. 15 shows a driving current of the pixel PX1 of FIG. 2. Referring to FIGS. 3B and 14, a first driving current ID1 may be assumed to flow through a first OLED OD1 of a first pixel PXb1, a second driving current ID2 may be assumed to flow through a second OLED OD2 of a second pixel PXb2, and a third driving current ID3 may be assumed to flow through a third OLED OD3 of a third pixel PXb3. A first current amount I1 may be assumed to be three times a second current amount I2, a third current amount I3 may be assumed to be three times a fourth current amount I4, and a fifth current amount I5 may be assumed to be three times a sixth current amount I6.

An emission section EM may be from a first time point t1 to a fourth time point t4. During the emission section EM, the first driving current ID1 may flow in the second current amount I2. During the emission section EM, the second driving current ID2 may flow in the fourth current amount I4. During the emission section EM, the third driving current ID3 may flow in the sixth current amount I6. That is, in one frame, the first to third OLEDs OD1, OD2, and OD3 may continue to emit light.

Referring to FIGS. 2 and 15, the first driving current ID1 may be assumed to flow through the first OLED OD1 of the pixel PX1, the second driving current ID2 may be assumed to flow through the second OLED OD2 of the pixel PX1, and the third driving current ID3 may be assumed to flow through the third OLED OD3 of the pixel PX1.

A first emission section EM1 may be from the first time point t1 to a second time point t2, a second emission section EM2 may be from the second time point t2 to a third time point t3, and a third emission section EM3 may be from the third time point t3 to the fourth time point t4.

The first driving current ID1 may flow in the first current amount I1 during the first emission section EM1. The second driving current ID2 may flow in the third current amount I3 during the second emission section EM2. The third driving current ID3 may flow in the fifth current amount I5 during the third emission section EM3. The pixel PX1 may drive a plurality of OLEDs through time multiplexing. That is, in one frame, the first OLED OD1 may emit light during the first emission section EM1 and may not emit light during the second and third emission sections EM2 and EM3. The second OLED OD2 may emit light during the second emission section EM2 and may not emit light during the first and third emission sections EM1 and EM3. The third OLED OD3 may emit light during the third emission section EM3 and may not emit light during the first and second emission sections EM1 and EM2.

As compared to FIG. 14, because an emission time of each of the first to third OLEDs OD1 to OD3 of the pixel PX1 is reduced, a driving current may increase so that each of the first to third OLEDs OD1 to OD3 may emit light with the same luminance. That is, the first driving current ID1 may flow in the first current amount I1, which is three times the second current amount I2, the second driving current ID2 may flow in the third current amount I3, which is three times the fourth current amount I4, and the third driving current ID3 may flow in the fifth current amount I5, which is three times the sixth current amount I6.

As described above, the pixel according to an embodiment may include a plurality of OLEDs through time multiplexing. That is, the plurality of OLEDs may share a pixel circuit. By contrast, as an emission time of each of the OLEDs is reduced, a driving current may increase so that each of the OLEDs may emit light with the same luminance.

Figure 16A:
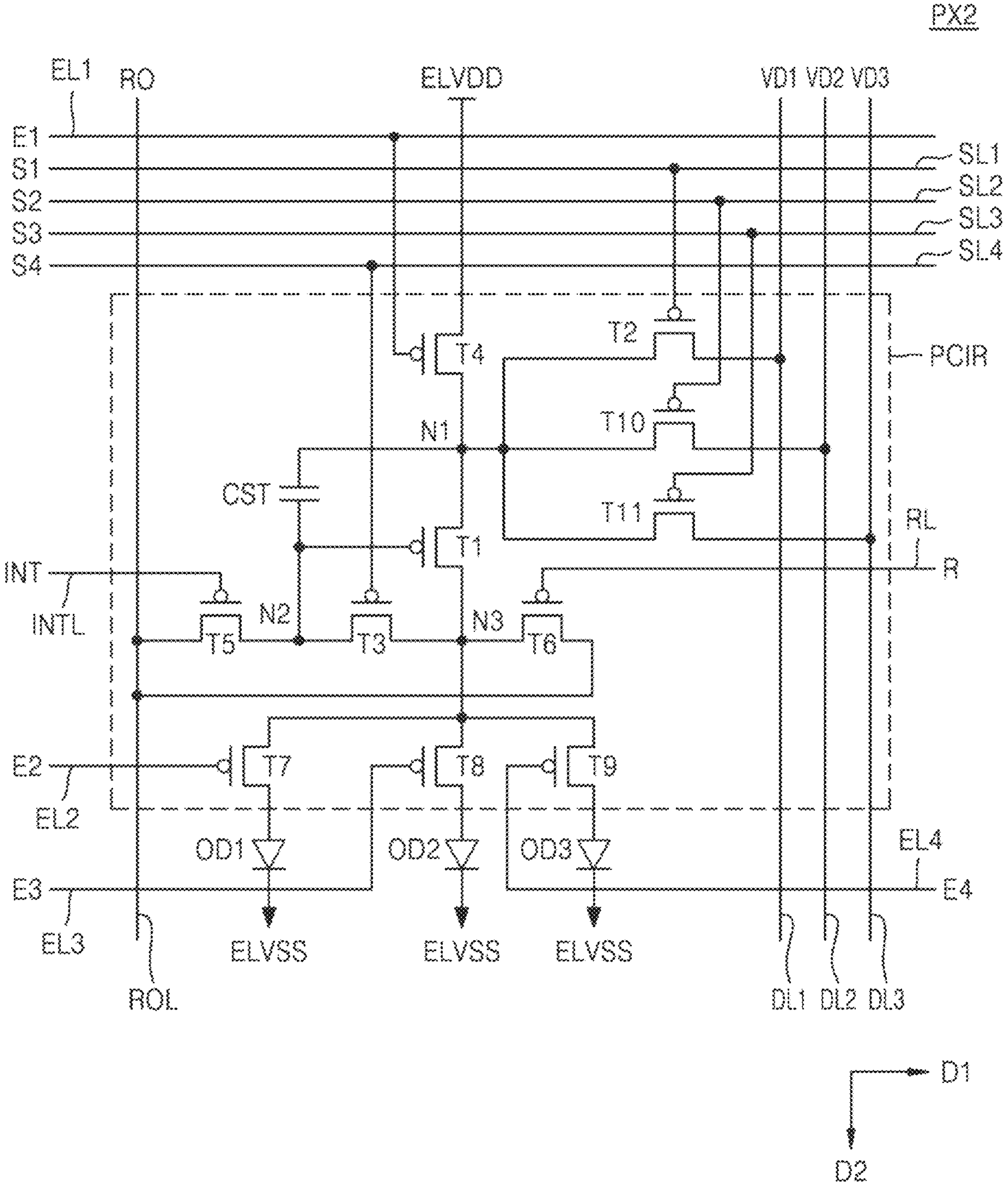
FIG. 16A is a circuit diagram of an example of a pixel according to an embodiment.

FIG. 16A is a circuit diagram of an example of a pixel according to an embodiment. A pixel PX2 of FIG. 16A may be applied to display device of FIG. 1. Each pixel PX of FIG. 1 may include the pixel PX2 of FIG. 16A. Detailed descriptions of components that are the same as or similar to those of the pixel PX1 of FIG. 2 may be omitted, and differences are mainly described.

Referring to FIGS. 1 and 16A, the pixel PX2 may include a first OLED OD1, a second OLED OD2, a third OLED OD3, and a pixel circuit PCIR. The pixel PX2 may include a first scan line SL1 extending in a first direction D1, a second scan line SL2 extending in the first direction D1, a third scan line SL3 extending in the first direction D1, a fourth scan line SL4 extending in the first direction D1, a first emission control line EL1 extending in the first direction D1, a second emission control line EL2 extending in the first direction D1, a third emission control line EL3 extending in the first direction D1, a fourth emission control line EL4 extending in the first direction D1, an initialization line INTL extending in the first direction D1, a read-out control line RL extending in the first direction D1, a first data line DL1 extending in a second direction D2 that intersects with the first direction D1, a second data line DL2 extending in the second direction D2, a third data line DL3 extending in the second direction D2, a read-out line ROL extending in the second direction D2, first to eleventh transistors T1 to T11, a storage capacitor CST, and the first to third OLEDs OD1 to OD3. That is, the pixel PX2 may include three OLEDs, eleven transistors, ten control lines extending in the first direction D1 (i.e., the first scan line SL1, the second scan line SL2, the third scan line SL3, the fourth scan line SL4, the first emission control line EL1, the second emission control line EL2, the third emission control line EL3, the fourth emission control line EL4, the initialization line INTL, and the read-out control line RL), four lines extending in the second direction (i.e., the first data line DL1, the second data line DL2, the third data line DL3, and the read-out line ROL).

An anode electrode of each of the first to third OLEDs OD1, OD2, and OD3 may be connected to the pixel circuit PCIR, and a cathode electrode of each of the first to third OLEDs OD1, OD2, and OD3 may be connected to a second driving power source ELVSS. Each of the first to third OLEDs OD1, OD2, and OD3 may emit light with a luminance corresponding to the amount of current supplied from the pixel circuit PCIR. A brightness of the first OLED OD1 may be controlled by a voltage (i.e., a first data voltage VD1) of the first data line DL1. A brightness of the second OLED OD2 may be controlled by a voltage (i.e., a second data voltage VD2) of the second data line DL2. A brightness of the third OLED OD1 may be controlled by a voltage (i.e., a third data voltage VD3) of the third data line DL3.

In response to a data voltage, the pixel circuit PCIR may control the amount of current flowing from a first driving power source ELVDD to the second driving power source ELVSS via each of the first to third OLEDs OD1, OD2, and OD3. The pixel circuit PCIR may include the first to eleventh transistors T1 to T11 and a storage capacitor CST.

The first transistor T1 may be connected between a first node N1 and a third node N3 and operate in response to a voltage of a second node N2. A first electrode of the first transistor T1 may be connected to the first node N1, and a second electrode of the first transistor T1 may be connected to the third node N3. A gate electrode of the first transistor T1 may be connected to the second node N2. In response to a voltage of the second node N2, the first transistor T1 may control the amount of current flowing from the first driving power source ELVDD to the second driving power source ELVSS via each of the first to third OLEDs OD1, OD2, and OD3.

The second transistor T2 may be connected between the first data line DL1 and the first node N1 and operate in response to a first scan signal S1. A first electrode of the second transistor T2 may be connected to the first data line DL1, and a second electrode of the second transistor T2 may be connected to the first node N1. A gate electrode of the second transistor T2 may be connected to the first scan line SL1. In response to the first scan signal S1 that is provided at an active level through the first scan line SL1, the second transistor T2 may be turned on. The second transistor T2 may be turned on, and thus, the first node N1 may be electrically connected to the first data line DL1.

The third transistor T3 may be connected between the second node N2 and the third node N3 and operate in response to a fourth scan signal S4. A first electrode of the third transistor T3 may be connected to the second node N2, and a second electrode of the third transistor T3 may be connected to the third node N3. A gate electrode of the third transistor T3 may be connected to the fourth scan line SL4. In response to a fourth scan signal S4 that is provided at an active level through the fourth scan line SL4, the third transistor T3 may be turned on. The third transistor T3 may be turned on, and thus, the second node N2 may be electrically connected to the third node N3. That is, the third transistor T3 may be diode-connected to the first transistor T1.

In an embodiment, a scan driver 113 may include an AND circuit. The AND circuit may receive the first scan signal S1, a second scan signal S2, and a third scan signal S3. The AND circuit may generate and output the fourth scan signal S4 by performing an AND operation on the first scan signal S1, the second scan signal S2, and the third scan signal S3. That is, the fourth scan signal S4 may be expressed as in Equation 8. Here, S4 denotes the fourth scan signal S4, S1 denotes the first scan signal S1, S2 denotes the second scan signal S2, and S3 denotes the third scan signal S3.

$$S4 = S1 \text{ AND } S2 \text{ AND } S3 \quad \text{[Equation 8]}$$

The fourth transistor T4 may be connected between the first driving power source ELVDD and the first node N1 and operate in response to a first emission control signal E1. A first electrode of the fourth transistor T4 may be connected to the first driving power source ELVDD, and a second electrode of the fourth transistor T4 may be connected to the first node N1. A gate electrode of the fourth transistor T4 may be connected to the first emission control line EL1. In response to the first emission control signal E1 that is provided at an active level through the first emission control line EL1, the fourth transistor T4 may be turned on. The fourth transistor T4 may be turned on, and thus, a voltage of the first driving power source ELVDD may be provided to the first node N1.

The fifth transistor T5 may be connected between the read-out line ROL and the second node N2 and operate in response to an initialization signal INT. A first electrode of the fifth transistor T5 may be connected to the read-out line ROL, and a second electrode of the fifth transistor T5 may be connected to the second node N2. A gate electrode of the fifth transistor T5 may be connected to the initialization line INTL. In response to the initialization signal INT that is provided at an active level through the initialization line INTL, the fifth transistor T5 may be turned on. The fifth transistor T5 may be turned on, and thus, a voltage of an initialization power source VINT may be provided to the second node N2.

The sixth transistor T6 may be connected between the read-out line ROL and the third node N3 and operate in response to a read-out control signal R. A first electrode of the sixth transistor T6 may be connected to the read-out line ROL, and a second electrode of the sixth transistor T6 may be connected to the third node N3. A gate electrode of the sixth transistor T6 may be connected to the read-out control line RL. In response to the read-out control signal R that is provided at an active level through the read-out control line RL, the sixth transistor T6 may be turned on. The sixth transistor T6 may be turned on, and thus, the third node N3 may be electrically connected to the read-out line ROL.

The seventh transistor T7 may be connected between the third node N3 and the first OLED OD1 and operate in response to a second emission control signal E2. A first electrode of the seventh transistor T7 may be connected to the third node N3, and a second electrode of the seventh transistor T7 may be connected to the anode electrode of the first OLED OD1. A gate electrode of the seventh transistor T7 may be connected to the second emission control line EL2. In response to the second emission control signal E2 that is provided at an active level through the second emission control line EL2, the seventh transistor T7 may be turned on. The seventh transistor T7 may be turned on, and thus, the third node N3 may be electrically connected to the anode electrode of the first OLED OD1.

The eighth transistor T8 may be connected between the third node N3 and the second OLED OD2 and operate in response to a third emission control signal E3. A first electrode of the eighth transistor T8 may be connected to the third node N3, and a second electrode of the eighth transistor T8 may be connected to the anode electrode of the second OLED OD2. A gate electrode of the eighth transistor T8 may be connected to the third emission control line EL3. In response to the third emission control signal E3 that is provided at an active level through the third emission control line EL3, the eighth transistor T8 may be turned on. The eighth transistor T8 may be turned on, and thus, the third node N3 may be electrically connected to the anode electrode of the second OLED OD2.

The ninth transistor T9 may be connected between the third node N3 and the third OLED OD3 and operate in response to the fourth emission control signal E4. A first electrode of the ninth transistor T9 may be connected to the third node N3, and a second electrode of the ninth transistor T9 may be connected to the anode electrode of the third OLED OD3. A gate electrode of the ninth transistor T9 may be connected to the fourth emission control line EL4. In response to the fourth emission control signal E4 that is provided at an active level through the fourth emission control line EL4, the ninth transistor T9 may be turned on. The ninth transistor T9 may be turned on, and thus, the third node N3 may be electrically connected to the anode electrode of the third OLED OD3.

The tenth transistor T10 may be connected between the second data line DL2 and the first node N1 and operate in response to the second scan signal S2. A first electrode of the tenth transistor T10 may be connected to the second data line DL2, and a second electrode of the tenth transistor T10 may be connected to the first node N1. A gate electrode of the tenth transistor T10 may be connected to the second scan line SL2. In response to the second scan signal S2 that is provided at an active level through the second scan line SL2, the tenth transistor T10 may be turned on. The tenth transistor T10 may be turned on, and thus, the first node N1 may be electrically connected to the second data line DL2.

The eleventh transistor T11 may be connected between the third data line DL3 and the first node N1 and operate in response to the third scan signal S3. A first electrode of the eleventh transistor T11 may be connected to the third data line DL3, and a second electrode of the second transistor T2 may be connected to the first node N1. A gate electrode of the eleventh transistor T11 may be connected to the third scan line SL3. In response to the third scan signal S3 that is provided at an active level through the third scan line SL3, the eleventh transistor T11 may be turned on. The eleventh transistor T11 may be turned on, and thus, the first node N1 may be electrically connected to the third data line DL3. The storage capacitor CST may be connected between the first node N1 and the second node N2.

Similar to the pixel PX1 of FIG. 2, the pixel PX2 of FIG. 15A may expand a range of a voltage of data. A W/L size of the third transistor T3 may be different from a W/L size of the second transistor T2. In an embodiment, the W/L size of the third transistor T3 may be greater than the W/L size of the second transistor T2. Due to a difference between the sizes of transistors, a range of a data voltage corresponding to a range of the amount of current flowing through a pixel may increase. That is, a variation range of the data voltage corresponding to a variation range of a driving current may be expanded. Controlling a brightness or luminance of pixels may be facilitated by using the data voltage.

Figure 16B:
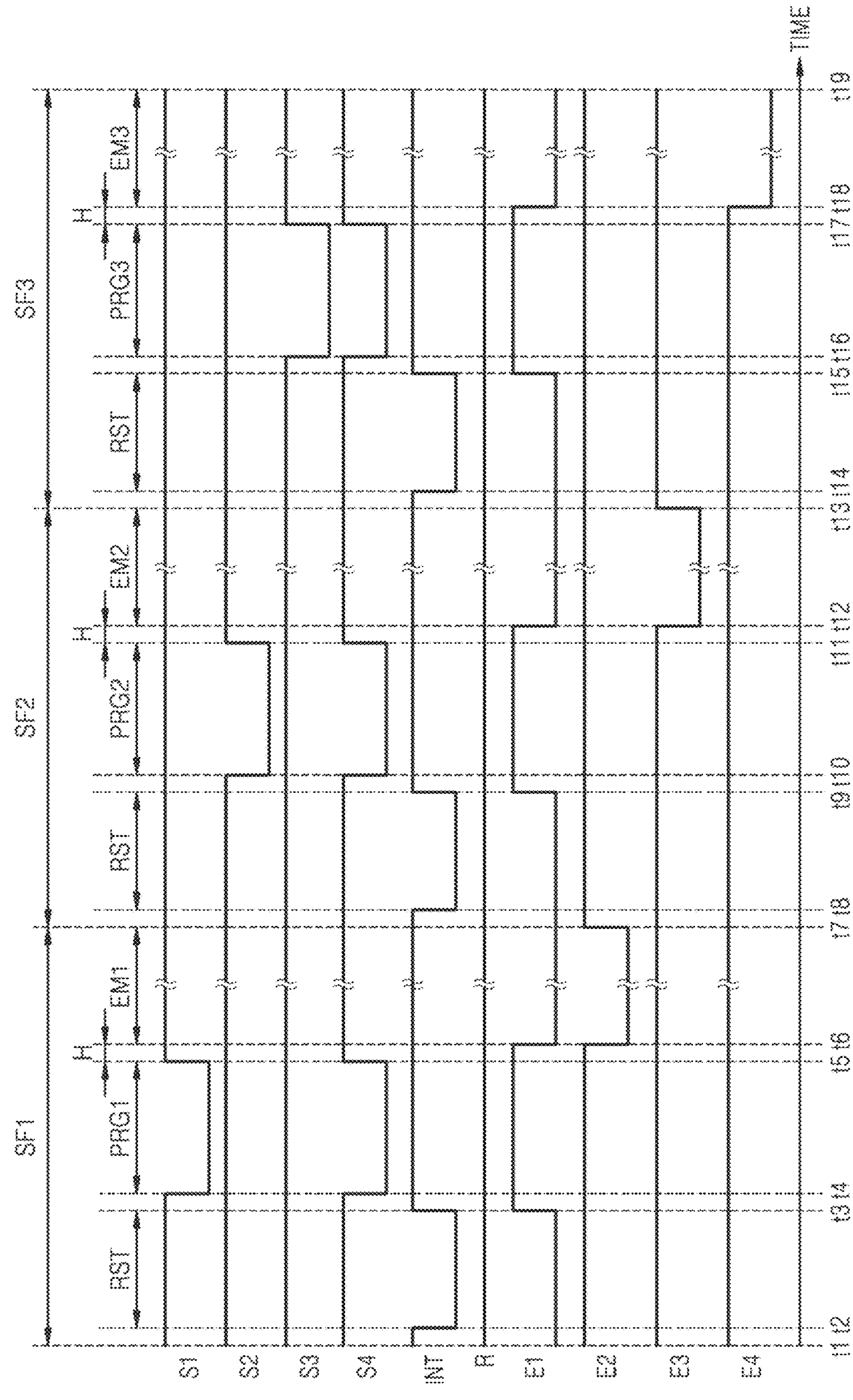
FIG. 16B is a timing diagram of a plurality of signals for controlling a pixel, according to an embodiment.

FIG. 16B is a timing diagram of a plurality of signals for controlling a pixel, according to an embodiment. The plurality of signals may be provided to the pixel PX2 of FIG. 16A and are described with reference to FIG. 16A.

A frame may include first to third sub-frames SF1 to SF3. The first sub-frame SF1 may include a reset section RST, a first program section PRG1, a hold section H, and a first emission section EM1. The second sub-frame SF2 may include a reset section RST, a second program section PRG2, a hold section H, and a second emission section EM2. The third sub-frame SF3 may include a reset section RST, a third program section PRG3, a hold section H, and a third emission section EM3. In the reset section RST of each of the first to third sub-frames SF1 to SF3, a scan driver 113 may output the same control signals. In the hold section H of each of the first to third sub-frames SF1 to SF3, the scan driver 113 may output the same control signals.

A first scan signal S1 may be logic-high from a first time point t1 to a fourth time point t4. The first scan signal S1 may be logic-low from the fourth time point t4 to a fifth time point t5. The first scan signal S1 may be logic-high from the fifth time point t5 to a nineteenth time point t19. The first scan signal S1 may transition from logic-high to logic-low at the fourth time point t4, while the first scan signal S1 may transition from logic-low to logic-high at the fifth time point t5.

A second scan signal S2 may be logic-high from the first time point t1 to a tenth time point t10. The second scan signal S2 may be logic-low from the tenth time point t10 to an eleventh time point t11. The second scan signal S2 may be logic-high from the eleventh time point t11 to the nineteenth time point t19. The second scan signal S2 may transition from logic-high to logic-low at the tenth time point t10, while the second scan signal S2 may transition from logic-low to logic-high at the eleventh time point t11.

A third scan signal S3 may be logic-high from the first time point t1 to a sixteenth time point t16. The third scan signal S3 may be logic-low from the sixteenth time point t16 to a seventeenth time point t17. The third scan signal S3 may be logic-high from the seventeenth time point t17 to the nineteenth time point t19. The third scan signal S3 may transition from logic-high to logic-low at the sixteenth time point t16, while the third scan signal S3 may transition from logic-low to logic-high at the seventeenth time point t17.

A fourth scan signal S4 may be logic-high from the first time point t1 to the fourth time point t4. The fourth scan signal S4 may be logic-low from the fourth time point t4 to the fifth time point t5. The fourth scan signal S4 may be logic-high from the fifth time point t5 to the tenth time point t10. The fourth scan signal S4 may be logic-low from the tenth time point t10 to the eleventh time point t11. The fourth scan signal S4 may be logic-high from the eleventh time point t11 to the sixteenth time point t16. The fourth scan signal S4 may be logic-low from the sixteenth time point t16 to the seventeenth time point t17. The fourth scan signal S4 may be logic-high from the seventeenth time point t17 to the nineteenth time point t19. The fourth scan signal S4 may transition from logic-high to logic-low at the fourth time point t4. The fourth scan signal S4 may transition from logic-low to logic-high at the fifth time point t5. The fourth scan signal S4 may transition from logic-high to logic-low at the tenth time point t10. The fourth scan signal S4 may transition from logic-low to logic-high at the eleventh time point t11. The fourth scan signal S4 may transition from logic-high to logic-low at the sixteenth time point t16. The fourth scan signal S4 may transition from logic-low to logic-high at the seventeenth time point t17.

An initialization signal INT may be logic-high from the first time point t1 to a second time point t2. The initialization signal INT may be logic-low from the second time point t2 to a third time point t3. The initialization signal INT may be logic-high from the third time point t3 to an eighth time point t8. The initialization signal INT may be logic-low from the eighth time point t8 to a ninth time point t9. The initialization signal INT may be logic-high from the ninth time point t9 to a fourteenth time point t14. The initialization signal INT may be logic-low from the fourteenth time point t14 to a fifteenth time point t15. The initialization signal INT may be logic-high from the fifteenth time point t15 to the nineteenth time point t19. The initialization signal INT may transition from logic-high to logic-low at the second time point t2. The initialization signal INT may transition from logic-low to logic-high at the third time point t3. The initialization signal INT may transition from logic-high to logic-low at the eighth time point t8. The initialization signal INT may transition from logic-low to logic-high at the ninth time point t9. The initialization signal INT may transition from logic-high to logic-low at the fourteenth time point t14. The initialization signal INT may transition from logic-low to logic-high at the fifteenth time point t15.

A read-out control signal R may be logic-high from the first time point t1 to the nineteenth time point t19. A first emission control signal E1 may be logic-low from the first time point t1 to the third time point t3. The first emission control signal E1 may be logic-high from the third time point t3 to a sixth time point t6. The first emission control signal E1 may be logic-low from the sixth time point t6 to the ninth time point t9. The first emission control signal E1 may be logic-high from the ninth time point t9 to a twelfth time point t12. The first emission control signal E1 may be logic-low from the twelfth time point t12 to the fifteenth time point t15. The first emission control signal E1 may be logic-high from the fifteenth time point t15 to an eighteenth time point t18. The first emission control signal E1 may be logic-low from the eighteenth time point t18 to the nineteenth time point t19. The first emission control signal E1 may transition from logic-low to logic-high at the third time point t3. The first emission control signal E1 may transition from logic-high to logic-low at the sixth time point t6. The first emission control signal E1 may transition from logic-low to logic-high at the ninth time point t9. The first emission control signal E1 may transition from logic-high to logic-low at the twelfth time point t12. The first emission control signal E1 may transition from logic-low to logic-high at the fifteenth time point t15. The first emission control signal E1 may transition from logic-high to logic-low at the eighteenth time point t18.

A second emission control signal E2 may be logic-high from the first time point t1 to the sixth time point t6. The second emission control signal E2 may be logic-low from the sixth time point t6 to a seventh time point t7. The second emission control signal E2 may be logic-high from the seventh time point t7 to the nineteenth time point t19. The second emission control signal E2 may transition from logic-high to logic-low at the sixth time point t6, while the second emission control signal E2 may transition from logic-low to logic-high at the seventh time point t7.

A third emission control signal E3 may be logic-high from the first time point t1 to the twelfth time point t12. The third emission control signal E3 may be logic-low from the twelfth time point t12 to a thirteenth time point t13. The third emission control signal E3 may be logic-high from the thirteenth time point t13 to the nineteenth time point t19. The third emission control signal E3 may transition from logic-high to logic-low at the twelfth time point t12, while the third emission control signal E3 may transition from logic-low to logic-high from the thirteenth time point t13.

A fourth emission control signal E4 may be logic-high from the first time point t1 to the eighteenth time point t18. The fourth emission control signal E4 may be logic-low from the eighteenth time point t18 to the nineteenth time point t19. At the eighteenth time point t18, the fourth emission control signal E4 may transition from logic-high to logic-low.

The first sub-frame SF1 may be from the first time point t1 to the seventh time point t7. The reset section RST of the first sub-frame SF1 may be from the second time point t2 to the third time point t3, a program section (i.e., the first program section PRG1) of the first sub-frame SF1 may be from the fourth time point t4 to the fifth time point t5, the hold section H of the first sub-frame SF1 may be from the fifth time point t5 to the sixth time point t6, and an emission section (i.e., the first emission section EM1) of the first sub-frame SF1 may be from the sixth time point t6 to the seventh time point t7.

The second sub-frame SF2 may be from the seventh time point t7 to the thirteenth time point t13. The reset section RST of the second sub-frame SF2 may be from the eighth time point t8 to the ninth time point t9, a program section (i.e., the second program section PRG2) of the second sub-frame SF2 may be from the tenth time point t10 to the eleventh time point t11, the hold section H of the second sub-frame SF2 may be from the eleventh time point t11 to the twelfth time point t12, and an emission section (i.e., the second emission section EM2) of the second sub-frame SF2 may be from the twelfth time point t12 to the thirteenth time point t13.

The third sub-frame SF3 may be from the thirteenth time point t13 to the nineteenth time point t19. The reset section RST of the third sub-frame SF3 may be from the fourteenth time point t14 to the fifteenth time point t15, a program section (i.e., the third program section PRG3) of the third sub-frame SF3 may be from the sixteenth time point t16 to the seventeenth time point t17, the hold section H of the third sub-frame SF3 may be from the seventeenth time point t17 to the eighteenth time point t18, and an emission section (i.e., the third emission section EM3) of the third sub-frame SF3 may be from the eighteenth time point t18 to the nineteenth time point t19.

In the first program section PRG1, a data driver 112 may output a first data voltage VD1 corresponding to a first OLED OD1. In the second program section PRG2, the data driver 112 may output a second data voltage VD2 corresponding to a second OLED OD2. In the third program section PRG3, the data driver 112 may output a third data voltage VD3 corresponding to a third OLED OD3. In the reset section RST, the scan driver 113 may output the first scan signal S1 at an inactive level through a first scan line SL1, output the second scan signal S2 at an inactive level through a second scan line SL2, output the third scan signal S3 at an inactive level through a third scan line SL3, output the fourth scan signal S4 at an inactive level through a fourth scan line SL4, output the initialization signal INT at an active level through an initialization line INTL, output the read-out control signal R at an inactive level through a read-out control line RL, output the first emission control signal E1 at an active level through a first emission control line EL1, output the second emission control signal E2 at an inactive level through a second emission control line EL2, output the third emission control signal E3 at an inactive level through a third emission control line EL3, and output the fourth emission control signal E4 at an inactive level through a fourth emission control line EL4. Accordingly, in the reset section RST, the second transistor T2, the third transistor T3, the sixth transistor T6, the seventh transistor T7, the eighth transistor T8, the ninth transistor T9, the tenth transistor T10, and the eleventh transistor T11 may be turned off, and the fourth transistor T4 and the fifth transistor T5 may be turned on.

In response to the first scan signal S1 that is at an inactive level, the second transistor T2 may be turned off. The second transistor T2 may be turned off, and thus, electrical connection between electrical connection between a first data line DL1 and the first node N1 may be cut off. In response to the fourth scan signal S4 that is at an inactive level, the third transistor T3 may be turned off. The third transistor T3 may be turned off, and thus, electrical connection between electrical connection between the second node N2 and the third node N3 may be cut off. In response to the read-out control signal R that is at an inactive level, the sixth transistor T6 may be turned off. The sixth transistor T6 may be turned off, and thus, electrical connection between electrical connection between a read-out line ROL and the third node N3 may be cut off. In response to the second emission control signal E2 that is at an inactive level, the seventh transistor T7 may be turned off. The seventh transistor T7 may be turned off, and thus, electrical connection between electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between electrical connection between the third node N3 and the third OLED OD3 may be cut off. In response to the second scan signal S2 that is at an inactive level, the tenth transistor T10 may be turned off. The tenth transistor T10 may be turned off, and thus, electrical connection between electrical connection between a second data line DL2 and the first node N1 may be cut off. In response to the third scan signal S3 that is at an inactive level, the eleventh transistor T11 may be turned off. The eleventh transistor T11 may be turned off, and thus, electrical connection between electrical connection between a third data line DL3 and the first node N1 may be cut off.

In response to the first emission control signal E1 that is at an active level the fourth transistor T4 may be turned on. The fourth transistor T4 may be turned on, and thus, a voltage of a first driving power source ELVDD may be provided to the first node N1. In response to the initialization signal INT that is at an active level the fifth transistor T5 may be turned on. The fifth transistor T5 may be turned on and provide an initialization power source VINT provided through the read-out line ROL to the second node N2. That is, a voltage of a gate of the first transistor T1 may be initialized to a voltage of the initialization power source VINT.

A storage capacitor CST may be charged with a voltage reduced from a voltage of the first driving power source ELVDD by as much as a voltage of the initialization power source VINT. In this regard, the storage capacitor CST may store a difference between the voltage of the first driving power source ELVDD and the voltage of the initialization power source VINT. In the hold section H, the scan driver 113 may output the first scan signal S1 at an inactive level through the first scan line SL1, output the second scan signal S2 at an inactive level through the second scan line SL2, output the third scan signal S3 at an inactive level through the third scan line SL3, output the fourth scan signal S4 at an inactive level through the fourth scan line SL4, output the initialization signal INT at an inactive level through the initialization line INTL, output the read-out control signal R at an inactive level through the read-out control line RL, output the first emission control signal E1 at an inactive level through the first emission control line EL1, output the second emission control signal E2 at an inactive level through the second emission control line EL2, output the third emission control signal E3 at an inactive level through the third emission control line EL3, and output the fourth emission control signal E4 at an inactive level through the fourth emission control line EL4. Accordingly, in the hold section H, the second transistor T2, the third transistor T3, the fourth transistor T4, the fifth transistor T5, the sixth transistor T6, the seventh transistor T7, the eighth transistor T8, the ninth transistor T9, the tenth transistor T10, and the eleventh transistor T11 may be turned off.

In response to the first scan signal S1 that is at an inactive level, the second transistor T2 may be turned off. The second transistor T2 may be turned off, and thus, electrical connection between electrical connection between the first data line DL1 and the first node N1 may be cut off. In response to the fourth scan signal S4 that is at an inactive level, the third transistor T3 may be turned off. The third transistor T3 may be turned off, and thus, electrical connection between electrical connection between the second node N2 and the third node N3 may be cut off. In response to the first emission control signal E1 that is at an inactive level, the fourth transistor T4 may be turned off. The fourth transistor T4 may be turned off, and thus, electrical connection between electrical connection between the first driving power source ELVDD and the first node N1 may be cut off. In response to the initialization signal INT that is at an inactive level, the fifth transistor T5 may be turned off. The fifth transistor T5 may be turned off, and thus, electrical connection between electrical connection between the read-out line ROL and the second node N2 may be cut off. In response to the read-out control signal R that is at an inactive level, the sixth transistor T6 may be turned off. The sixth transistor T6 may be turned off, and thus, electrical connection between electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between electrical connection between the third node N3 and the third OLED OD3 may be cut off. In response to the second scan signal S2 that is at an inactive level, the tenth transistor T10 may be turned off. The tenth transistor T10 may be turned off, and thus, electrical connection between the second data line DL2 and the first node N1 may be cut off. In response to the third scan signal S3 that is at an inactive level, the eleventh transistor T11 may be turned off. The eleventh transistor T11 may be turned off, and thus, electrical connection between the third data line DL3 and the first node N1 may be cut off.

In an embodiment, when at least one of the first to third scan signals S1 to S3 is at an active level, the fourth scan signal S4 may be at an active level For example, in the first program section PRG1, because the first scan signal S1 is at an active level, the fourth scan signal S4 may be at an active level In the second program section PRG2, because the second scan signal S2 is at an active level, the fourth scan signal S4 may be at an active level In the third program section PRG3, because the third scan signal S3 is at an active level, the fourth scan signal S4 may be at an active level In the first program section PRG1, the scan driver 113 may output the first scan signal S1 at an active level through the first scan line SL1, output the second scan signal S2 at an inactive level through the second scan line SL2, output the third scan signal S3 at an inactive level through the third scan line SL3, output the fourth scan signal S4 at an active level through the fourth scan line SLA, output the initialization signal INT at an inactive level through the initialization line INTL, output the read-out control signal R at an inactive level through the read-out control line RL, output the first emission control signal E1 at an inactive level through the first emission control line EL1, output the second emission control signal E2 at an inactive level through the second emission control line EL2, output the third emission control signal E3 at an inactive level through the third emission control line EL3, and output the fourth emission control signal E4 at an inactive level through the fourth emission control line EL4. Accordingly, in the first program section PRG1, the fourth transistor T4, the fifth transistor T5, the sixth transistor T6, the seventh transistor T7, the eighth transistor T8, the ninth transistor T9, the tenth transistor T10, and the eleventh transistor T11 may be turned off, and the second transistor T2, and the third transistor T3 may be turned on.

In response to the first emission control signal E1 that is at an inactive level, the fourth transistor T4 may be turned off. The fourth transistor T4 may be turned off, and thus, electrical connection between the first driving power source ELVDD and the first node N1 may be cut off. In response to the initialization signal INT that is at an inactive level, the fifth transistor T5 may be turned off. The fifth transistor T5 may be turned off, and thus, electrical connection between the read-out line ROL and the second node N2 may be cut off. In response to the read-out control signal R that is at an inactive level, the sixth transistor T6 may be turned off. The sixth transistor T6 may be turned off, and thus, electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between the third node N3 and the third OLED OD3 may be cut off. In response to the second scan signal S2 that is at an inactive level, the tenth transistor T10 may be turned off. The tenth transistor T10 may be turned off, and thus, electrical connection between the second data line DL2 and the first node N1 may be cut off. In response to the third scan signal S3 that is at an inactive level, the eleventh transistor T11 may be turned off. The eleventh transistor T11 may be turned off, and thus, electrical connection between the third data line DL3 and the first node N1 may be cut off. In response to the first scan signal S1 that is at an active level the second transistor T2 may be turned on. The second transistor T2 may be turned on and provide the first data voltage VD1 provided through the first data line DL1 to the first node N1. In response to the fourth scan signal S4 that is at an active level the third transistor T3 may be turned on. By turning on the third transistor T3, the second node N2 and the third node N3 may be connected to each other, and thus, the third transistor T3 may be diode-connected to the first transistor T1.

The first data voltage VD1 may be applied to the first node N1, and a voltage reduced from the first data voltage VD1 by an absolute value of a threshold voltage VTH may be applied to the second node N2. The storage capacitor CST may be charged up to the threshold voltage VTH. That is, the storage capacitor CST may store the threshold voltage VTH. In the first program section PRG1, the data driver 112 may provide the first data voltage VD1 corresponding to the first OLED OD1 through the first data line DL1 to the first node N1.

In the second program section PRG2, the scan driver 113 may output the first scan signal S1 at an inactive level through the first scan line SL1, output the second scan signal S2 at an active level through the second scan line SL2, output the third scan signal S3 at an inactive level through the third scan line SL3, output the fourth scan signal S4 at an active level through the fourth scan line SL4, output the initialization signal INT at an inactive level through the initialization line INTL, output the read-out control signal R at an inactive level through the read-out control line RL, output the first emission control signal E1 at an inactive level through the first emission control line EL1, output the second emission control signal E2 at an inactive level through the second emission control line EL2, output the third emission control signal E3 at an inactive level through the third emission control line EL3, and output the fourth emission control signal E4 at an inactive level through the fourth emission control line EL4. Accordingly, in the second program section PRG2, the second transistor T2, the fourth transistor T4, the fifth transistor T5, the sixth transistor T6, the seventh transistor T7, the eighth transistor T8, the ninth transistor T9, and the eleventh transistor T11 may be turned off, while the third transistor T3 and the tenth transistor T10 may be turned on.

In response to the first scan signal S1 that is at an inactive level, the second transistor T2 may be turned off. The second transistor T2 may be turned off, and thus, electrical connection between the first data line DL1 and the first node N1 may be cut off. In response to the first emission control signal E1 that is at an inactive level, the fourth transistor T4 may be turned off. The fourth transistor T4 may be turned off, and thus, electrical connection between the first driving power source ELVDD and the first node N1 may be cut off. In response to the initialization signal INT that is at an inactive level, the fifth transistor T5 may be turned off. The fifth transistor T5 may be turned off, and thus, electrical connection between the read-out line ROL and the second node N2 may be cut off. In response to the read-out control signal R that is at an inactive level, the sixth transistor T6 may be turned off. The sixth transistor T6 may be turned off, and thus, electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between the third node N3 and the third OLED OD3 may be cut off. In response to the third scan signal S3 that is at an inactive level, the eleventh transistor T11 may be turned off. The eleventh transistor T11 may be turned off, and thus, electrical connection between the third data line DL3 and the first node N1 may be cut off.

In response to the second scan signal S2 that is at an active level the tenth transistor T10 may be turned on. The tenth transistor T10 may be turned on and provide the second data voltage VD2 provided through the second data line DL2 to the first node N1. In response to the fourth scan signal S4 that is at an active level the third transistor T3 may be turned on. By turning on the third transistor T3, the second node N2 and the third node N3 may be connected to each other, and thus, the third transistor T3 may be diode-connected to the first transistor T1.

The second data voltage (VD2 may be applied to the first node N1, and a voltage reduced from the second data voltage VD2 by an absolute value of the threshold voltage VTH may be applied to the second node N2. The storage capacitor CST may be charged up to the threshold voltage VTH. That is, the storage capacitor CST may store the threshold voltage VTH. In the second program section PRG2, the data driver 112 may provide the second data voltage VD2 corresponding to the second OLED OD2 through the second data line DL2 to the first node N1.

In the third program section PRG3, the scan driver 113 may output the first scan signal S1 at an inactive level through the first scan line SL1, output the second scan signal S2 at an inactive level through the second scan line SL2, output the third scan signal S3 at an active level through the third scan line SL3, output the fourth scan signal S4 at an active level through the fourth scan line SL4, output the initialization signal INT at an inactive level through the initialization line INTL, output the read-out control signal R at an inactive level through the read-out control line RL, output the first emission control signal E1 at an inactive level through the first emission control line EL1, output the second emission control signal E2 at an inactive level through the second emission control line EL2, output the third emission control signal E3 at an inactive level through the third emission control line EL3, and output the fourth emission control signal E4 at an inactive level through the fourth emission control line EL4. Accordingly, in the third program section PRG3, the second transistor T2, the fourth transistor T4, the fifth transistor T5, the sixth transistor T6, the seventh transistor T7, the eighth transistor T8, the ninth transistor T9, and the tenth transistor T10 may be turned off, while the third transistor T3 and the eleventh transistor T11 may be turned on.

In response to the first scan signal S1 that is at an inactive level, the second transistor T2 may be turned off. The second transistor T2 may be turned off, and thus, electrical connection between the first data line DL1 and the first node N1 may be cut off. In response to the first emission control signal E1 that is at an inactive level, the fourth transistor T4 may be turned off. The fourth transistor T4 may be turned off, and thus, electrical connection between the first driving power source ELVDD and the first node N1 may be cut off. In response to the initialization signal INT that is at an inactive level, the fifth transistor T5 may be turned off. The fifth transistor T5 may be turned off, and thus, electrical connection between the read-out line ROL and the second node N2 may be cut off. In response to the read-out control signal R that is at an inactive level, the sixth transistor T6 may be turned off. The sixth transistor T6 may be turned off, and thus, electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between the third node N3 and the third OLED OD3 may be cut off. In response to the second scan signal S2 that is at an inactive level, the tenth transistor T10 may be turned off. The tenth transistor T10 may be turned off, and thus, electrical connection between the second data line DL2 and the first node N1 may be cut off.

In response to the third scan signal S3 that is at an active level the eleventh transistor T11 may be turned on. The eleventh transistor T11 may be turned on and provide the third data voltage VD3 provided through the third data line DL3 to the first node N1. In response to the fourth scan signal S4 that is at an active level the third transistor T3 may be turned on. By turning on the third transistor T3, the second node N2 and the third node N3 may be connected to each other, and thus, the third transistor T3 may be diode-connected to the first transistor T1.

The third data voltage VD3 may be applied to the first node N1, and a voltage reduced from the third data voltage VD3 by an absolute value of the threshold voltage VTH may be applied to the second node N2. The storage capacitor CST may be charged up to the threshold voltage VTH. That is, the storage capacitor CST may store the threshold voltage VTH. In the third program section PRG3, the data driver 112 may provide the third data voltage VD3 corresponding to the third OLED OD3 through the third data line DL3 to the first node N1.

In the first emission section EM1, the scan driver 113 may output the first scan signal S1 at an inactive level through the first scan line SL1, output the second scan signal S2 at an inactive level through the second scan line SL2, output the third scan signal S3 at an inactive level through the third scan line SL3, output the fourth scan signal S4 at an inactive level through the fourth scan line SL4, output the initialization signal INT at an inactive level through the initialization line INTL, output the read-out control signal R at an inactive level through the read-out control line RL, output the first emission control signal E1 at an active level through the first emission control line EL1, output the second emission control signal E2 at an active level through the second emission control line EL2, output the third emission control signal E3 at an inactive level through the third emission control line EL3, and output the fourth emission control signal E4 at an inactive level through the fourth emission control line EL4. Accordingly, in the first emission section EM1, the second transistor T2, the third transistor T3, the fifth transistor T5, the sixth transistor T6, the eighth transistor T8, the ninth transistor T9, the tenth transistor T10, and the eleventh transistor T11 may be turned off, and the fourth transistor T4 and the seventh transistor T7 may be turned on.

In response to the first scan signal S1 that is at an inactive level, the second transistor T2 may be turned off. The second transistor T2 may be turned off, and thus, electrical connection between the first data line DL1 and the first node N1 may be cut off. In response to the fourth scan signal S4 that is at an inactive level, the third transistor T3 may be turned off. The third transistor T3 may be turned off, and thus, electrical connection between the second node N2 and the third node N3 may be cut off. In response to the initialization signal INT that is at an inactive level, the fifth transistor T5 may be turned off. The fifth transistor T5 may be turned off, and thus, electrical connection between the read-out line ROL and the second node N2 may be cut off. In response to the read-out control signal R that is at an inactive level, the sixth transistor T6 may be turned off. The sixth transistor T6 may be turned off, and thus, electrical connection between the read-out line ROL and the third node N3 may be cut off. In response to the third emission control signal E3 that is at an inactive level, the eighth transistor T8 may be turned off. The eighth transistor T8 may be turned off, and thus, electrical connection between the third node N3 and the second OLED OD2 may be cut off. In response to the fourth emission control signal E4 that is at an inactive level, the ninth transistor T9 may be turned off. The ninth transistor T9 may be turned off, and thus, electrical connection between the third node N3 and the third OLED OD3 may be cut off. In response to the second scan signal S2 that is at an inactive level, the tenth transistor T10 may be turned off. The tenth transistor T10 may be turned off, and thus, electrical connection between the second data line DL2 and the first node N1 may be cut off. In response to the third scan signal S3 that is at an inactive level, the eleventh transistor T11 may be turned off. The eleventh transistor T11 may be turned off, and thus, electrical connection between the third data line DL3 and the first node N1 may be cut off.

In response to the first emission control signal E1 that is at an active level the fourth transistor T4 may be turned on. In response to the second emission control signal E2 that is at an active level the seventh transistor T7 may be turned on. The fourth and seventh transistors T4 and T7 may be all turned on, and thus, a driving current ID (i.e., a first driving current ID1) corresponding to the first data voltage VD1 may flow through the first OLED OD1. That is, in the first emission section EM1, the driving current ID corresponding to the first data voltage VD1 received in the first program section PRG1 may flow through the first OLED OD1.

In the second emission section EM2, the scan driver 113 may output the first scan signal S1 at an inactive level through the first scan line SL1, output the second scan signal S2 at an inactive level through the second scan line SL2, output the third scan signal S3 at an inactive level through the third scan line SL3, output the fourth scan signal S4 at an inactive level through the fourth scan line SL4, output the initialization signal INT at an inactive level through the initialization line INTL, output the read-out control signal R at an inactive level through the read-out control line RL, output the first emission control signal E1 at an active level through the first emission control line EL1, output the second emission control signal E2 at an inactive level through the second emission control line EL2, output the third emission control signal E3 at an active level through the third emission control line EL3, and output the fourth emission control signal E4 at an inactive level through the fourth emission control line EL4.

Accordingly, in the second emission section EM2, the second transistor T2, the third transistor T3, the fifth transistor T5, the sixth transistor T6, the seventh transistor T7, the ninth transistor T9, the tenth transistor T10, and the eleventh transistor T11 may be turned off, while the fourth transistor T4 and the eighth transistor T8 may be turned on.

In response to the first scan signal S1 that is at an inactive level, the second transistor T2 may be turned off. The second transistor T2 may be turned off, and thus, electrical connection between the first data line DL1 and the first node N1 may be cut off. In response to the fourth scan signal S4 that is at an inactive level, the third transistor T3 may be turned off. The third transistor T3 may be turned off, and thus, electrical connection between the second node N2 and the third node N3 may be cut off. In response to the initialization signal INT that is at an inactive level, the fifth transistor T5 may be turned off. The fifth transistor T5 may be turned off, and thus, electrical connection between the read-out line ROL and the second node N2 may be cut off. In response to the read-out control signal R that is at an inactive level, the sixth transistor T6 may be turned off. The sixth transistor T6 may be turned off, and thus, electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between the third node N3 and the first OLED OD1 may be cut off. In response to the fourth emission control signal E4 that is at an inactive level, the ninth transistor T9 may be turned off. The ninth transistor T9 may be turned off, and thus, electrical connection between the third node N3 and the third OLED OD3 may be cut off. In response to the second scan signal S2 that is at an inactive level, the tenth transistor T10 may be turned off. The tenth transistor T10 may be turned off, and thus, electrical connection between the second data line DL2 and the first node N1 may be cut off. In response to the third scan signal S3 that is at an inactive level, the eleventh transistor T11 may be turned off. The eleventh transistor T11 may be turned off, and thus, electrical connection between the third data line DL3 and the first node N1 may be cut off.

In response to the first emission control signal E1 that is at an active level the fourth transistor T4 may be turned on. In response to the third emission control signal E3 that is at an active level the eighth transistor T8 may be turned on. The fourth and eighth transistors T4 and T8 may be all turned on, and thus, the driving current ID (i.e., a second driving current ID2) corresponding to the second data voltage VD2 may flow through the second OLED OD2. That is, in the second emission section EM2, the driving current ID corresponding to the second data voltage VD2 received in the second program section PRG2 may flow through the second OLED OD2.

In the third emission section EM3, the scan driver 113 may output the first scan signal S1 at an inactive level through the first scan line SL1, output the second scan signal S2 at an inactive level through the second scan line SL2, output the third scan signal S3 at an inactive level through the third scan line SL3, output the fourth scan signal S4 at an inactive level through the fourth scan line SL4, output the initialization signal INT at an inactive level through the initialization line INTL, output the read-out control signal R at an inactive level through the read-out control line RL, output the first emission control signal E1 at an active level through the first emission control line EL1, output the second emission control signal E2 at an inactive level through the second emission control line EL2, output the third emission control signal E3 at an inactive level through the third emission control line EL3, and output the fourth emission control signal E4 at an active level through the fourth emission control line EL4. Accordingly, in the third emission section EM3, the second transistor T2, the third transistor T3, the fifth transistor T5, the sixth transistor T6, the seventh transistor T7, the eighth transistor T8, the tenth transistor T10, and the eleventh transistor T11 may be turned off, and the fourth transistor T4 and the ninth transistor T9 may be turned on.

In response to the first scan signal S1 that is at an inactive level, the second transistor T2 may be turned off. The second transistor T2 may be turned off, and thus, electrical connection between the first data line DL1 and the first node N1 may be cut off. In response to the fourth scan signal S4 that is at an inactive level, the third transistor T3 may be turned off. The third transistor T3 may be turned off, and thus, electrical connection between the second node N2 and the third node N3 may be cut off. In response to the initialization signal INT that is at an inactive level, the fifth transistor T5 may be turned off. The fifth transistor T5 may be turned off, and thus, electrical connection between electrical connection between the read-out line ROL and the second node N2 may be cut off. In response to the read-out control signal R that is at an inactive level, the sixth transistor T6 may be turned off. The sixth transistor T6 may be turned off, and thus, electrical connection between the read-out line ROL and the third node N3 may be cut off. In response to the second emission control signal E2 that is at an inactive level, the seventh transistor T7 may be turned off. The seventh transistor T7 may be turned off, and thus, electrical connection between the third node N3 and the first OLED OD1 may be cut off. In response to the third emission control signal E3 that is at an inactive level, the eighth transistor T8 may be turned off. The eighth transistor T8 may be turned off, and thus, electrical connection between the third node N3 and the second OLED OD2 may be cut off. In response to the second scan signal S2 that is at an inactive level, the tenth transistor T10 may be turned off. The tenth transistor T10 may be turned off, and thus, electrical connection between the second data line DL2 and the first node N1 may be cut off. In response to the third scan signal S3 that is at an inactive level, the eleventh transistor T11 may be turned off. The eleventh transistor T11 may be turned off, and thus, electrical connection between the third data line DL3 and the first node N1 may be cut off.

In response to the first emission control signal E1 that is at an active level, the fourth transistor T4 may be turned on. In response to the fourth emission control signal E4 that is at an active level, the ninth transistor T9 may be turned on. The fourth and ninth transistors T4 and T9 may be all turned on, and thus, the driving current ID (i.e., a third driving current ID3) corresponding to the third data voltage VD3 may flow through the third OLED OD3. That is, in the third emission section EM3, the driving current ID corresponding to the third data voltage VD3 received in the third program section PRG3 may flow through the third OLED OD3.

The pixel PX1 of FIG. 2 may drive a plurality of OLEDs through time multiplexing. Accordingly, a time period of a program section PRG of the pixel PX1 may be shorter than a time period of a program section PRG of each of the pixels PXb1, PXb2, and PXb3 of FIG. 3B. For example, the time period of the program section PRG of the pixel PX1 may be about ⅓ times the time period of the program section PRG of each of the pixels PXb1, PXb2, and PXb3 of FIG. 3B. A time period of each of the first to third emission sections EM1, EM2, and EM3 of the pixel PX1 may be shorter than a time period of an emission section of each of the pixels PXb1, PXb2, and PXb3 of FIG. 3B. For example, the time period of each of the first to third emission sections EM1, EM2, and EM3 of the pixel PX1 may be ⅓ times the time period of the emission section EM of each of the pixels PXb1, PXb2, and PXb3 of FIG. 3B.

Similar to the pixel PX1 of FIG. 2, the pixel PX2 of FIG. 16A may drive a plurality of OLEDs through time multiplexing. A time period of each of the first to third emission sections EM1, EM2, and EM3 of the pixel PX2 may be ⅓ times the time period of the emission section EM of each of the pixels PXb1, PXb2, and PXb3 of FIG. 3B. As compared to the pixel PX1 of FIG. 2, the pixel PX2 of FIG. 16A may further include the tenth transistor T10, the eleventh transistor T11, the second data line DL2, the third data line DL3, the second scan line SL2, the third scan line SL3, and the fourth scan line SLA. Accordingly, a time period of a program section PRG of the pixel PX2 may increase. That is, because the number of data lines is increased by the number of OLEDs, the time period of the program section PRG of the pixel PX2 may be equal to a time period of a program section PRG of each of the pixels PXb1, PXb2, and PXb3 of FIG. 3B. That is, a time period of a program section PRG of the pixel PX2 may be three times the time period of the program section PRG of the pixel PX1.

For example, pixels in the same columns may share a data line. Because the pixels PX1 share one data line, while the pixels PX1 in a first row connected to a data line DL are performing a program operation, the pixels PX2 in a second row connected to the data line DL may not perform a program operation. By contrast, because the pixel PX2 share three data lines, while the pixels PX1 in a first row connected to the first to third data lines DL1 to DL3 are performing a program operation through the first data line DL1, the pixels PX2 in a second row connected to the first to third data lines DL1 to DL3 may perform a program operation through the second data line DL2. Accordingly, the time period of the program section PRG of the pixel PX2 may increase.

Figure 17:
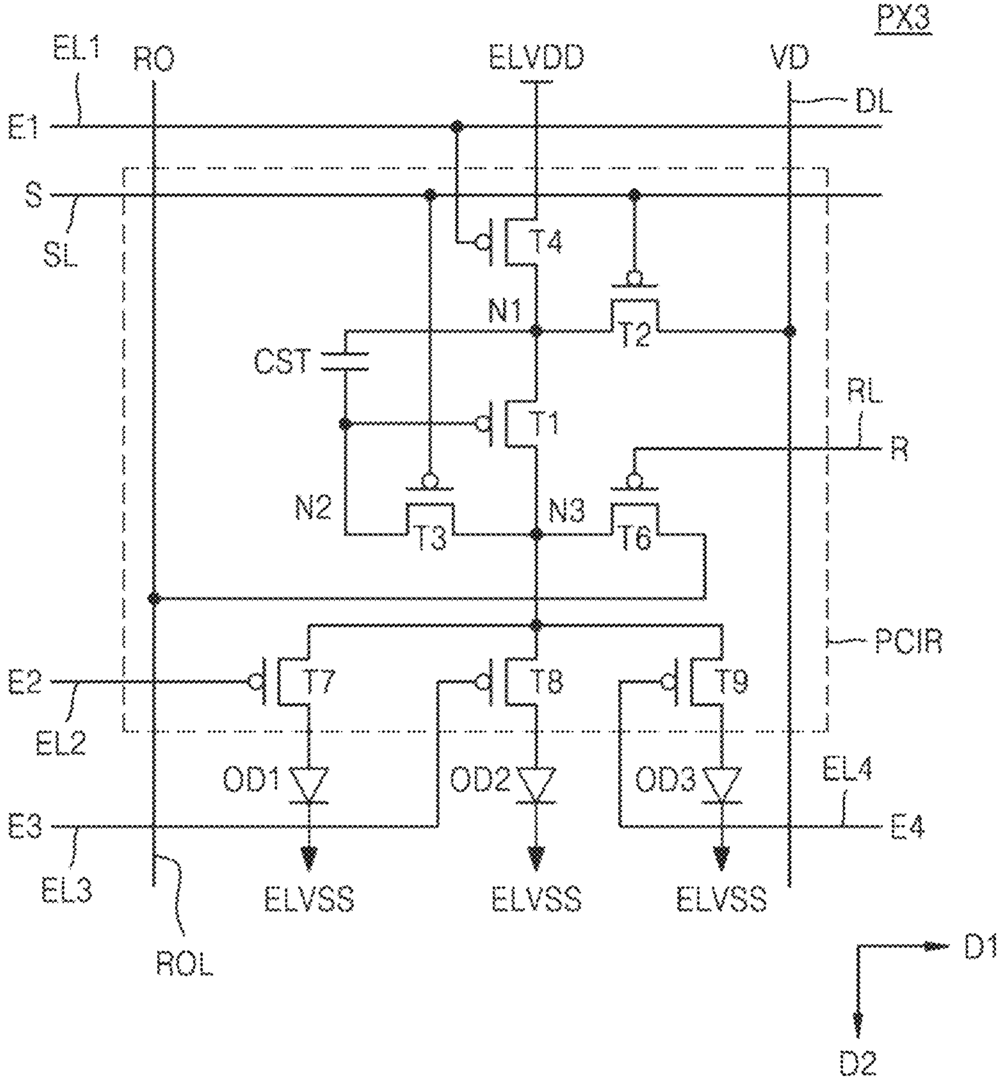
FIG. 17 is a circuit diagram of an example of a pixel according to an embodiment.

FIG. 17 is a circuit diagram of an example of a pixel according to an embodiment. A pixel PX3 of FIG. 17 may be applied to display device of FIG. 1. Each pixel PX of FIG. 1 may include the pixel PX3 of FIG. 17. Detailed descriptions of components that are the same as or similar to those of the pixel PX1 of FIG. 2 may be omitted, and differences are mainly described.

Referring to FIGS. 1 and 17, the pixel PX3 may include a first OLED OD1, a second OLED OD2, a third OLED OD3, and a pixel circuit PCIR. The pixel PX3 may include a scan line SL extending in the first direction D1, a first emission control line EL1 extending in the first direction D1, a second emission control line EL2 extending in the first direction D1, a third emission control line EL3 extending in the first direction D1, a fourth emission control line EL4 extending in the first direction D1, a read-out/initialization control line RL extending in the first direction D1, a data line DL extending in a second direction D2 that intersects with the first direction D1, a read-out line ROL extending in the second direction D2, first to fourth transistors T1 to T4, sixth to ninth transistors T6 to T9, a storage capacitor CST, and first to third OLEDs OD1 to OD3.

As compared to the pixel PX1 of FIG. 2, the pixel PX3 may not include the fifth transistor T5. The sixth transistor T6 may be connected between the read-out line ROL and the third node N3 and operate in response to a read-out/initialization control signal R. A first electrode of the sixth transistor T6 may be connected to the read-out line ROL, and a second electrode of the sixth transistor T6 may be connected to the third node N3. A gate electrode of the sixth transistor T6 may be connected to the read-out/initialization control line RL. In response to the read-out/initialization control signal R that is provided at an active level through the read-out/initialization control line RL, the sixth transistor T6 may be turned on. In a reset section RST, the sixth transistor T6 may be turned on, and thus, a voltage of an initialization power source VINT may be provided to the third node N3. Alternatively, in the first to fifth read-out sections RO1 to RO5, the sixth transistor T6 may be turned on, and thus, the third node N3 may be electrically connected to the read-out line ROL.

The pixel PX3 may include eight transistors. The sixth transistor T6 may be turned on in the reset section RST and the first to fifth read-out sections RO1 to RO5. That is, the sixth transistor T6 may control a reset operation and a read-out operation. The sixth transistor T6 may serve as the fifth transistor T5. In the reset section RST, the sixth transistor T6 may provide a voltage of the initialization power source VINT to the third node N3. Also, in the first to fifth read-out sections RO1 to RO5, the sixth transistor T6 may provide a read-out signal RO to the read-out circuit 114. The sixth transistor T6 may control both the reset operation and the read-out operation, and thus, the number of transistors may be reduced. By reducing the number of transistors per pixel, a pixel size may be reduced. Therefore, a display device with a small area and high resolution may be provided.

Figure 18:
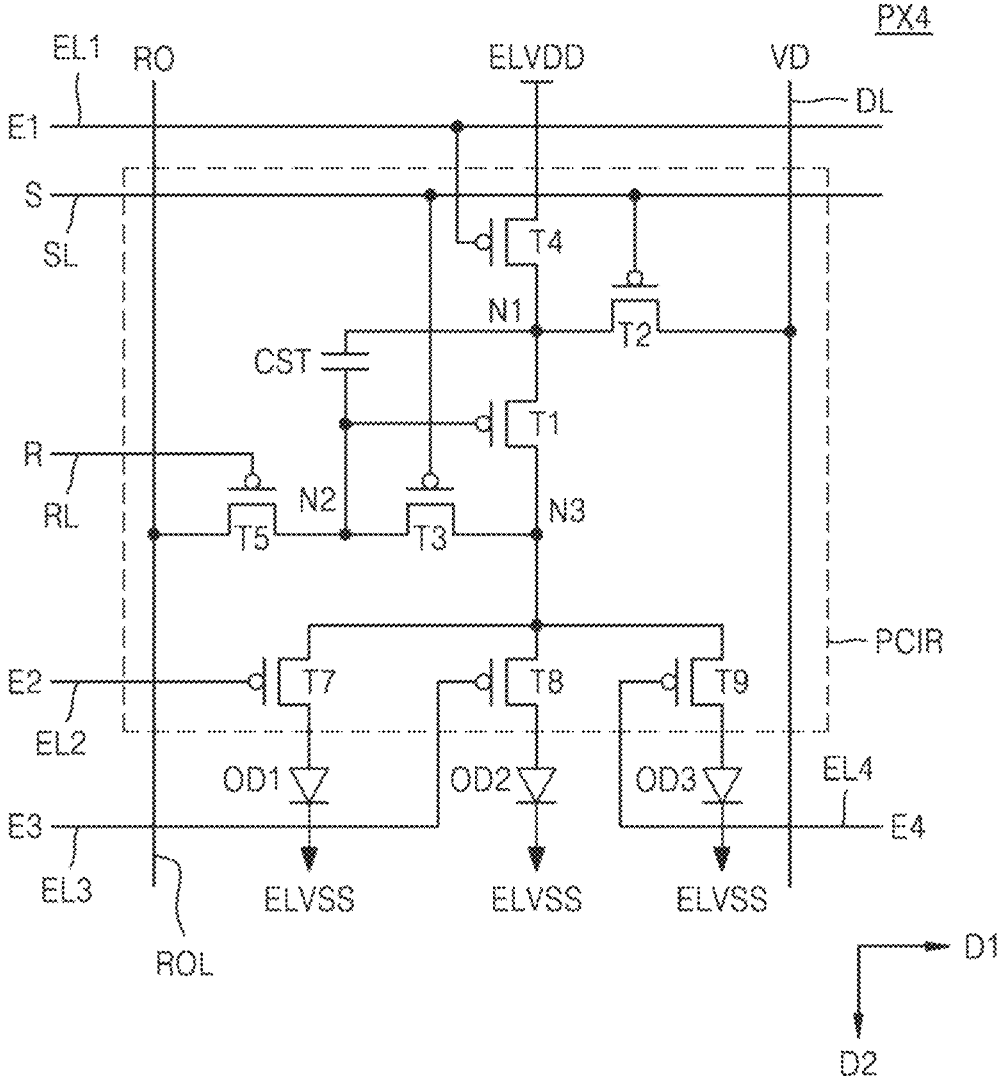
FIG. 18 is a circuit diagram of an example of a pixel according to an embodiment.

FIG. 18 is a circuit diagram of an example of a pixel according to an embodiment. A pixel PX4 of FIG. 18 may be applied to display device of FIG. 1. Each pixel PX of FIG. 1 may include the pixel PX4 of FIG. 18. Detailed descriptions of components that are the same as or similar to those of the pixel PX1 of FIG. 2 may be omitted, and differences are mainly described.

Referring to FIGS. 1 and 18, the pixel PX4 may include a first OLED OD1, a second OLED OD2, a third OLED OD3, and a pixel circuit PCIR. The pixel PX4 may include a scan line SL extending in a first direction D1, a first emission control line EL1 extending in the first direction D1, a second emission control line EL2 extending in the first direction D1, a third emission control line EL3 extending in the first direction D1, a fourth emission control line EL4 extending in the first direction D1, a read-out/initialization control line RL extending in the first direction D1, a data line DL extending in a second direction D2 that intersects with the first direction D1, a read-out line ROL extending in the second direction D2, first to fifth transistors T1 to T5, seventh to ninth transistors T7 to T9, a storage capacitor CST, and the first to third OLEDs OD1 to OD3.

As compared to the pixel PX1 of FIG. 2, the pixel PX4 may not include the sixth transistor T6. The fifth transistor T5 may be connected between the read-out line ROL and the second node N2 and operate in response to a read-out/initialization control signal R. A first electrode of the fifth transistor T5 may be connected to the read-out line ROL, and a second electrode of the fifth transistor T5 may be connected to the second node N2. A gate electrode of the fifth transistor T5 may be connected to the read-out/initialization control line RL. In response to the read-out/initialization control signal R that is provided at an active level through the read-out/initialization control line RL, the fifth transistor T5 may be turned on. In a reset section RST, the fifth transistor T5 may be turned on, and thus, a voltage of an initialization power source VINT may be provided to the second node N2. Alternatively, in a read-out section, the fifth transistor T5 may be turned on, and thus, the second node N2 may be electrically connected to the read-out line ROL.

The pixel PX4 of FIG. 18 may include eight transistors. The fifth transistor T5 may be turned on in the reset section RST and a second read-out section RO2. That is, the fifth transistor T5 may control a reset operation and a second read-out operation. In the reset section RST, the fifth transistor T5 may provide a voltage of the initialization power source VINT to the second node N2. In addition, in the second readout section RO2, the fifth transistor T5 may provide a read-out signal RO to a read-out circuit 114. The fifth transistor T5 may control both the reset operation and the second read-out operation, and thus, the number of transistors may be reduced. By reducing the number of transistors per pixel, a pixel size may be reduced. Therefore, a display device with a small area and high resolution may be provided.

The pixel PX1 of FIG. 2 may include the sixth transistor T6. Accordingly, a display device 100 including the pixel PX1 may perform first to fifth read-out operations. The display device 100 including the pixel PX1 may measure a driving current ID, a threshold voltage VTH, and a forward voltage VF of the pixel PX1.

By contrast, the pixel PX4 of FIG. 18 may not include the sixth transistor T6. Accordingly, the display device 100 including the pixel PX4 may perform only the second read-out operation, from among the first to fifth read-out operations. The display device 100 including the pixel PX4 may measure only a threshold voltage VTH of the pixel PX4.

Figure 19:
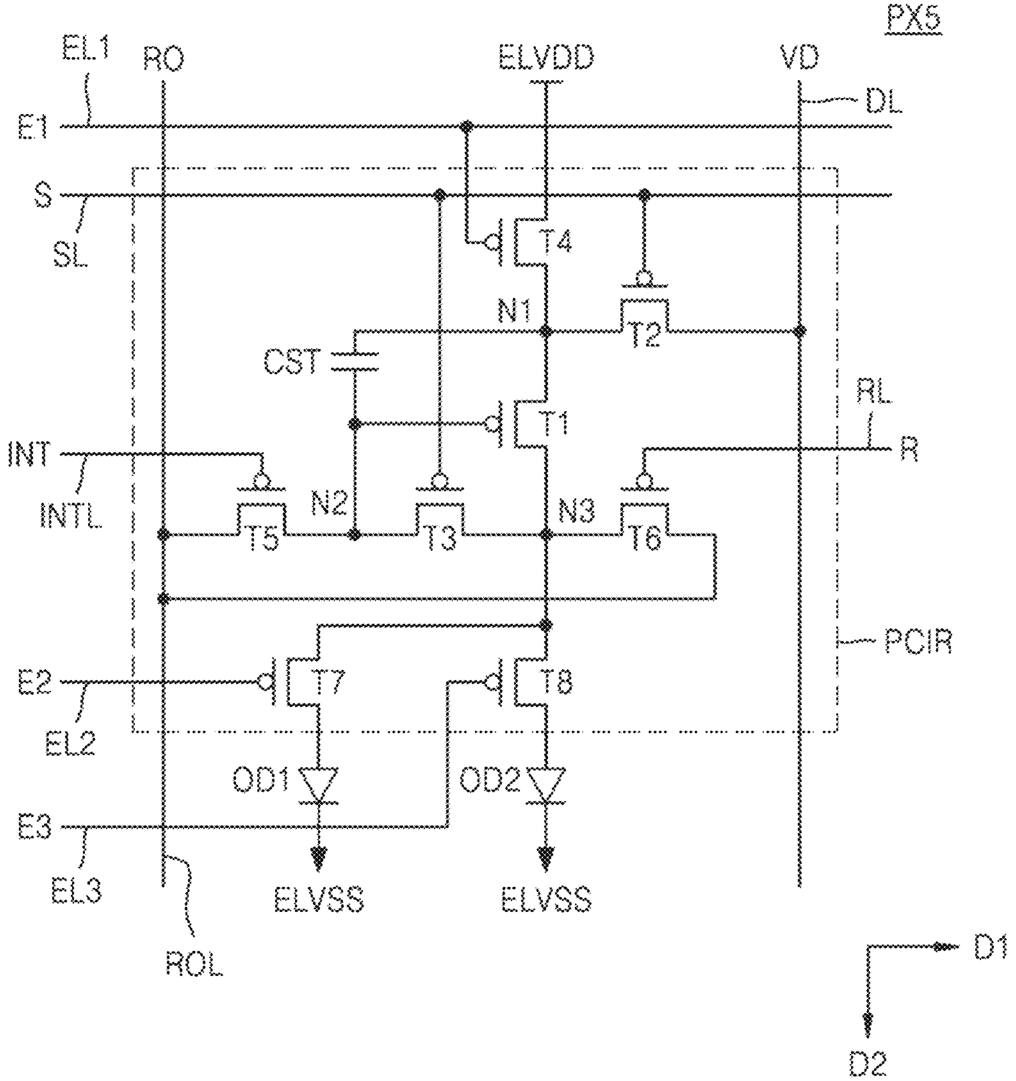
FIG. 19 is a circuit diagram of an example of a pixel according to an embodiment.

FIG. 19 is a circuit diagram of an example of a pixel according to an embodiment. A pixel PX5 of FIG. 19 may be applied to display device of FIG. 1. Each pixel PX of FIG.

1 may include the pixel PX5 of FIG. 19. Detailed descriptions of components that are the same as or similar to those of the pixel PX1 of FIG. 2 may be omitted, and differences are mainly described.

Referring to FIGS. 1 and 19, the pixel PX5 may include a first OLED OD1, a second OLED OD2, and a pixel circuit PCIR. The pixel PX5 may include a scan line SL extending in the first direction D1, a first emission control line EL1 extending in the first direction D1, a second emission control line EL2 extending in the first direction D1, a third emission control line EL3 extending in the first direction D1, an initialization line INTL extending in the first direction D1, the read-out control line RL extending in the first direction D1, a data line DL extending in a second direction D2 that intersects with the first direction D1, a read-out line ROL extending in the second direction D2, first ton eighth transistors T1 to T8, a storage capacitor CST, and the first and second OLEDs OD1 and OD2.

As compared to the pixel PX1 of FIG. 2, the pixel PX5 may not include a third OLED OD3, a ninth transistor T9, a fourth emission control line EL4. That is, the pixel PX5 may include two OLEDs, eight transistors, six control lines extending in the first direction D1 (i.e., the scan line SL, the first emission control line EL1, the second emission control line EL2, the third emission control line EL3, the initialization line INTL, and the read-out control line RL), and two lines extending in the second direction D2 (i.e., the data line DL and a read-out line ROL). As described above, the number of OLEDs included in a pixel may be changed.

In an embodiment, a frame may include first and second sub-frames. In the first sub-frame, the pixel PX5 may perform a reset operation, a program operation, a hold operation, and an emission operation on the first OLED OD1. In the second sub-frame, the pixel PX5 may perform a reset operation, a program operation, a hold operation, and an emission operation on the second OLED OD2.

Figure 20:
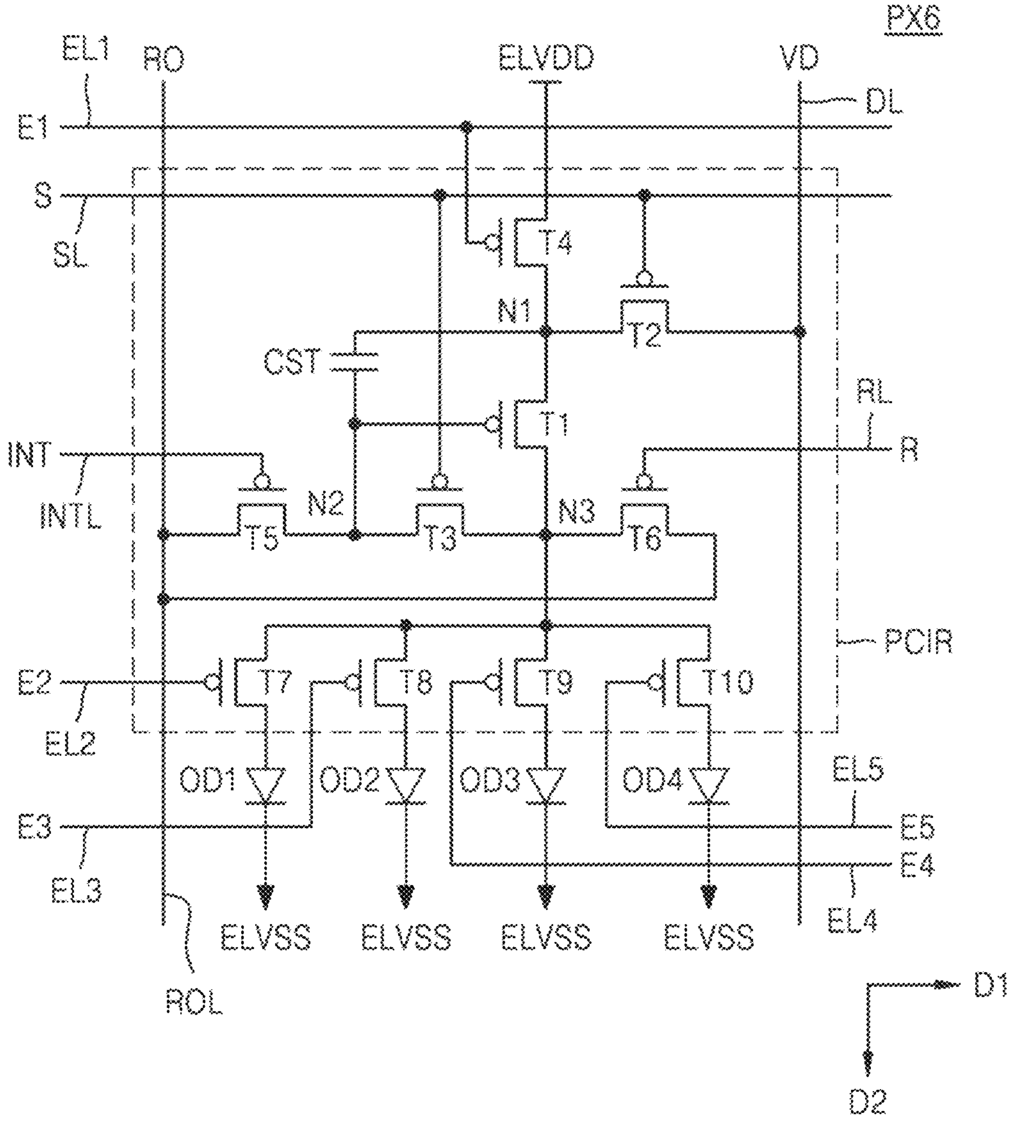
FIG. 20 is a circuit diagram of an example of a pixel according to an embodiment.

FIG. 20 is a circuit diagram of an example of a pixel according to an embodiment. A pixel PX6 of FIG. 20 may be applied to display device of FIG. 1. Each pixel PX of FIG. 1 may include the pixel PX6 of FIG. 20. Detailed descriptions of components that are the same as or similar to those of the pixel PX1 of FIG. 2 may be omitted, and differences are mainly described.

Referring to FIGS. 1 and 20, the pixel PX6 may include a first OLED OD1, a second OLED OD2, a third OLED OD3, a fourth OLED OD4, and a pixel circuit PCIR. The pixel PX6 may include a scan line SL extending in a first direction D1, a first emission control line EL1 extending in the first direction D1, a second emission control line EL2 extending in the first direction D1, a third emission control line EL3 extending in the first direction D1, a fourth emission control line EL4 extending in the first direction D1, a fifth emission control line EL5 extending in the first direction D1, an initialization line INTL extending in the first direction D1, the read-out control line RL extending in the first direction D1, a data line DL extending in a second direction D2 that intersects with the first direction D1, a read-out line ROL extending in the second direction D2, first to tenth transistors T1 to T10, a storage capacitor CST, and the first to fourth 4 OLEDs OD1 to OD4. For example, the first OLED OD1 may output red light, the second OLED OD2 may output blue light, the third OLED OD3 may output green light, and the fourth OLED OD4 may output white light.

An anode electrode of the fourth OLED OD4 may be connected to the pixel circuit PCIR, and a cathode electrode of the fourth OLED OD4 may be connected to a second driving power source ELVSS. The fourth OLED OD4 may emit light with a luminance of an amount of current supplied from the pixel circuit PCIR. A brightness of the fourth OLED OD4 may be controlled by a voltage of the data line DL (i.e., a data voltage VD).

The tenth transistor T10 may be connected between the third node N3 and the fourth OLED OD4 and operate in response to a fifth emission control signal E5. A first electrode of the tenth transistor T10 may be connected to the third node N3, and a second electrode of the tenth transistor T10 may be connected to the anode electrode of the fourth OLED OD4. A gate electrode of the tenth transistor T10 may be connected to the fifth emission control line EL5. In response to the fifth emission control signal E5 that is provided at an active level through the fifth emission control line EL5, the tenth transistor T10 may be turned on. The tenth transistor T10 may be turned on, and thus, the third node N3 may be electrically connected to the anode electrode of the fourth OLED OD4.

As compared to the pixel PX1 of FIG. 2, the pixel PX6 may further include the fourth OLED OD4, the tenth transistor T10, and the fifth emission control line EL5. That is, the pixel PX6 may include four OLEDs, ten transistors, eight control lines extending in the first direction D1 (i.e., the scan line SL, the first emission control line EL1, the second emission control line EL2, the third emission control line EL3, the fourth emission control line EL4, the fifth emission control line EL5, the initialization line INTL, and the read-out control line RL), and two lines extending in the second direction D2 (i.e., a data line DL and a read-out line ROL). That is, because the pixel PX6 has one more OLED than the pixel PX1 of FIG. 2, the pixel PX6 may further include one transistor and one emission control line compared to the pixel PX1. When the number of OLEDs is increased compared to the pixel PX2 of FIG. 2, an increased number of transistors may be equal to the increased number of OLEDs in the pixel PX6. In this regard, the pixel PX6 may further increase a first number of OLEDs, a first number of transistors, and a first number of emission control lines as compared to the pixel PX1 of FIG. 2.

Figure 21:
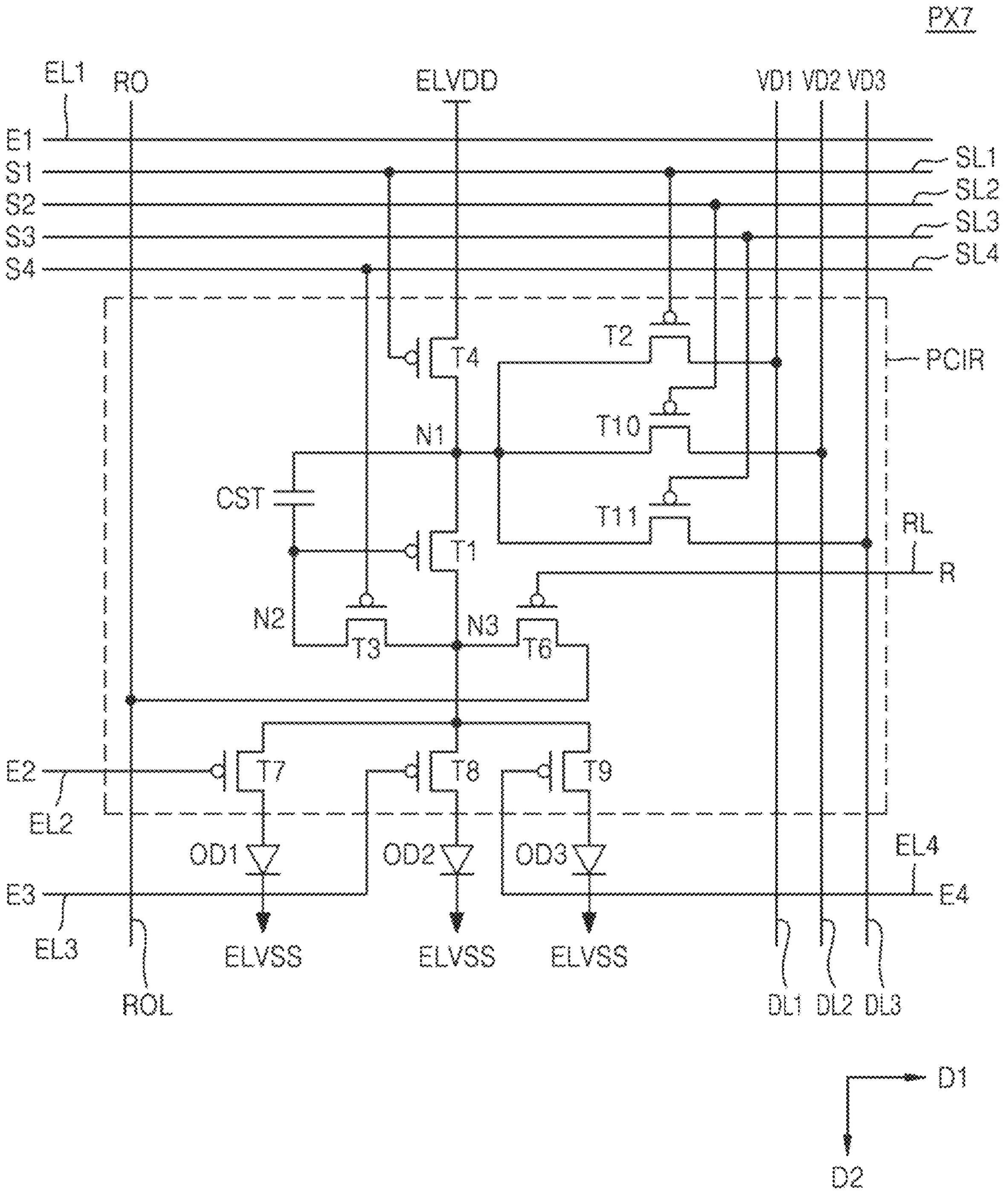
FIG. 21 is a circuit diagram of an example of a pixel according to an embodiment.

FIG. 21 is a circuit diagram of an example of a pixel according to an embodiment. A pixel PX7 of FIG. 21 may be applied to display device of FIG. 1. Each pixel PX of FIG. 1 may include the pixel PX7 of FIG. 21. Detailed descriptions of components that are the same as or similar to those of the pixel PX2 of FIG. 16A may be omitted, and differences are mainly described.

Referring to FIGS. 1 and 21, the pixel PX7 may include a first OLED OD1, a second OLED OD2, a third OLED OD3, and a pixel circuit PCIR. The pixel PX7 may include a first scan line SL1 extending in a first direction D1, a second scan line SL2 extending in the first direction D1, a third scan line SL3 extending in the first direction D1, a fourth scan line SL4 extending in the first direction D1, a first emission control line EL1 extending in the first direction D1, a second emission control line EL2 extending in the first direction D1, a third emission control line EL3 extending in the first direction D1, a fourth emission control line EL4 extending in the first direction D1, a read-out/initialization control line RL extending in the first direction D1, a first data line DL1 extending in a second direction D2 that intersects with the first direction D1, a second data line DL2 extending in the second direction D2, a third data line DL3 extending in the second direction D2, a read-out line ROL extending in the second direction D2, first to fourth transistors T1 to T4, sixth to eleventh transistors T6 to T11, a storage capacitor CST, and the first to third OLEDs OD1 to OD3. That is, the pixel PX7 may include three OLEDs, ten transistors, nine control lines extending in the first direction D1 (i.e., the first scan line SL1, the second scan line SL2, the third scan line SL3, the fourth scan line SL4, the first emission control line EL1, the second emission control line EL2, the third emission control line EL3, the fourth emission control line ELA, and the read-out/initialization control line RL), and four lines extending in the second direction D2 (i.e., the first data line DL1, the second data line DL2, the third data line DL3, and the read-out line ROL).

As compared to the pixel PX2 of FIG. 16A, the pixel PX7 may not include the fifth transistor T5. The sixth transistor T6 may be connected between the read-out line ROL and the third node N3 and operate in response to a read-out/initialization control signal R. A first electrode of the sixth transistor T6 may be connected to the read-out line ROL, and a second electrode of the sixth transistor T6 may be connected to the third node N3. A gate electrode of the sixth transistor T6 may be connected to the read-out/initialization control line RL. In response to the read-out/initialization control signal R that is provided at an active level through the read-out/initialization control line RL, the sixth transistor T6 may be turned on. In a reset section RST, the sixth transistor T6 may be turned on, and thus, a voltage of an initialization power source VINT may be provided to the third node N3. Alternatively, in the first to fifth read-out sections RO1 to RO5, the sixth transistor T6 may be turned on, and thus, the third node N3 may be electrically connected to the read-out line ROL.

The sixth transistor T6 may be turned on in the reset section RST and the first to fifth read-out sections RO1 to RO5. That is, the sixth transistor T6 may control a reset operation and a read-out operation. The sixth transistor T6 may serve as the fifth transistor T5. In the reset section RST, the sixth transistor T6 may provide a voltage of the initialization power source VINT) to the third node N3. In addition, in the first to fifth read-out sections RO1 to RO5, the sixth transistor T6 may provide a read-out signal RO to a read-out circuit 114. The sixth transistor T6 may control both the reset operation and the read-out operation, and thus, the number of transistors may be reduced. By reducing the number of transistors per pixel, a pixel size may be reduced. Therefore, a display device with a small area and high resolution may be provided.

Figure 22:
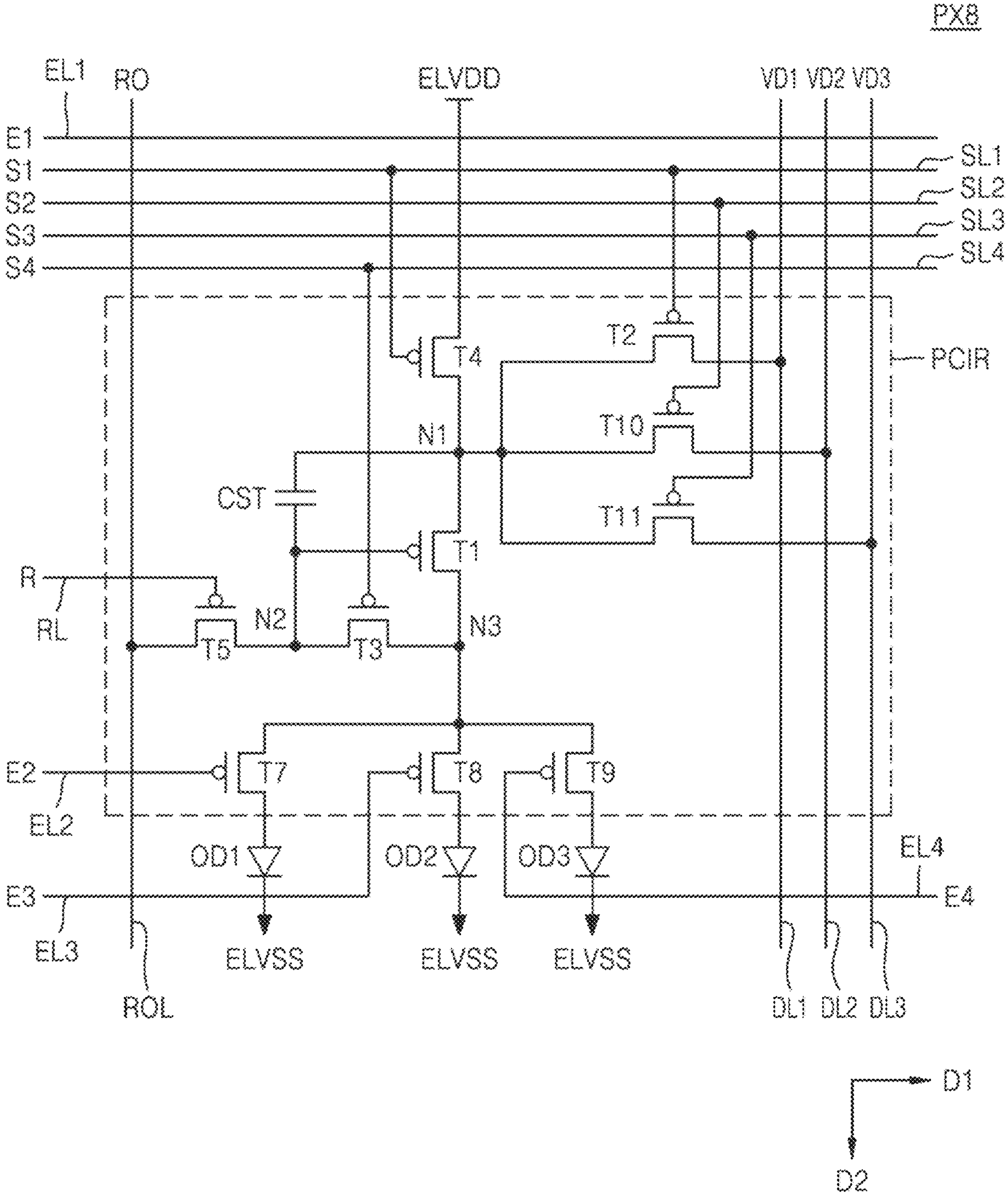
FIG. 22 is a circuit diagram of an example of a pixel according to an embodiment.

FIG. 22 is a circuit diagram of an example of a pixel according to an embodiment. A pixel PX8 of FIG. 22 may be applied to display device of FIG. 1. Each pixel PX of FIG. 1 may include the pixel PX8 of FIG. 22. Detailed descriptions of components that are the same as or similar to those of the pixel PX2 of FIG. 16A may be omitted, and differences are mainly described.

Referring to FIGS. 1 and 22, the pixel PX8 may include a first OLED OD1, a second OLED OD2, a third OLED OD3, and a pixel circuit PCIR. The pixel PX8 may include a first scan line SL1 extending in a first direction D1, a second scan line SL2 extending in the first direction D1, the third scan line SL3 extending in the first direction D1, a fourth scan line SL4 extending in the first direction D1, a first emission control line EL1 extending in the first direction D1, a second emission control line EL2 extending in the first direction D1, a third emission control line EL3 extending in the first direction D1, a fourth emission control line EL4 extending in the first direction D1, a read-out/initialization control line RL extending in the first direction D1, a first data line DL1 extending in a second direction D2 that intersects with the first direction D1, a second data line DL2 extending in the second direction D2, a third data line DL3 extending in the second direction D2, a read-out line ROL extending in the second direction D2, first to fifth transistors T1 to T5, seventh to eleventh transistors T7 to T11, a storage capacitor CST, and the first to third OLEDs OD1 to OD3. That is, the pixel PX7 may include three OLEDs, ten transistors, nine control lines extending in the first direction D1 (i.e., the first scan line SL1, the second scan line SL2, the third scan line SL3, the fourth scan line SL4, the first emission control line EL1, the second emission control line EL2, the third emission control line EL3, the fourth emission control line ELA, and the read-out/initialization control line RL), and four lines extending in the second direction D2 (i.e., the first data line DL1, the second data line DL2, the third data line DL3, and the read-out line ROL).

As compared to the pixel PX2 of FIG. 16A, the pixel PX8 may not include the sixth transistor T6. The fifth transistor T5 may be connected between the read-out line ROL and the second node N2 and operate in response to a read-out/initialization control signal R. A first electrode of the fifth transistor T5 may be connected to the read-out line ROL, and a second electrode of the fifth transistor T5 may be connected to the second node N2. A gate electrode of the fifth transistor T5 may be connected to the read-out/initialization control line RL. In response to the read-out/initialization control signal R that is provided at an active level through the read-out/initialization control line RL, the fifth transistor T5 may be turned on. In a reset section RST, the fifth transistor T5 may be turned on, and thus, a voltage of an initialization power source VINT may be provided to the second node N2. Alternatively, in the read-out section RO, the fifth transistor T5 may be turned on, and thus, the second node N2 may be electrically connected to the read-out line ROL.

The fifth transistor T5 may turn on in the reset section RST and a second read-out section RO2. That is, the fifth transistor T5 may control a reset operation and a second read-out operation. In the reset section RST, the fifth transistor T5 may provide a voltage of the initialization power source VINT to the second node N2. In addition, in the second read-out section RO2, the fifth transistor T5 may provide a read-out signal RO to a read-out circuit 114. The fifth transistor T5 may control both the reset operation and the second read-out operation, and thus, the number of transistors may be reduced. By reducing the number of transistors per pixel, a pixel size may be reduced. Therefore, a display device with a small area and high resolution may be provided.

The pixel PX2 of FIG. 16A may include the sixth transistor T6. Accordingly, a display device 100 including the pixel PX2 may perform first to fifth read-out operations. The display device 100 including the pixel PX2 may measure a driving current ID, a threshold voltage VTH, and a forward voltage VF of the pixel PX2.

Conversely, the display device 100 may not include the sixth transistor T6 of the pixel PX8 of FIG. 22. The fifth transistor T5 may serve as the sixth transistor T6. Accordingly, the display device 100 including the pixel PX8 may perform only the second read-out operation RO2, from among the first to fifth read-out operations RO1 to RO5. The display device 100 including the pixel PX8 may measure only a threshold voltage VTH of the pixel PX8.

Figure 23:
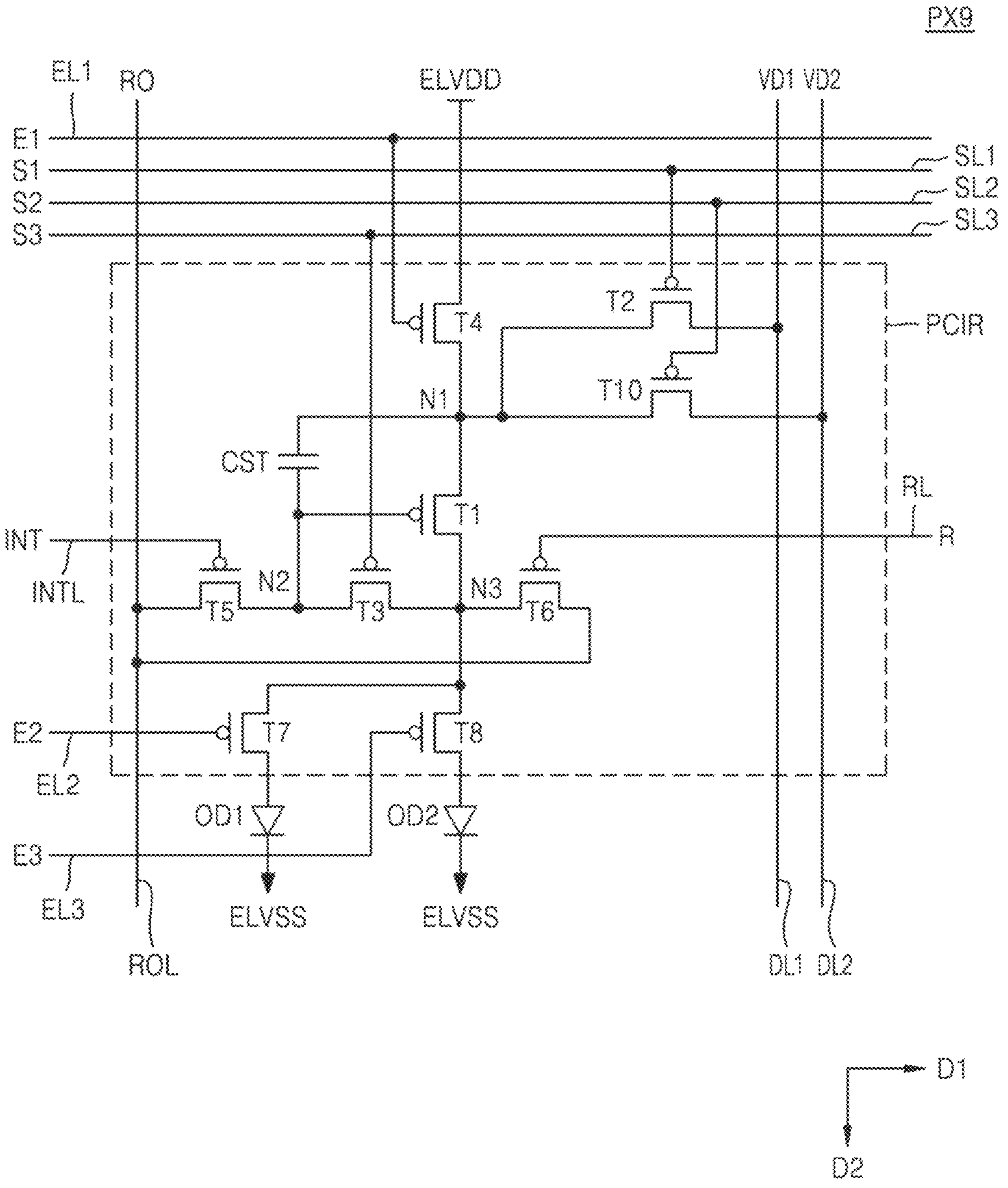
FIG. 23 is a circuit diagram of an example of a pixel according to an embodiment.

FIG. 23 is a circuit diagram of an example of a pixel according to an embodiment. A pixel PX9 of FIG. 23 may be applied to display device of FIG. 1. Each pixel PX of FIG. 1 may include the pixel PX9 of FIG. 23. Detailed descriptions of components that are the same as or similar to those of the pixel PX2 of FIG. 16A may be omitted, and differences are mainly described.

Referring to FIGS. 1 and 23, the pixel PX9 may include a first OLED OD1, a second OLED OD2, and a pixel circuit PCIR. The pixel PX9 may include the first scan line SL1 extending in a first direction D1, a second scan line SL2 extending in the first direction D1, a third scan line SL3 extending in the first direction D1, a first emission control line EL1 extending in the first direction D1, a second emission control line EL2 extending in the first direction D1, a third emission control line EL3 extending in the first direction D1, an initialization line INTL extending in the first direction D1, a read-out control line RL extending in the first direction D1, a first data line DL1 extending in a second direction D2 that intersects with the first direction D1, a second data line DL2 extending in the second direction D2, a read-out line ROL extending in the second direction D2, first ton eighth transistors T1 to T8, the tenth transistor T10, a storage capacitor CST, and the first and second OLEDs OD1 and OD2. That is, the pixel PX9 may include two OLEDs, nine transistors, eight control lines extending in the first direction D1 (i.e., the first scan line SL1, the second scan line SL2, the third scan line SL3, the first emission control line EL1, the second emission control line EL2, the third emission control line EL3, the initialization line INTL, and the read-out control line RL), and three lines extending in the second direction D2 (i.e., the first data line DL1, the second data line DL2, and the read-out line ROL).

The third transistor T3 may be connected between the second node N2 and the third node N3 and operate in response to a third scan signal S3. A first electrode of the third transistor T3 may be connected to the second node N2, and a second electrode of the third transistor T3 may be connected to the third node N3. A gate electrode of the third transistor T3 may be connected to the third scan line SL3. In response to the third scan signal S3 that is provided at an active level through the third scan line SL43, the third transistor T3 may be turned on. The third transistor T3 may be turned on, and thus, the second node N2 may be electrically connected to the third node N3. That is, the third transistor T3 may be diode-connected to the first transistor T1.

In an embodiment, a scan driver 113 may include an AND circuit. The AND circuit may receive a first scan signal S1 and a second scan signal S2. The AND circuit may generate and output the third scan signal S3 by performing an AND operation on the first scan signal S1 and the second scan signal S2.

As compared with the pixel PX2 of FIG. 16A, the pixel PX9 may not include a third OLED OD3, a ninth transistor T9, an eleventh transistor T11, a fourth scan line SL4, and a fourth emission control line EL4. The pixel PX9 may include only two OLEDs.

Figure 24:
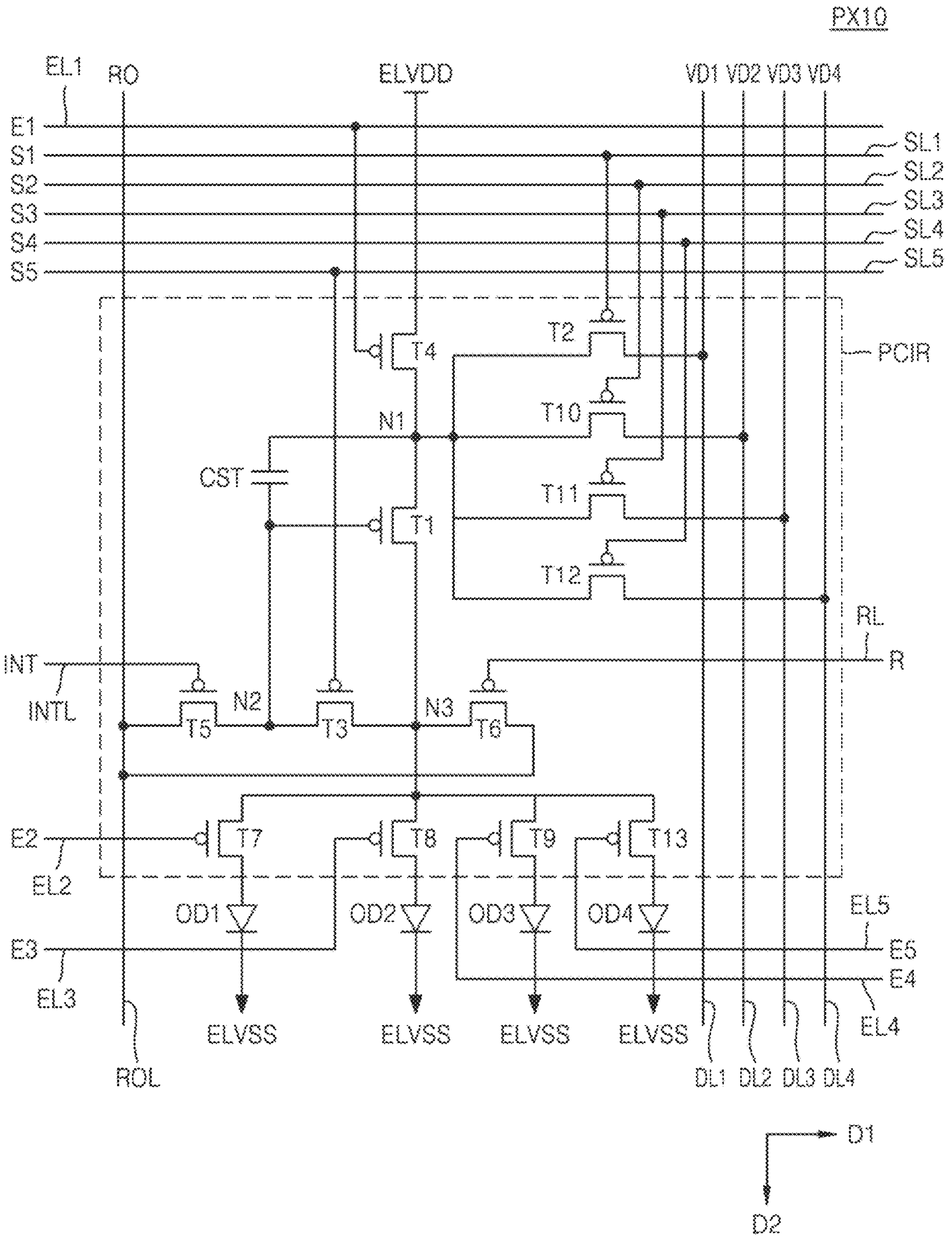
FIG. 24 is a circuit diagram of an example of a pixel according to an embodiment.

FIG. 24 is a circuit diagram of an example of a pixel according to an embodiment. A pixel PX10 of FIG. 24 may be applied to display device of FIG. 1. Each pixel PX of FIG. 1 may include the pixel PX10 of FIG. 24. Detailed descriptions of components that are the same as or similar to those of the pixel PX2 of FIG. 16A may be omitted, and differences are mainly described.

Referring to FIGS. 1 and 24, the pixel PX10 may include a first OLED OD1, a second OLED OD2, a third OLED OD3, a fourth OLED OD4, and a pixel circuit PCIR. The pixel PX10 may include a first scan line SL1 extending in a first direction D1, a second scan line SL2 extending in the first direction D1, a third scan line SL3 extending in the first direction D1, a fourth scan line SL4 extending in the first direction D1, a fifth scan line SL5 extending in the first direction D1, a first emission control line EL1 extending in the first direction D1, a second emission control line EL2 extending in the first direction D1, a third emission control line EL3 extending in the first direction D1, a fourth emission control line EL4 extending in the first direction D1, a fifth emission control line EL5 extending in the first direction D1, an initialization line INTL extending in the first direction D1, a read-out control line RL extending in the first direction D1, a first data line DL1 extending in a second direction D2 that intersects with the first direction D1, a second data line DL2 extending in the second direction D2, a third data line DL3 extending in the second direction D2, a fourth data line DL4 extending in the second direction D2, a read-out line ROL extending in the second direction D2, first to thirteenth transistors T1 to T13, a storage capacitor CST, and the first to fourth OLEDs OD1 to OD4. That is, the pixel PX10 may include four OLEDs, thirteen transistors, twelve control lines extending in the first direction D1 (i.e., the first scan line SL1, the second scan line SL2, the third scan line SL3, the fourth scan line SL4, the fifth scan line SL5, the first emission control line EL1, the second emission control line EL2, the third emission control line EL3, the fourth emission control line ELA, the fifth emission control line EL5, the initialization line INTL, and the read-out control line RL), and five lines extending in the second direction D2 (i.e., the first data line DL1, the second data line DL2, the third data line DL3, the fourth data line DL4, and the read-out line ROL).

The third transistor T3 may be connected between the second node N2 and the third node N3 and operate in response to a fifth scan signal S5. A first electrode of the third transistor T3 may be connected to the second node N2, and a second electrode of the third transistor T3 may be connected to the third node N3. A gate electrode of the third transistor T3 may be connected to the fifth scan line SL5. In response to the fifth scan signal S5 that is provided at an active level through the fifth scan line SL5, the third transistor T3 may be turned on. The third transistor T3 may be turned on, and thus, the second node N2 may be electrically connected to the third node N3. That is, the third transistor T3 may be diode-connected to the first transistor T1.

In an embodiment, a scan driver 113 may include an AND circuit. The AND circuit may receive a first scan signal S1, a second scan signal S2, a third scan signal S3, and a fourth scan signal S4. The AND circuit may generate and output the fifth scan signal S5 by performing an AND operation on the first scan signal S1, the second scan signal S2, the third scan signal S3, and the fourth scan signal S4. That is, the fifth scan signal S5 may be expressed as in Equation 9. In equation 9, S5 denotes the fifth scan signal S5, S1 denotes the first scan signal S1, S2 denotes the second scan signal S2, S3 denotes the third scan signal S3, and S4 denotes the fourth scan signal S4.

$$S5 = S1 \text{ AND } S2 \text{ AND } S3$$ [Equation 9]

-continued

AND $S4$

The twelfth transistor T12 may be connected between the fourth data line DL4 and the first node N1 and operate in response to the fourth scan signal S4. A first electrode of the twelfth transistor T12 may be connected to the fourth data line DLA, and a second electrode of the twelfth transistor T12 may be connected to the first node N1. A gate electrode of the twelfth transistor T12 may be connected to the fourth scan line SLA. In response to the fourth scan signal S4 that is provided at an active level through the fourth scan line SL4, the twelfth transistor T12 may be turned on the twelfth transistor T12 may be turned on, and thus, the first node N1 may be electrically connected to the fourth data line DLA.

An anode electrode of the fourth OLED OD4 may be connected to the pixel circuit PCIR, and a cathode electrode of the fourth OLED OD4 may be connected to a second driving power source ELVSS. The fourth OLED OD4 may emit light with a luminance corresponding to the amount of current supplied from the pixel circuit PCIR. A brightness of the fourth OLED OD4 may be controlled by a voltage of the fourth data line DL4 (i.e., a fourth data voltage VD4).

The thirteenth transistor T13 may be connected between the third node N3 and the fourth OLED OD4 and operate in response to a fifth emission control signal E5. A first electrode of the thirteenth transistor T13 may be connected to the third node N3, and a second electrode of the thirteenth transistor T13 may be connected to the anode electrode of the fourth OLED OD4. A gate electrode of the thirteenth transistor T13 may be connected to the fifth emission control line EL5. In response to the fifth emission control signal E5 that is provided at an active level through the fifth emission control line EL5, the thirteenth transistor T13 may be turned on. The thirteenth transistor T13 may be turned on, and thus, the third node N3 may be electrically connected to the anode electrode of the fourth OLED OD4.

As compared to the pixel PX2 of FIG. 16A, the pixel PX10 may further include the fourth OLED OD4, the twelfth transistor T12, the thirteenth transistor T13, the fifth scan line SL5, the fifth emission control line EL5, and the fourth data line DL4.

Figure 25A:
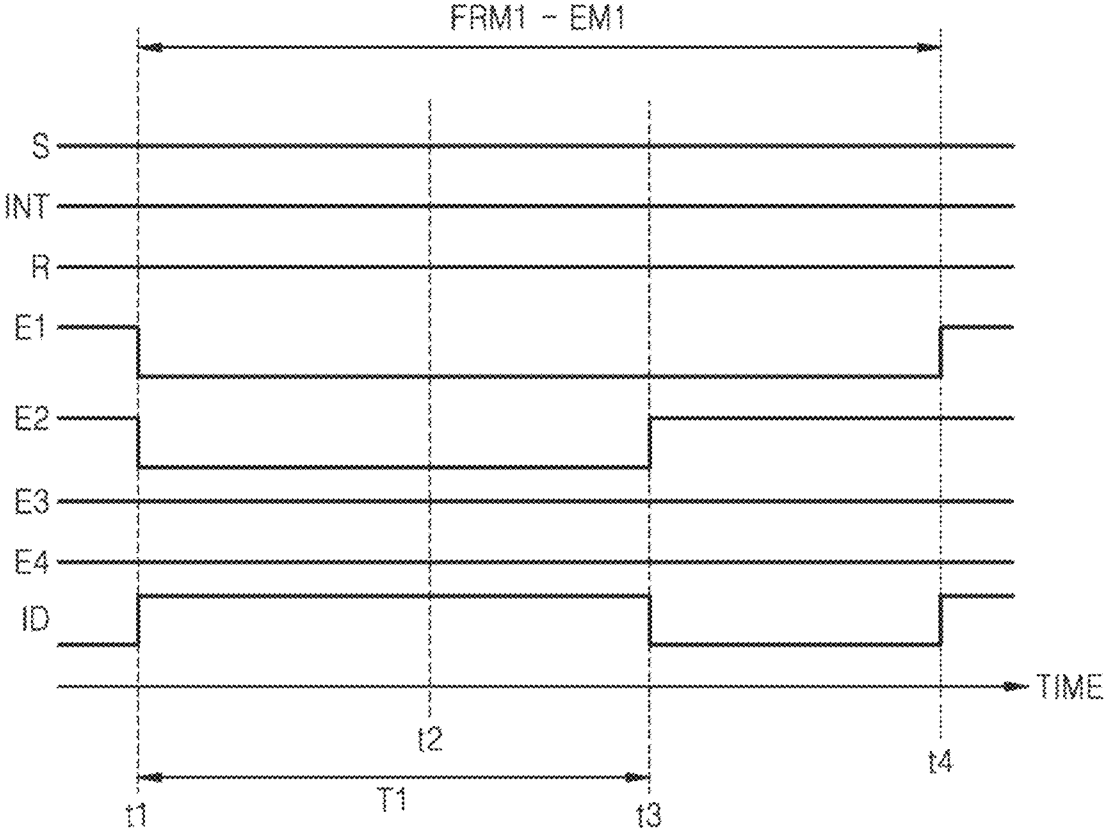
FIGS. 25A, 25B and 25C are timing diagrams of a plurality of signals for controlling a pixel, according to an embodiment.
Figure 25B:
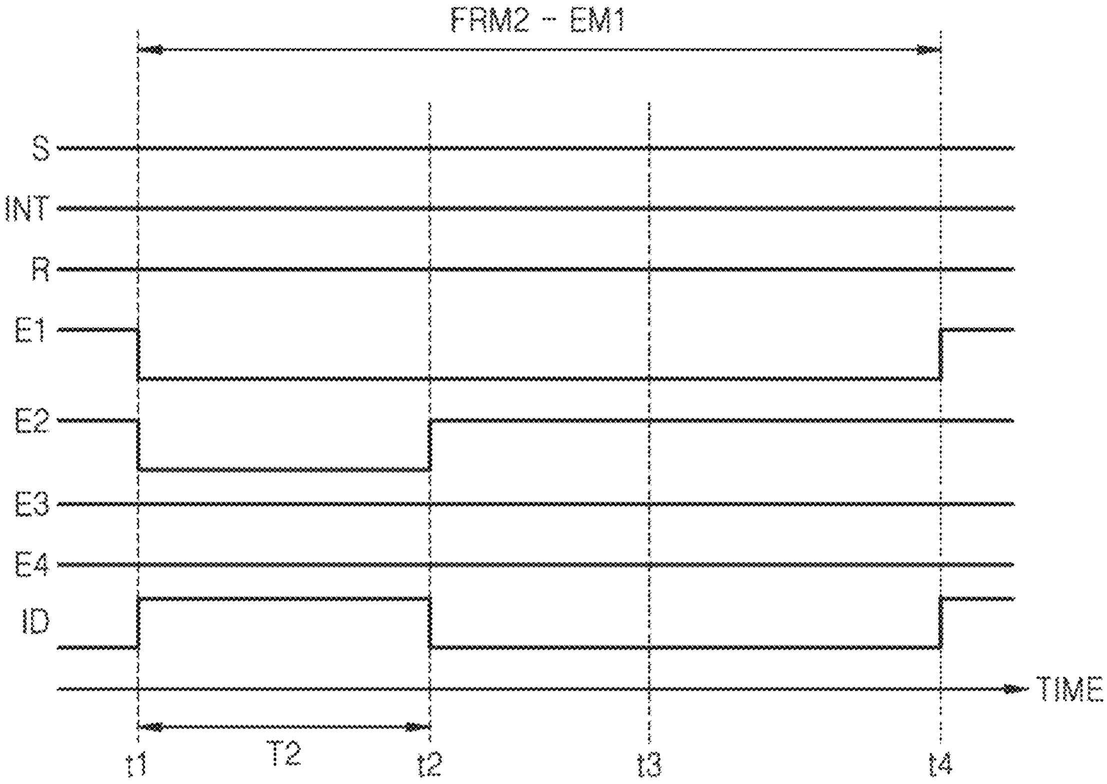
Figure 25C:
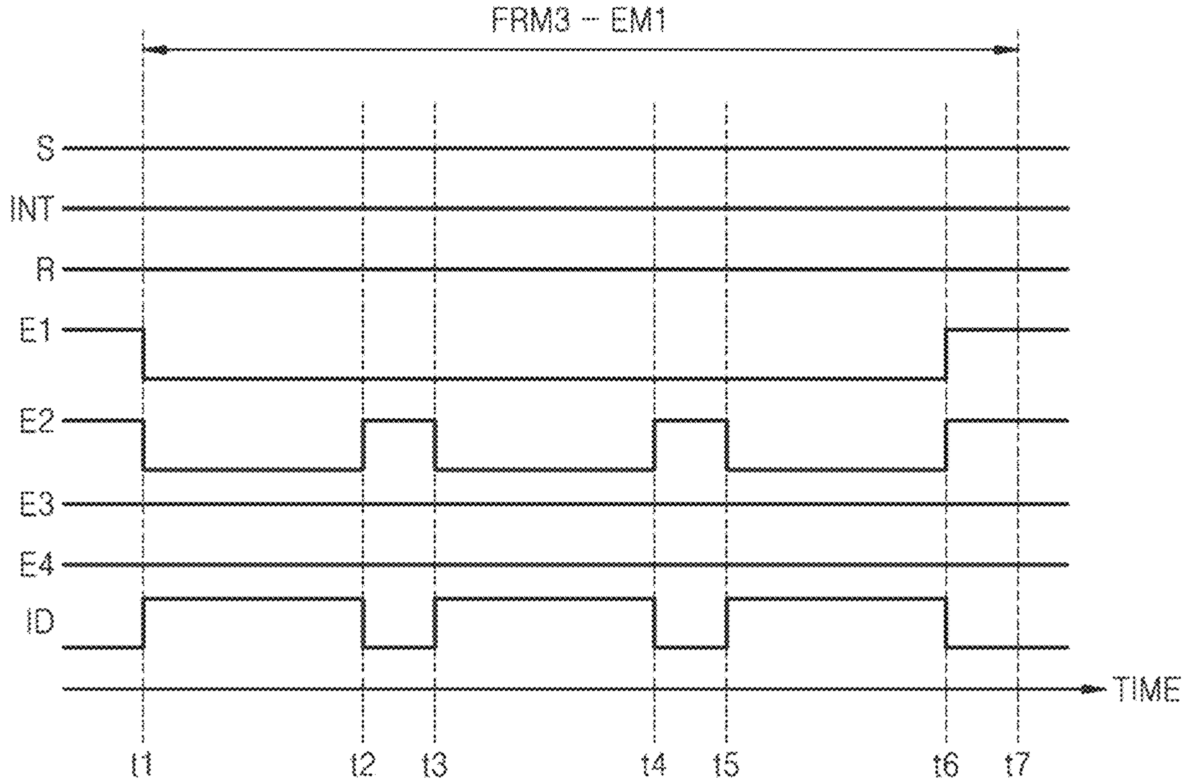

FIGS. 25A to 25C are timing diagrams of a plurality of signals for controlling a pixel, according to an embodiment.

Referring to FIG. 6, a second emission control signal E2 may remain logic-low during a first emission section EM1. By contrast, referring to FIGS. 25A to 25C, the second emission control signal E2 may be logic-high for a predetermined time period during the first emission section EM1.

A pixel PX according to an embodiment may adjust a luminance of a first OLED OD1 by using the second emission control signal E2. The pixel PX may adjust an emission time of the first OLED OD1 by using the second emission control signal E2, and improve brightness expression (or a gray level).

FIG. 25A shows a first emission section EM1 of a first frame FRM1, FIG. 25B shows a first emission section EM1 of a second frame FRM2, and FIG. 25C shows a first emission section EM1 of a third frame FRM3. A luminance of the first frame FRM1 may be assumed to be higher than a luminance of the second frame FRM2.

Referring to FIGS. 1, 2, and 25A, from a first time point t1 to a fourth time point t4, a scan signal S may be logic-high, an initialization signal INT may be logic-high, a read-out control signal R may be logic-high, a first emission control signal E1 may be logic-low, a third emission control signal E3 may be logic-high, and a fourth emission control signal E4 may be logic-high.

The second emission control signal E2 may be logic-low from the first time point t1 to a third time point t3, and the second emission control signal E2 may be logic-high from the third time point t3 to a fourth time point t4. The second emission control signal E2 may be at an active level during a first time period T1.

In this regard, in the first emission section EM1, a scan driver 113 may output the scan signal S at an inactive level through a scan line SL, output the initialization signal INT at an inactive level through an initialization line INTL, output the read-out control signal R at an inactive level through a read-out control line RL, output the first emission control signal E1 at an active level through a first emission control line EL1, output the third emission control signal E3 at an inactive level through a third emission control line EL3, and output the fourth emission control signal E4 at an inactive level through a fourth emission control line EL4.

During the first emission section EM1, the fourth transistor T4 may be turned on in response to the first emission control signal E1 that is at an active level. From the first time point t1 to the third time point t3, the seventh transistor T7 may be turned on in response to the second emission control signal E2 that is at an active level. From the third time point t3 to a fourth time point t4, the seventh transistor T7 may be turned off in response to the second emission control signal E2 that is at an inactive level. From the first time point t1 to the third time point t3, a driving current ID may be supplied to the first OLED OD1. From the third time point t3 to the fourth time point t4, the supplying of the driving current ID to the first OLED OD1 may be cut off.

Referring to FIGS. 1, 2, and 25B, from the first time point t1 to the fourth time point t4, the scan signal S may be logic-high, the initialization signal INT may be logic-high, the read-out control signal R may be logic-high, the first emission control signal E1 may be logic-low, the third emission control signal E3 may be logic-high, and the fourth emission control signal E4 may be logic-high.

The second emission control signal E2 may be logic-low from the first time point t1 to a second time point t2, and the second emission control signal E2 may be logic-high from the second time point t2 to the fourth time point t4. The second emission control signal E2 may be at an active level during a second time period T2. The second time period T2 may be shorter than the first time period T1.

During the first emission section EM1, in response to the first emission control signal E1 that is at an active level, the fourth transistor T4 may be turned on. From the first time point t1 to the second time point t2, the seventh transistor T7 may be turned on in response to the second emission control signal E2 that is at an active level. From the second time point t2 to the fourth time point t4, the seventh transistor T7 may be turned off in response to the second emission control signal E2 that is at an inactive level. From the first time point t1 to the second time point t2, the driving current ID may be supplied to the first OLED OD1. From the second time point t2 to the fourth time point t4, the supplying of the driving current ID to the first OLED OD1 may be cut off.

The first time period T1 may be longer than the second time period T2. That is, during the first emission section EM1, a time period (i.e., the first time period T1) for which the driving current ID flows in the first frame FRM1 may be longer than a time period (i.e., the second time period T2) for which the driving current ID flows in the second frame FRM2. Accordingly, even when the same data voltage VD is applied in the first frame FRM1 and the second frame FRM2, the first frame FRM1 may output an optical signal having a higher luminance than the second frame FRM2.

The scan driver 113 may adjust, based on a set luminance, a time period of a section in which the second emission control signal E2 is at an active level. The second emission control signal E2 may vary according to each frame during an emission section EM. For example, when a luminance set for the first frame FRM1 is different from a luminance set for the second frame FRM2, a time period (e.g., the first time period T1) for which the second emission control signal E2 is at an active level in the first frame FRM1 may be different from a time period (e.g., the second time period T2) for which the second emission control signal E2 is at an active level in the second frame FRM2. The second emission control signal E2 may vary according to a luminance set for each frame, and thus, a time (e.g., a diming time) over which the driving current ID flows may be adjusted. The pixel PX may output an optical signal having a luminance according to the intensity of the driving current ID and the dimming time. A brightness of the first OLED OD1 may be controlled by a voltage (i.e., the data voltage VD) of a data line DL and the time period of the section in which the second emission control signal E2 is at the active level.

Referring to FIGS. 1, 2, and 25C, from the first time point t1 to a seventh time point t7, the scan signal S may be logic-high, the initialization signal INT may be logic-high, the read-out control signal R may be logic-high, the first emission control signal E1 may be logic-low, the third emission control signal E3 may be logic-high, and the fourth emission control signal E4 may be logic-high.

The second emission control signal E2 may be logic-low from the first time point t1 to the second time point t2. The second emission control signal E2 may be logic-high from the second time point t2 to the third time point t3. The second emission control signal E2 may be logic-low from the third time point t3 to the fourth time point t4. The second emission control signal E2 may be logic-high from the fourth time point t4 to a fifth time point t5. The second emission control signal E2 may be logic-low from the fifth time point t5 to a sixth time point t6. The second emission control signal E2 may be logic-high after the sixth time point t6.

During the first emission section EM1, in response to the first emission control signal E1 that is at an active level, the fourth transistor T4 may be turned on. From the first time point t1 to the second time point t2, the seventh transistor T7 may be turned on in response to the second emission control signal E2 that is at an active level. From the second time point t2 to the third time point t3, the seventh transistor T7 may be turned off in response to the second emission control signal E2 that is at an inactive level. From the third time point t3 to the fourth time point t4, the seventh transistor T7 may be turned on in response to the second emission control signal E2 that is at an active level. From the fourth time point t4 to the fifth time point t5, the seventh transistor T7 may be turned off in response to the second emission control signal E2 that is at an inactive level. From the fifth time point t5 to the sixth time point t6, the seventh transistor T7 may be turned on in response to the second emission control signal E2 that is at an active level. From the sixth time point t6 to the seventh time point t7, the seventh transistor T7 may be turned off in response to the second emission control signal E2 that is at an inactive level.

From the first time point t1 to the second time point t2, the driving current ID may be supplied into the first OLED OD1. From the second time point t2 to the third time point t3, the supplying of the driving current ID into the first OLED OD1 may be cut off. From the third time point t3 to the fourth time point t4, the driving current ID may be supplied into the first OLED OD1. From the fourth time point t4 to the fifth time point t5, the supplying of the driving current ID into the first OLED OD1 may be cut off. From the fifth time point t5 to the sixth time point t6, the driving current ID may be supplied into the first OLED OD1. From the sixth time point t6 to the seventh time point t7, the supplying of the driving current ID into the first OLED OD1 may be cut off.

As described above, referring to FIG. 25A, in the first emission section EM1, the second emission control signal E2 may be at an active level only for the first time period T1. By contrast, referring to FIG. 25C, in the first emission section EM1, the second emission control signal E2 may be at an active level during a time period from the first time point t1 to the second time point t2, a time period from the third time point t3 to the fourth time point t4, and a time period from the fifth time point t5 to the sixth time point t6. During the first emission section EM1, the second emission control signal E2 may toggle between logic-low and logic-high. By independently controlling the fourth and seventh transistors T4 and T7, a display device 100 may implement PWM. The display device 100 may adjust an emission time of the first OLED OD1 by using the second emission control signal E2. A luminance of the first OLED OD1 may be adjusted according to the emission time of the first OLED OD1. Accordingly, the display device 100 may improve brightness expression (or a gray level).

PWM-related operations described with reference to FIGS. 25A to 25C have been described based on the second emission control signal E2 and the first OLED OD1, but embodiments are not limited thereto. For example, an emission time of a second OLED OD2 may be adjusted by controlling the third emission control signal E3, and an emission time of a third OLED OD3 may be adjusted by controlling the fourth emission control signal E4.

Figure 26:
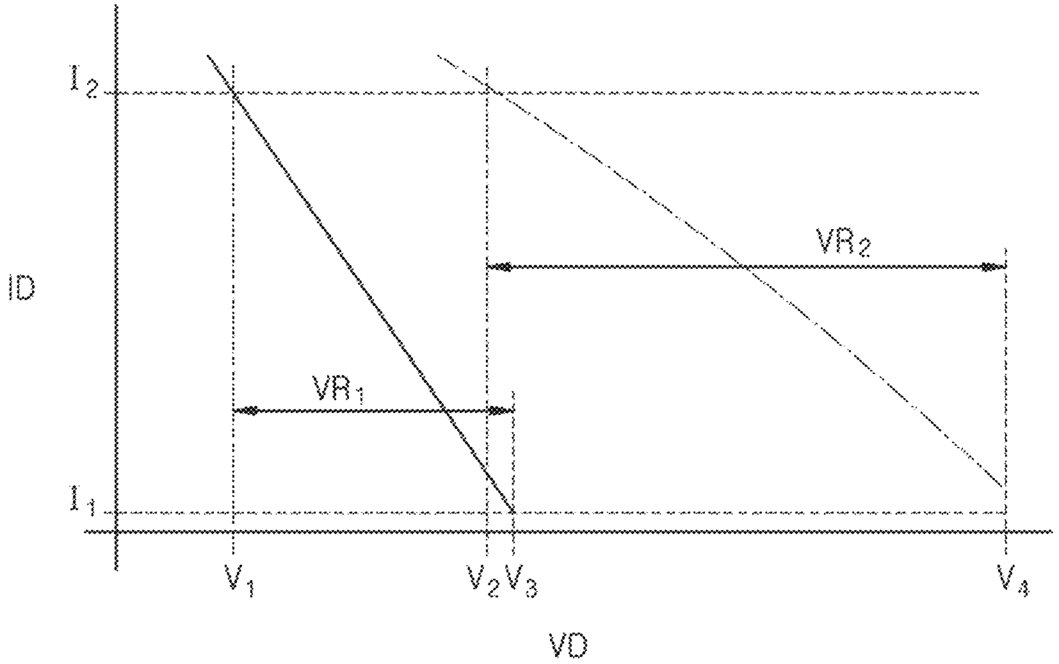
FIG. 26 is a graph showing a variation in driving current corresponding to a variation in data voltage of a pixel.

FIG. 26 is a graph showing a variation in driving current corresponding to a variation in data voltage of a pixel.

An abscissa denotes a data voltage VD, and an ordinate denotes a driving current ID. Referring to FIGS. 2, 3A, and 26, a solid line shows a variation in the driving current ID corresponding to a variation in the data voltage VD of the pixel PXa of FIG. 3A, and an alternating long-short dashed line shows a variation in the driving current ID corresponding to a variation in the data voltage VD of the pixel PX1 of FIG. 2.

An OLED OD of the pixel PXa of FIG. 3A may be controlled when the driving current ID is in a range of a first current amount I1 to a second current amount I2. A data voltage VD corresponding to a variation in the driving current ID may include a first voltage V1 to a third voltage V3. That is, a variation range of the data voltage VD of the pixel PXa of FIG. 3A may be a first voltage range VR1.

Each of a plurality of OLEDs (e.g., OD1, OD2, and OD3) of the pixel PX1 of FIG. 2 may be controlled when the driving current ID falls within a range of the first current amount I1 to the second current amount I2. A data voltage VD corresponding to a variation in the driving current ID may include a second voltage V2 to a fourth voltage V4. That is, a variation range of the data voltage VD of the pixel PX1 of FIG. 2 may be a second voltage range VR2. The second voltage range VR2 may be greater than the first voltage range VR1.

A storage capacitor CST of the pixel PXa of FIG. 3A may be connected between the gate of the first transistor T1 and the first driving power source ELVDD. The storage capacitor CST of the pixel PX1 of FIG. 2 may be connected between the gate of the first transistor T1 and the second electrode of the fourth transistor T4 (i.e., between the first transistor T1 and the fourth transistor T4). Accordingly, a variation range of the data voltage VD corresponding to a variation range of a current rate of the OLED OD may be expanded. Controlling a luminance or brightness of the OLED OD may be facilitated by using the data voltage VD.

Figure 27:
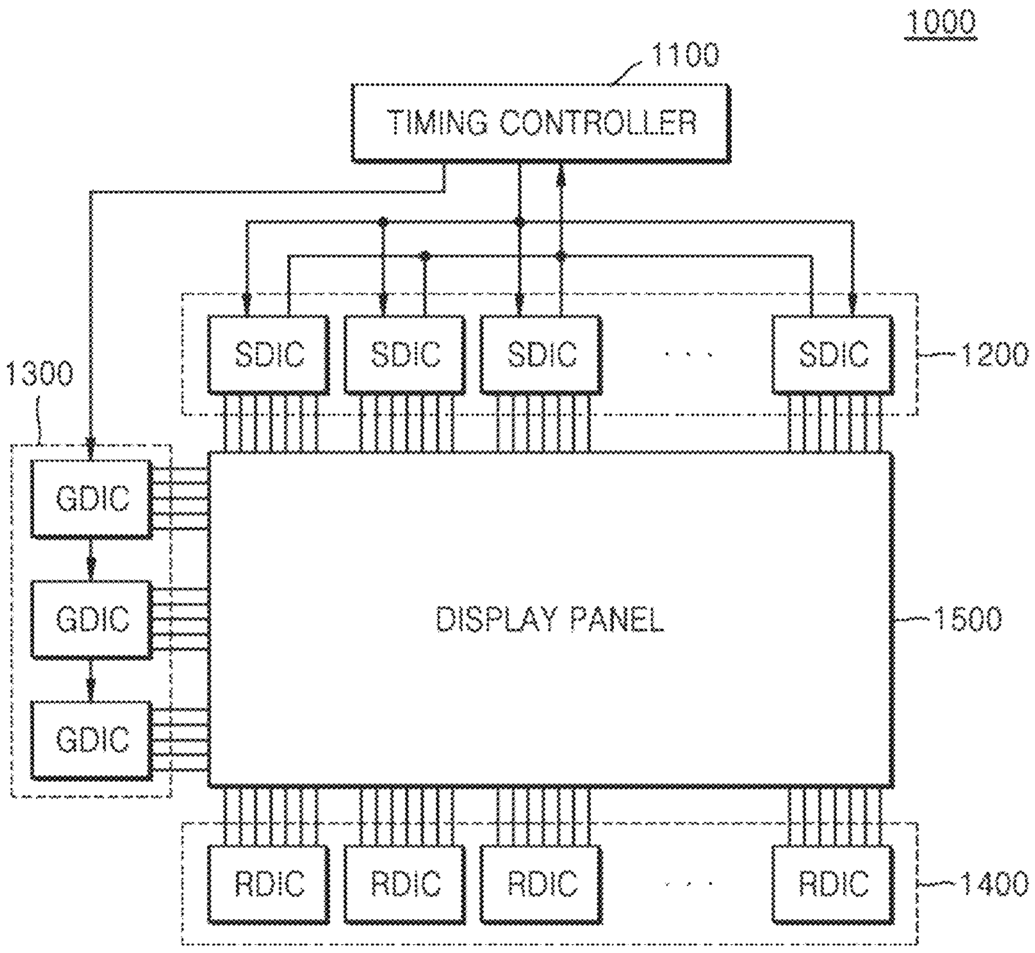
FIG. 27 illustrates a display device according to an embodiment.

FIG. 27 illustrates a display device according to an embodiment.

A display device 1000 of FIG. 27 may include a medium to large display panel 1500 and may be applied to, for example, a television and a monitor. Referring to FIG. 27, the display device 1000 may include a timing controller 1100, a source driver 1200, a gate driver 1300, a read-out circuit 1400, and the display panel 1500. The source driver 1200 may substantially be the same as the data driver 112 of FIG. 1, the gate driver 1300 may substantially be the same as the scan driver 113 of FIG. 1, and the timing controller 1100 may substantially be the same as the control logic circuit 111 of FIG. 1.

The timing controller 1100 may include at least one IC or module. The timing controller 1100 may communicate with a plurality of source driver ICs SDIC and a plurality of gate driver ICs GDIC via a set interface.

The timing controller 1100 may generate control signals for controlling driving time points of the plurality of source driver ICs SDIC and the plurality of gate driver ICs GDIC and provide the control signals to the plurality of source driver ICs SDIC and the plurality of gate driver ICs GDIC.

The source driver 1200 may include the plurality of source driver ICs SDIC, and the plurality of source driver ICs SDIC may be mounted on a circuit film (e.g., Tape Carrier Package (TCP), Chip On Film (COF), and Flexible Print Circuit (FPC)) and adhered to the display panel 1500 by a tape automatic bonding (TAB) scheme or mounted on a non-display area of the display panel 1500 by a chip on glass (COG) scheme.

The gate driver 1300 may include the plurality of gate driver ICs GDIC. The plurality of gate driver ICs GDIC may be mounted on the circuit film and adhered to the display panel 1500 by a TAB scheme or mounted on the non-display area of the display panel 1500 by a COG scheme. Alternatively, the gate driver 1300 may be directly formed on a lower substrate of the display panel 1500 by a gate-driver in panel (GIP) scheme. The gate driver 1300 may be formed in the non-display area outside a pixel array in which pixels are formed, of the display panel 1500. The gate driver 1300 may be formed using the same TFT process as the pixels.

The read-out circuit 1400 may include a plurality of read-out ICs (RDICs), and the plurality of read-out ICs RDIC may be mounted on the circuit film (e.g., TCP, COF, and FPC) and adhered to the display panel 1500 by a TAB scheme or mounted on the non-display area of the display panel 1500 by a COG scheme. As described with reference to FIGS. 1 to 26, the read-out circuit 1400 may generate read-out data by reading out electrical properties of the pixels PX. Although the read-out circuit 1400 is illustrated as being implemented as a separate chip from the source driver 1200 in FIG. 27, embodiments are not limited thereto. At least one of the plurality of source driver ICs SDIC may include the read-out circuit (refer to 114 in FIG. 1) described with reference to FIG. 1. The display panel 1500 may include the pixel PX described with reference to FIGS. 1 to 26.

Figure 28:
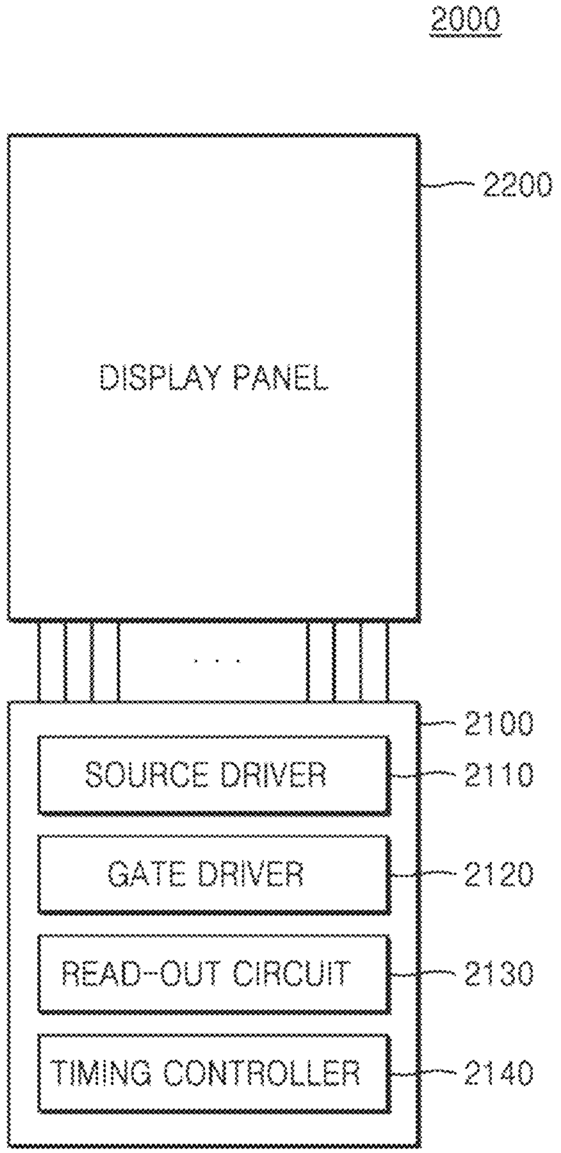
FIG. 28 illustrates a display device according to an embodiment.

FIG. 28 illustrates a display device according to an embodiment.

A display device 2000 of FIG. 28 may include a display panel 2200 with a small size and may be applied to, for example, a mobile device (e.g., a smartphone and a tablet PC) or a wearable device. Referring to FIG. 28, the display device 2000 may include a display driver circuit 2100 and the display panel 2200. The display driver circuit 2100 may include at least one IC. The display driver circuit 2100 may be mounted on a circuit film (e.g., TCP, COF, and FPC) and adhered to the display panel 2200 by a TAB scheme or mounted on a non-display area (e.g., an area on which an image is not displayed) of the display panel 2200 by a COG scheme.

The display driver circuit 2100 may include a source driver 2110, a gate driver 2120, a read-out circuit 2130, and a timing controller 2140. The source driver 2110 may substantially be the same as the data driver 112 of FIG. 1, the gate driver 2120 may substantially be the same as the scan driver 113 of FIG. 1, and the timing controller 2140 may substantially be the same as the control logic circuit 111 of FIG. 1. As described with reference to FIGS. 1 to 14, the read-out circuit 2130 may generate read-out data by reading out electrical properties of the pixels PX.

The display panel 2200 may be substantially the same as the display panel 120 of FIG. 1. The display panel 2200 may include the pixels PX including the OLED described with reference to FIGS. 1 to 26.

Figure 29:
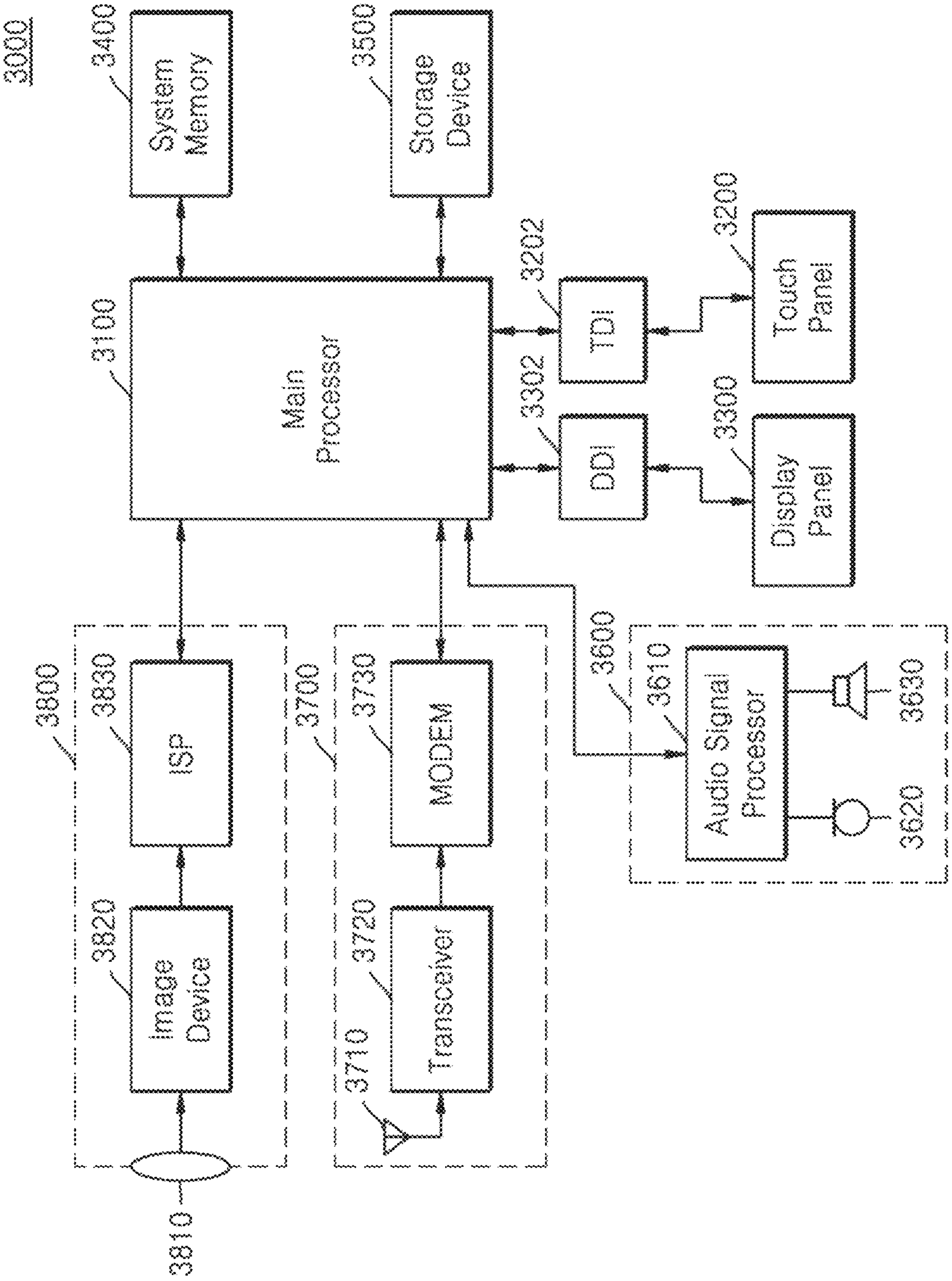
FIG. 29 is a block diagram of an electronic device according to an embodiment.

FIG. 29 is a block diagram of an electronic device according to an embodiment.

Referring to FIG. 29, an electronic device 3000 may include a main processor 3100, a touch panel 3200, a touch driver IC (TDI) 3202, a display panel 3300, a display driver IC (DDI) 3302, a system memory 3400, a storage device 3500, an audio processor 3600, a communication block 3700, and an image processor 3800. In an embodiment, the electronic device 3000 may be one of various electronic devices, such as a mobile communication terminal a personal digital assistant (PDA), a portable media player (PMP), a digital camera, a smartphone, a tablet computer, a laptop computer, and a wearable device, or one of various communication devices that support wireless communication relays, such as wireless routers and wireless communication base stations. In an embodiment, the electronic device 3000 may further include components other than the components shown in FIG. 16A, or some of the components shown in FIG. 15 may be omitted from the electronic device 3000.

The main processor 3100 may control all operations of the electronic device 3000. The main processor 3100 may control/manage operations of components of the electronic device 3000. The main processor 3100 may process various operations to operate the electronic device 3000.

The touch panel 3200 may be configured to detect a touch input from a user via the control of the TDI 3202. The display panel 3300 may be configured to display image information via the control of the DDI 3302. In an embodiment, the display panel 3300 and the DDI 3302 may correspond to the display panel and the display driver circuit, which have been described with reference to FIGS. 1 to 26. The display panel 3300 and the DDI 3302 may operate based on the operating method described with reference to FIGS. 1 to 26.

The system memory 3400 may store data used for operations of the electronic device 3000. For example, the system memory 3400 may include a volatile memory (e.g., static random access memory (SRAM), dynamic RAM (DRAM), and synchronous DRAM (SDRAM)) and/or a non-volatile memory (e.g., phase-change RAM (PRAM), magneto-resistive RAM (MRAM), resistive RAM (ReRAM), and ferro-electric RAM (FRAM)).

The storage device 3500 may store data regardless of power supply. As an example, the storage device 3500 may include at least one of various non-volatile memories, such as flash memory, PRAM, MRAM, ReRAM, and FRAM. As an example, the storage device 3500 may include an embedded memory and/or removable memory of the electronic device 3000.

The audio processor 3600 may process an audio signal by using an audio signal processor 3610. The audio processor 3600 may receive an audio input through a mike 3620 or provide an audio output through a speaker 3630.

The communication block 3700 may exchange signals with an external device/system through an antenna 3710. A transceiver 3720 and a modulator/demodulator (MODEM) 3730 of the communication block 3700 may process the signals, which are exchanged with the external device/system according to at least one of various wireless communication protocols, such as long-term evolution (LTE), worldwide interoperability for microwave access (WiMax), global system for mobile communication (GSM), code division multiple access (CDMA), Bluetooth, near-field communication (NFC), wireless fidelity (Wi-Fi), and radio frequency Identification (RFID).

The image processor 3800 may receive light through a lens 3810. An image device 3820 and an image signal processor (ISP) 3830, which are in the image processor 3800, may generate image information on an external object, based on the received light.

In some embodiments, each of the components represented by a block as illustrated in FIGS. 1, 4, 5 and 27-29 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

What is claimed is:

1. A display device comprising:

pixels arranged in rows and columns;

a scan driver connected to the rows of the pixels, wherein a first row of the rows of the pixels is connected to the scan driver through a scan line, a first emission control line, a second emission control line, a third emission control line, a fourth emission control line, an initialization line, and a read-out control line;

a data driver connected to the columns of the pixels, wherein a first column of the columns of the pixels is connected to the scan driver through a data line; and a read-out circuit connected to the columns of the pixels and configured to read-out electrical properties of the pixels through a read-out line, wherein the first column is connected to the read-out circuit through the read-out line, wherein a first pixel of the pixels comprises:

a first transistor comprising a first electrode connected to a first node, a second electrode connected to a third node, and a gate connected to a second node;

a second transistor comprising a first electrode connected to the data line, a second electrode connected to the first node, and a gate connected to the scan line;

a third transistor comprising a first electrode connected to the second node, a second electrode connected to the third node, and a gate connected to the scan line;

a fourth transistor comprising a first electrode connected to a power node configured to supply a power supply voltage, a second electrode connected to the first node, and a gate connected to the first emission control line;

a fifth transistor comprising a first electrode connected to the read-out line, a second electrode connected to the second node, and a gate connected to the initialization line;

a sixth transistor comprising a first electrode connected to the read-out line, a second electrode connected to the third node, and a gate connected to the read-out control line;

a seventh transistor comprising a first electrode connected to the third node, a second electrode, and a gate connected to the second emission control line;

an eighth transistor comprising a first electrode connected to the third node, a second electrode, and a gate connected to the third emission control line;

a ninth transistor comprising a first electrode connected to the third node, a second electrode, and a gate connected to the fourth emission control line;

a capacitor connected to the first node and the second node;

a first organic light-emitting diode connected between the second electrode of the seventh transistor and a ground node;

a second organic light-emitting diode between the second electrode of the eighth transistor and the ground node; and a third organic light-emitting diode connected between the second electrode of the ninth transistor and the ground node.

2. The display device of claim 1, wherein the scan driver is configured to, in a reset section of the first pixel, output a scan signal at an inactive level through the scan line, output an initialization signal at an active level through the initialization line, output a read-out control signal at an inactive level through the read-out control line, output a first emission control signal at an active level through the first emission control line, output a second emission control signal at an inactive level through the second emission control line, output a third emission control signal at an inactive level through the third emission control line, and output a fourth emission control signal at an inactive level through the fourth emission control line.

3. The display device of claim 1, wherein the scan driver is configured to, in a program section of the first pixel, output a scan signal at an active level through the scan line, output an initialization signal at an inactive level through the initialization line, output a read-out control signal at an inactive level through the read-out control line, output a first emission control signal at an inactive level through the first emission control line, output a second emission control signal at an inactive level through the second emission control line, output a third emission control signal at an inactive level through the third emission control line, and output a fourth emission control signal at an inactive level through the fourth emission control line.

4. The display device of claim 1, wherein the scan driver is configured to, in a hold section of the first pixel, output a scan signal at an inactive level through the scan line, output an initialization signal at an inactive level through the initialization line, output a read-out control signal at an inactive level through the read-out control line, output a first emission control signal at an inactive level through the first emission control line, output a second emission control signal at an inactive level through the second emission control line, output a third emission control signal at an inactive level through the third emission control line, and output a fourth emission control signal at an inactive level through the fourth emission control line.

5. The display device of claim 1, wherein the scan driver is configured to, in a first emission section of the first pixel, output a scan signal at an inactive level through the scan line, output an initialization signal at an inactive level through the initialization line, output a read-out control signal at an inactive level through the read-out control line, output a first emission control signal at an active level through the first emission control line, output a second emission control signal at an active level through the second emission control line, output a third emission control signal at an inactive level through the third emission control line, and output a fourth emission control signal at an inactive level through the fourth emission control line.

6. The display device of claim 1, wherein the scan driver is configured to, in a second emission section of the first pixel, output a scan signal at an inactive level through the scan line, output an initialization signal at an inactive level through the initialization line, output a read-out control signal at an inactive level through the read-out control line, output a first emission control signal at an active level through the first emission control line, output a second emission control signal at an inactive level through the second emission control line, output a third emission control signal at an active level through the third emission control line, and output a fourth emission control signal at an inactive level through the fourth emission control line.

7. The display device of claim 1, wherein the scan driver is configured to, in a third emission section of the first pixel, output a scan signal at an inactive level through the scan line, output an initialization signal at an inactive level through the initialization line, output a read-out control signal at an inactive level through the read-out control line, output a first emission control signal at an active level through the first emission control line, output a second emission control signal at an inactive level through the second emission control line, output a third emission control signal at an inactive level through the third emission control line, and output a fourth emission control signal at an active level through the fourth emission control line.

8. The display device of claim 1, wherein the scan driver is configured to, in a first read-out section of the first pixel, output a scan signal at an inactive level through the scan line, output an initialization signal at an inactive level through the initialization line, output a read-out control signal at an active level through the read-out control line, output a first emission control signal at an active level through the first emission control line, output a second emission control signal at an inactive level through the second emission control line, output a third emission control signal at an inactive level through the third emission control line, and output a fourth emission control signal at an inactive level through the fourth emission control line, and wherein the read-out circuit is further configured to generate data corresponding to a driving current, based on a signal received through the read-out line.

9. The display device of claim 1, wherein the scan driver is configured to, in a second read-out section of the first pixel, output a scan signal at an active level through the scan line, output an initialization signal at an inactive level through the initialization line, output a read-out control signal at an active level through the read-out control line, output a first emission control signal at an inactive level through the first emission control line, output a second emission control signal at an inactive level through the second emission control line, output a third emission control signal at an inactive level through the third emission control line, and output a fourth emission control signal at an inactive level through the fourth emission control line, and wherein the read-out circuit is further configured to generate data corresponding to a threshold voltage, based on a signal received through the read-out line.

10. The display device of claim 1, wherein the scan driver is configured to, in a third read-out section of the first pixel, output a scan signal at an inactive level through the scan line, output an initialization signal at an inactive level through the initialization line, output a read-out control signal at an active level through the read-out control line, output a first emission control signal at an active level through the first emission control line, output a second emission control signal at an active level through the second emission control line, output a third emission control signal at an inactive level through the third emission control line, and output a fourth emission control signal at an inactive level through the fourth emission control line, and wherein the read-out circuit is further configured to generate data corresponding to a forward voltage of the first organic light-emitting diode, based on a signal received through the read-out line.

11. The display device of claim 1, wherein the scan driver is configured to, in a fourth read-out section of the first pixel, output a scan signal at an inactive level through the scan line, output an initialization signal at an inactive level through the initialization line, output a read-out control signal at an active level through the read-out control line, output a first emission control signal at an active level through the first emission control line, output a second emission control signal at an inactive level through the second emission control line, output a third emission control signal at an active level through the third emission control line, and output a fourth emission control signal at an inactive level through the fourth emission control line, and wherein the read-out circuit is further configured to generate data corresponding to a forward voltage of the second organic light-emitting diode, based on a signal received through the read-out line.

12. The display device of claim 1, wherein the scan driver is configured to, in a fifth read-out section of the first pixel, output a scan signal at an inactive level through the scan line, output an initialization signal at an inactive level through the initialization line, output a read-out control signal at an active level through the read-out control line, output a first emission control signal at an active level through the first emission control line, output a second emission control signal at an inactive level through the second emission control line, output a third emission control signal at an inactive level through the third emission control line, and output a fourth emission control signal at an active level through the fourth emission control line, and wherein the read-out circuit is further configured to generate data corresponding to a forward voltage of the third organic light-emitting diode, based on a signal received through the read-out line.

13. The display device of claim 1, wherein the scan driver is configured to, in a first emission section of the first pixel, output a scan signal at an inactive level through the scan line, output an initialization signal at an inactive level through the initialization line, output a read-out control signal at an inactive level through the read-out control line, output a first emission control signal at an active level through the first emission control line, output a third emission control signal at an inactive level through the third emission control line, and output a fourth emission control signal at an inactive level through the fourth emission control line, and wherein the scan driver is configured to output a second emission control signal at an active level through the second emission control line in a first section of the first emission section, and output the second emission control signal at an inactive level through the second emission control line in a second section of the first emission section.

14. The display device of claim 1, wherein the second transistor is smaller than the third transistor.

15. A display device comprising:

a display panel comprising a plurality of pixels; and a display driver circuit comprising a scan driver, a data driver, and a read-out circuit, wherein a first pixel of the plurality of pixels comprises:

a first transistor between a first node and a third node, and configured to operate in response to a voltage of a second node;

a second transistor connected between the first node and a first data line, and configured to operate in response to a first scan signal received through a first scan line;

a third transistor connected between the second node and the third node, and configured to operate in response to a fourth scan signal received through a fourth scan line;

a fourth transistor connected between a first driving power source and the first node, and configured to operate in response to a first emission control signal received through a first emission control line;

a fifth transistor connected between a read-out line and the second node, and configured to operate in response to an initialization signal received through an initialization line;

a sixth transistor connected between the read-out line and the third node, and configured to operate in response to a read-out control signal received through a read-out control line;

a seventh transistor connected between the third node and a first organic light-emitting diode, and configured to operate in response to a second emission control signal received through a second emission control line;

an eighth transistor connected between the third node and a second organic light-emitting diode, and configured to operate in response to a third emission control signal received through a third emission control line;

a ninth transistor connected between the third node and a third organic light-emitting diode, and configured to operate in response to a fourth emission control signal received through a fourth emission control line;

a tenth transistor connected between the first node and a second data line, and configured to operate in response to a second scan signal received through a second scan line;

an eleventh transistor connected between the first node and a third data line, and configured to operate in response to a third scan signal received through a third scan line;

a capacitor connected between the first node and the second node;

the first organic light-emitting diode connected between the seventh transistor and a second driving power source;

the second organic light-emitting diode connected between the eighth transistor and the second driving power source; and the third organic light-emitting diode connected between the ninth transistor and the second driving power source, wherein the scan driver is connected to the first pixel through the first scan line, the second scan line, the third scan line, the fourth scan line, the initialization line, the read-out control line, the first emission control line, the second emission control line, the third emission control line, and the fourth emission control line, wherein the data driver is connected to the first pixel through the first data line, the second data line and the third data line, and is configured to supply a first data voltage corresponding to a luminance of the first organic light-emitting diode through the first data line, supply a second data voltage corresponding to a luminance of the second organic light-emitting diode through the second data line, and supply a third data voltage corresponding to a luminance of the third organic light-emitting diode through the third data line, and wherein the read-out circuit is connected to the first pixel through the read-out line and configured to read-out electrical properties of the read-out line.

16. The display device of claim 15, wherein the scan driver is configured to generate and output the fourth scan signal by performing an AND operation on the first scan signal, the second scan signal, and the third scan signal.

17. The display device of claim 15, wherein the scan driver is configured to, in a first program section of the first pixel, output the first scan signal at an active level through the first scan line, output the second scan signal at an inactive level through the second scan line, output the third scan signal at an inactive level through the third scan line, output the fourth scan signal at an active level through the fourth scan line, output the initialization signal at an inactive level through the initialization line, output the read-out control signal at an inactive level through the read-out control line, output the first emission control signal at an inactive level through the first emission control line, output the second emission control signal at an inactive level through the second emission control line, output the third emission control signal at an inactive level through the third emission control line, and output the fourth emission control signal at an inactive level through the fourth emission control line.

18. The display device of claim 15, wherein the scan driver is configured to, in a second program section of the first pixel, output the first scan signal at an inactive level through the first scan line, output the second scan signal at an active level through the second scan line, output the third scan signal at an inactive level through the third scan line, output the fourth scan signal at an active level through the fourth scan line, output the initialization signal at an inactive level through the initialization line, output the read-out control signal at an inactive level through the read-out control line, output the first emission control signal at an inactive level through the first emission control line, output the second emission control signal at an inactive level through the second emission control line, output the third emission control signal at an inactive level through the third emission control line, and output the fourth emission control signal at an inactive level through the fourth emission control line.

19. The display device of claim 15, wherein the scan driver is configured to, in a third program section of the first pixel, output the first scan signal at an inactive level through the first scan line, output the second scan signal at an inactive level through the second scan line, output the third scan signal at an active level through the third scan line, output the fourth scan signal at an active level through the fourth scan line, output the initialization signal at an inactive level through the initialization line, output the read-out control signal at an inactive level through the read-out control line, output the first emission control signal at an inactive level through the first emission control line, output the second emission control signal at an inactive level through the second emission control line, output the third emission control signal at an inactive level through the third emission control line, and output the fourth emission control signal at an inactive level through the fourth emission control line.

20. A display device comprising:

pixels arranged in rows and columns;

a scan driver connected to the rows of the pixels, wherein a first row of the rows of the pixels is connected to the scan driver through a scan line, a first emission control line, a second emission control line, a third emission control line, an initialization line, and a read-out control line;

a data driver connected to the columns of the pixels, wherein a first column of the columns of the pixels is connected to the scan driver through a data line; and a read-out circuit connected to the columns of the pixels and configured to read-out electrical properties of the pixels through a read-out line, wherein the first column is connected to the read-out circuit through the read-out line, wherein a first pixel of the pixels comprises:

a first transistor comprising a first electrode connected to a first node, a second electrode connected to a third node, and a gate connected to a second node;

a second transistor comprising a first electrode connected to the data line, a second electrode connected to the first node, and a gate connected to the scan line;

a third transistor comprising a first electrode connected to the second node, a second electrode connected to the third node, and a gate connected to the scan line;

a fourth transistor comprising a first electrode connected to a power node configured to supply a power supply voltage, a second electrode connected to the first node, and a gate connected to the first emission control line;

a fifth transistor comprising a fifth electrode connected to the read-out line, a second electrode connected to the second node, and a gate connected to the initialization line;

a sixth transistor comprising a first electrode connected to the read-out line, a second electrode connected to the third node, and a gate connected to the read-out control line;

a seventh transistor comprising a first electrode connected to the third node, a second electrode, and a gate connected to the second emission control line;

an eighth transistor comprising a first electrode connected to the third node, a second electrode, and a gate connected to the third emission control line;

a capacitor connected between the first node and the second node;

a first organic light-emitting diode connected between the second electrode of the seventh transistor and a ground node; and a second organic light-emitting diode connected between the second electrode of the eighth transistor and the ground node, wherein a frame of the first pixel comprises a first sub-frame and a second sub-frame, and wherein the first pixel is configured to perform a reset operation, a program operation, a hold operation, and an emission operation on the first organic light-emitting diode in the first sub-frame, and the first pixel is configured to perform a reset operation, a program operation, a hold operation, and an emission operation on the second organic light-emitting diode in the second sub-frame.

* * * * *